United States Patent
Koo et al.

(10) Patent No.: US 12,010,342 B2
(45) Date of Patent: Jun. 11, 2024

(54) METHOD AND DEVICE FOR PROCESSING VIDEO SIGNAL

(71) Applicant: LG Electronics Inc., Seoul (KR)

(72) Inventors: Moonmo Koo, Seoul (KR); Jaehyun Lim, Seoul (KR); Seunghwan Kim, Seoul (KR); Mehdi Salehifar, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 286 days.

(21) Appl. No.: 17/429,518

(22) PCT Filed: Feb. 10, 2020

(86) PCT No.: PCT/KR2020/001829
§ 371 (c)(1),
(2) Date: Aug. 9, 2021

(87) PCT Pub. No.: WO2020/162732
PCT Pub. Date: Aug. 13, 2020

(65) Prior Publication Data
US 2022/0109875 A1    Apr. 7, 2022

Related U.S. Application Data

(60) Provisional application No. 62/803,490, filed on Feb. 9, 2019.

(51) Int. Cl.
*H04N 7/12*   (2006.01)
*H04N 19/105*   (2014.01)
(Continued)

(52) U.S. Cl.
CPC ........... *H04N 19/60* (2014.11); *H04N 19/105* (2014.11); *H04N 19/176* (2014.11); *H04N 19/46* (2014.11)

(58) Field of Classification Search
CPC .... H04N 19/60; H04N 19/105; H04N 19/176; H04N 19/46; H04N 19/12; H04N 19/132;
(Continued)

(56) References Cited

U.S. PATENT DOCUMENTS

2018/0199072 A1* 7/2018 Li .................... H04N 19/186
2019/0306506 A1* 10/2019 Chen .................. H04N 19/119
(Continued)

FOREIGN PATENT DOCUMENTS

KR    20180096194      8/2018
WO    WO2018190594    10/2018

OTHER PUBLICATIONS

Choi et al., "Non-CE7: Last position coding for large block-size transforms," JVET-M0251-v5, Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.
(Continued)

*Primary Examiner* — Gims S Philippe
(74) *Attorney, Agent, or Firm* — Fish & Richardson P.C.

(57) ABSTRACT

Embodiments in the present specification provide a method and device for processing video signal including steps of: obtaining a sub-block transform (SBT) flag indicating whether a SBT is applied, wherein the SBT represents a transform applied to a transform unit corresponding to one of subblocks split from a coding unit; determining a variable value related to a transform target region based on the SBT flag and a size value of the transform unit, wherein if the SBT flag equals to 1 and the size value is greater than a threshold value, the variable value is determined as the threshold value; obtaining position information of a last significant coefficient according to a scan order within the transform unit, wherein the position information of the last significant coefficient is coded based on the variable value;
(Continued)

and performing an inverse-transform based on the position information of the last significant coefficient.

13 Claims, 27 Drawing Sheets

(51) Int. Cl.
  *H04N 19/176* (2014.01)
  *H04N 19/46* (2014.01)
  *H04N 19/60* (2014.01)
(58) Field of Classification Search
  CPC .... H04N 19/147; H04N 19/159; H04N 19/18; H04N 19/61; H04N 19/70; H04N 19/625
  USPC ................................................... 375/240.18
  See application file for complete search history.

(56) References Cited

U.S. PATENT DOCUMENTS

| | | | |
|---|---|---|---|
| 2020/0014946 A1* | 1/2020 | Xu | H04N 19/44 |
| 2021/0160490 A1* | 5/2021 | Koo | H04N 19/423 |
| 2022/0109877 A1* | 4/2022 | Choi | H04N 19/176 |

OTHER PUBLICATIONS

Koo et al., "CE6-related: 32 point MTS based on skipping high frequency coefficients," JVET-M0297, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.
PCT International Search Report in International Appln. No. PCT/KR2020/001829, dated May 26, 2020, 7 pages.
Zhao et al., "CE6: Sub-block transform for inter blocks (CE6.4.1)," JVET-M0140-v3, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 19 pages.

* cited by examiner

SBT-V, position 0
(w1 = 1/2 w)

SBT-V, position 1
(w1 = 1/2 w)

SBT-H, position 0
(h1 = 1/2 h)

SBT-H, position 1
(h1 = 1/2 h)

SBT-V, position 0
(w1 = 1/4 w)

SBT-V, position 1
(w1 = 3/4 w)

SBT-H, position 0
(h1 = 1/4 h)

SBT-H, position 1
(h1 = 3/4 h)

METHOD AND DEVICE FOR PROCESSING VIDEO SIGNAL

CROSS-REFERENCE TO RELATED APPLICATIONS

This application is a National Stage application under 35 U.S.C. § 371 of International Application No. PCT/KR2020/001829, filed on Feb. 10, 2020, which claims the benefit of U.S. Provisional Application No. 62/803,490, filed on Feb. 9, 2019. The disclosures of the prior applications are incorporated by reference in their entirety.

TECHNICAL FIELD

Embodiments of the present disclosure relate to a video coding system and, more specifically, to a method and device for encoding and decoding a video signal using a reduced transform.

BACKGROUND ART

Compression coding refers to a signal processing technique for transmitting digitalized information through a communication line or storing the same in an appropriate form in a storage medium. Media such as video, images and audio can be objects of compression coding and, particularly, a technique of performing compression coding on images is called video image compression.

Next-generation video content will have features of a high spatial resolution, a high frame rate and high dimensionality of scene representation. To process such content, memory storage, a memory access rate and processing power will significantly increase.

Accordingly, there is a need to design a coding tool for processing more efficiently next-generation video content. In particular, a scheme for efficiently performing a transform is required.

DISCLOSURE

Technical Problem

Embodiments of the present disclosure provide a method and device for applying a reduced transform when a sub-block transform (SBT) is used to reduce the amount of data and to increase a processing speed in a process of encoding or decoding a video signal.

Technical objects to be achieved in embodiments of the present disclosure are not limited to the aforementioned technical objects, and other technical objects not described above may be evidently understood by a person having ordinary knowledge in the art to which the present disclosure pertains from the following description.

Technical Solution

Embodiments of the present disclosure provide a method and device for decoding a video signal. A method for decoding a video signal according to an embodiment of the present disclosure comprises obtaining a sub-block transform (SBT) flag indicating whether a SBT is applied, wherein the SBT represents a transform applied to a transform unit corresponding to one of sub-blocks split from a coding unit, determining a variable value related to a transform target region based on the SBT flag and a size value of the transform unit, wherein if the SBT flag equals to 1 and the size value is greater than a threshold value, the variable value is determined as the threshold value, obtaining position information of a last significant coefficient according to a scan order within the transform unit, wherein the position information of the last significant coefficient is coded based on the variable value, and performing an inverse-transform based on the position information of the last significant coefficient.

If the SBT flag is 1 and the size value of the transform unit is less than or equal to the threshold value, the variable value may be determined as the size value of the transform unit.

The size value of the transform unit may be determined based on a SBT size flag indicating a size of a sub-block split from the coding unit. If the SBT size flag is 0, the size value of the transform unit may have a half size of the coding unit. If the SBT size flag is 1, the size value of the transform unit may have a quarter size of the coding unit.

Performing the inverse-transform may comprise applying a horizontal direction transform and a vertical direction transform to the coding unit. A transform kernel for the horizontal direction transform and the vertical direction transform may be determined based on a SBT direction flag indicating a split direction of the coding unit and a SBT position flag indicating a position of the transform unit in the coding unit.

If the SBT direction flag is 0, the coding unit may be split in a vertical direction. If the SBT direction flag is 1, the coding unit may be split in a horizontal direction.

When discrete sine transform type-7 (DST-7) or discrete cosine transform type-8 (DCT-8) is applied to the transform unit, a width of an area where a non-zero transform coefficient is present in the transform unit may be reduced to 16 if a width of the transform unit is greater than 16. When the DST-7 or the DCT-8 is applied to the transform unit, a height of the area where the non-zero transform coefficient is present in the transform unit may be reduced to 16 if a height of the transform unit is greater than 16.

Another embodiment of the present disclosure provides a method for encoding a video signal. A method for encoding a video signal according to an embodiment of the present disclosure comprises applying a transform to a transform unit corresponding to one of sub-blocks split from a coding unit, and encoding information related to the transform, wherein the information related to the transform includes a sub-block transform (SBT) flag indicating whether to apply a SBT, and position information of a last significant coefficient according to a scan order within the transform unit, wherein the position information of the last significant coefficient is coded based on a variable value related to an area in which a non-zero transform coefficient is present, wherein, if the SBT flag equals to 1 and a size value of the transform unit is greater than a threshold value, the variable value is determined as the threshold value.

If the SBT flag is 1 and the size value of the transform unit is less than or equal to the threshold value, the variable value may be determined as the size value of the transform unit.

The information related to the transform may further include a SBT size flag indicating a size of a sub-block split from the coding unit. If the SBT size flag is 0, the size value of the transform unit may have a half size of the coding unit. If the SBT size flag is 1, the size value of the transform unit may have a quarter size of the coding unit.

Applying the transform may comprise applying a horizontal direction transform and a vertical direction transform to the coding unit. A transform kernel for the horizontal direction transform and the vertical direction transform may be determined based on a split direction of the coding unit and a position of the transform unit in the coding unit. The information related to the transform may further include a SBT direction flag indicating the split direction of the coding unit and a SBT position flag indicating the position of the transform unit.

If the SBT direction flag is 0, the coding unit may be split in a vertical direction. If the SBT direction flag is 1, the coding unit may be split in a horizontal direction.

When discrete sine transform type-7 (DST-7) or discrete cosine transform type-8 (DCT-8) is applied to the transform unit, a width of an area where a non-zero transform coefficient is present in the transform unit may be reduced to 16 if a width of the transform unit is greater than 16. When the DST-7 or the DCT-8 is applied to the transform unit, a height of the area where the non-zero transform coefficient is present in the transform unit may be reduced to 16 if a height of the transform unit is greater than 16.

Another embodiment of the present disclosure provides a non-transitory computer-readable medium storing one or more commands. The one or more commands executed by one or more processors allow a video signal processing device to obtain a sub-block transform (SBT) flag indicating whether a SBT is applied, wherein the SBT represents a transform applied to a transform unit corresponding to one of sub-blocks split from a coding unit, determine a variable value related to a transform target region based on the SBT flag and a size value of the transform unit, wherein, if the SBT flag equals to 1 and the size value of the transform unit is greater than a threshold value, the variable value is determined as the threshold value, obtain position information of a last significant coefficient according to a scan order within the transform unit, wherein the position information of the last significant coefficient is coded based on the variable value, and perform an inverse-transform based on the position information of the last significant coefficient.

The one or more commands, for the purpose of encoding of the video signal, allow a video signal processing device 2500 (or an encoding apparatus 100) to apply a transform to a transform unit corresponding to one of sub-blocks split from a coding unit and encode information related to the transform. The information related to the transform includes a sub-block transform (SBT) flag indicating whether to apply a SBT, and position information of a last significant coefficient according to a scan order within the transform unit. The position information of the last significant coefficient is coded based on a variable value related to an area in which a non-zero transform coefficient is present. If the SBT flag equals to 1 and a size value of the transform unit is greater than a threshold value, the variable value is determined as the threshold value.

Advantageous Effects

According to embodiments of the present disclosure, it is possible to reduce the amount of data necessary for a transform and a transform time by splitting a coding unit into sub-blocks in an optimal form, performing a reduced transform, and encoding/decoding related information in consideration of the reduced transform.

Effects that can achieved by embodiments of the present disclosure are not limited to effects that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 5A is a diagram for describing a block segmentation structure according to QT (Quad Tree), FIG. 5B is a diagram for describing a block segmentation structure according to BT (Binary Tree), FIG. 5C is a diagram for describing a block segmentation structure according to TT (Ternary Tree), and FIG. 5D is a diagram for describing a block segmentation structure according to AT (Asymmetric Tree).

FIG. 12*a* illustrates an area where a significant coefficient is present and an area where zero-out is applied upon forward transform, and FIG. 12*b* illustrates an area where a significant coefficient is present and an area where zero-out is applied upon inverse transform.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Further, the processing unit may be interpreted into the meaning including a unit for a luma component and a unit for a chroma component. For example, the processing unit may correspond to a block, a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

Figure 1:
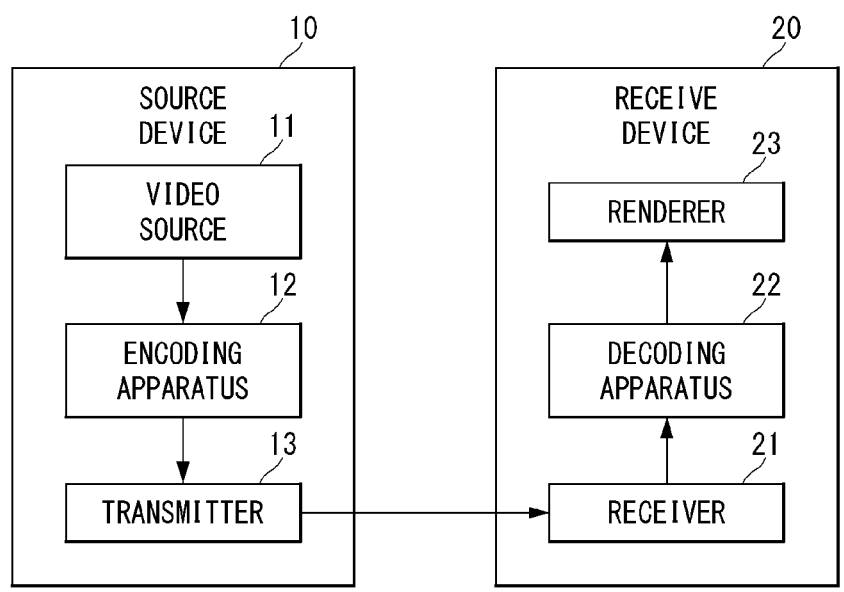
FIG. 1 shows an example of a video coding system as an embodiment to which the present disclosure is applied.

FIG. 1 shows an example of a video coding system as an embodiment to which the present disclosure is applied. The video coding system may include a source device 10 and a receive device 20. The source device 10 can transmit encoded video/image information or data to the receive device 20 in the form of a file or streaming through a digital storage medium or a network.

The source device 10 may include a video source 11, an encoding apparatus 12, and a transmitter 13. The receive device 20 may include a receiver, a decoding apparatus 22 and a renderer 23. The encoding apparatus 12 may be called a video/image encoding apparatus and the decoding apparatus 20 may be called a video/image decoding apparatus. The transmitter 13 may be included in the encoding apparatus 12. The receiver 21 may be included in the decoding apparatus 22. The renderer 23 may include a display and the display may be configured as a separate device or an external component.

The video source can acquire a video/image through video/image capturing, combining or generating process. The video source may include a video/image capture device and/or a video/image generation device. The video/image capture device may include, for example, one or more cameras, a video/image archive including previously captured videos/images, and the like. The video/image generation device may include, for example, a computer, a tablet, a smartphone, and the like and (electronically) generate a video/image. For example, a virtual video/image can be generated through a computer or the like and, in this case, a video/image capture process may be replaced with a related data generation process.

The encoding apparatus 12 can encode an input video/image. The encoding apparatus 12 can perform a series of procedures such as prediction, transform and quantization for compression and coding efficiency. Encoded data (encoded video/image information) can be output in the form of a bitstream.

The transmitter 13 can transmit encoded video/image information or data output in the form of a bitstream to the receiver of the receive device in the form of a file or streaming through a digital storage medium or a network. The digital storage medium may include various storage media such as a USB (universal serial bus), an SD card (secure digital card), a CD (compact disc), a DVD (digital versatile disc), Blueray Disc (blu-ray disc), an HDD (hard disk drive), and an SSD (solid state drive). The transmitter 13 may include an element for generating a media file through a predetermined file format and an element for transmission through a broadcast/communication network.

The receiver 21 can extract a bitstream and transmit the bitstream to the decoding apparatus 22.

The decoding apparatus 22 can decode a video/image by performing a series of procedures such as inverse quantization, inverse transform and prediction corresponding to operation of the encoding apparatus 12.

The renderer 23 can render the decoded video/image. The rendered video/image can be display through a display.

Figure 2:
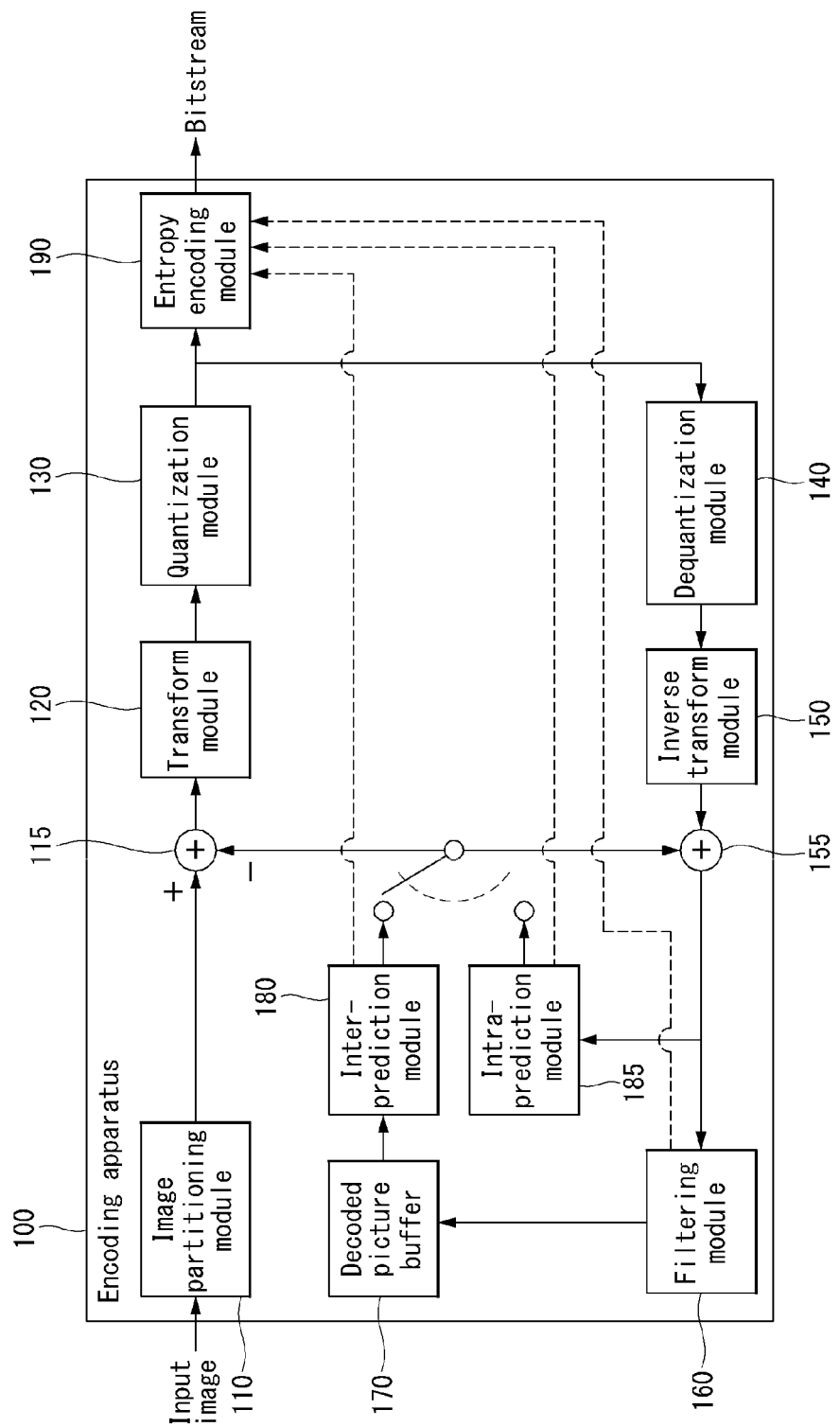
FIG. 2 is a schematic block diagram of an encoding apparatus which encodes video/image signals as an embodiment to which the present disclosure is applied.

FIG. 2 illustrates a schematic block diagram of an encoding apparatus encoding a video signal according to an embodiment of the present disclosure. An encoding apparatus 100 of FIG. 2 may correspond to the encoding apparatus 12 of FIG. 1.

An image partitioning module 110 may partition an input image (or a picture or a frame) input to the encoding apparatus 100 into one or more processing units. For example, the processing unit may be called a coding unit (CU). In this case, the coding unit may be recursively partitioned from a coding tree unit (CTU) or a largest coding unit (LCU) according to a quad-tree binary-tree (QTBT) structure. For example, one coding unit may be partitioned into a plurality of coding units with a deeper depth based on the quad-tree structure and/or the binary tree structure. In this case, for example, the quad-tree structure may be first applied, and then the binary tree structure may be applied. Alternatively, the binary tree structure may be first applied. A coding procedure according to an embodiment of the present disclosure may be performed based on a final coding unit that is no longer partitioned. In this case, a largest coding unit may be directly used as the final coding unit based on coding efficiency according to image characteristics. Alternatively, the coding unit may be recursively partitioned into coding units with a deeper depth, and thus a coding unit with an optimal size may be used as the final coding unit, if necessary or desired. Here, the coding procedure may include procedures such as prediction, transform and reconstruction which will be described later. As another example, the processing unit may further include a prediction unit (PU) or a transform unit (TU). In this case, the prediction unit and the transform unit may be partitioned from the above-described coding unit. The prediction unit may be a unit of sample prediction, and the transform unit may be a unit of deriving a transform coefficient or a unit of deriving a residual signal from a transform coefficient.

The term 'unit' used in the present disclosure may be interchangeably used with the term 'block' or 'area', if necessary or desired. In the present disclosure, an M×N block may represent a set of samples or transform coefficients consisting of M columns and N rows. A sample may generally represent a pixel or a pixel value, and may represent a pixel/pixel value of a luma component or represent a pixel/pixel value of a chroma component. The sample may be used as a term for corresponding one picture (or image) to a pixel or a pel.

The encoding apparatus 100 may subtract a predicted signal (a predicted block or a predicted sample array) output from an inter-prediction module 180 or an intra-prediction module 185 from an input video signal (an original block or an original sample array) to generate a residual signal (a residual block or a residual sample array). The generated residual signal may be transmitted to the transform module 120. In this case, as shown, a unit which subtracts the predicted signal (predicted block or predicted sample array) from the input video signal (original block or original sample array) in the encoding apparatus 100 may be called a subtraction module 115. A prediction module may perform prediction on a processing target block (hereinafter, referred to as a current block) and generate a predicted block including predicted samples for the current block. The prediction module may determine whether to apply intra-prediction or inter-prediction on a per CU basis. The prediction module may generate various types of information on prediction, such as prediction mode information, and transmit the information on prediction to an entropy encoding module 190 as described later in description of each prediction mode. The information on prediction may be encoded in the entropy encoding module 190 and output in the form of a bitstream.

The intra-prediction module 185 may predict the current block with reference to samples in a current picture. Referred samples may neighbor the current block or may be separated therefrom according to a prediction mode. In intra-prediction, prediction modes may include a plurality of nondirectional modes and a plurality of directional modes. The nondirectional modes may include, for example, a DC mode and a planar mode. The directional modes may include, for example, 33 directional prediction modes or 65 directional prediction modes according to a degree of minuteness of prediction direction. However, this is merely an example, and a number of directional prediction modes equal to or greater than 65 or equal to or less than 33 may be used according to settings. The intra-prediction module 185 may determine a prediction mode to be applied to the current block using a prediction mode applied to neighbor blocks.

The inter-prediction module 180 may derive a predicted block for the current block based on a reference block (reference sample array) specified by a motion vector on a reference picture. To reduce an amount of motion information transmitted in an inter-prediction mode, the inter-prediction module 180 may predict motion information based on correlation of motion information between a neighboring block and the current block on a per block, subblock or sample basis. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU), and the reference picture including the temporal neighboring block may be called a collocated picture (colPic). For example, the inter-prediction module 180 may construct a motion information candidate list based on motion information of neighboring blocks and generate information indicating which candidate is used to derive a motion vector and/or a reference picture index of the current block. The inter-prediction may be performed based on various prediction modes. For example, in the case of a skip mode and a merge mode, the inter-prediction module 180 may use motion information of a neighboring block as motion information of the current block. In the skip mode, a residual signal is not be transmitted, unlike the merge mode. In a motion vector prediction (MVP) mode, the motion vector of the current block may be indicated by using a motion vector of a neighboring block as a motion vector predictor and signaling a motion vector difference (MVD).

A predicted signal generated by the inter-prediction module 180 or the intra-prediction module 185 may be used to generate a reconstructed signal or a residual signal.

The transform module 120 may apply a transform technique to a residual signal to generate transform coefficients. For example, the transform technique may include at least one of discrete cosine transform (DCT), discrete sine transform (DST), Karhunen-Loeve transform (KLT), graph-based transform (GBT), and conditionally non-linear transform (CNT). The GBT refers to transform obtained from a graph representing information on a relationship between pixels. The CNT refers to transform obtained based on a predicted signal generated using all previously reconstructed pixels. Further, the transform process may be applied to square pixel blocks with the same size, or applied to non-square blocks or blocks with variable sizes.

A quantization module 130 may quantize transform coefficients and transmit the quantized transform coefficients to the entropy encoding module 190. The entropy encoding module 190 may encode a quantized signal (information on the quantized transform coefficients) and output the encoded signal as a bitstream. The information on the quantized transform coefficients may be called residual information. The quantization module 130 may rearrange the quantized transform coefficients of the block form in the form of one-dimensional (1D) vector based on a coefficient scan order and generate information about the quantized transform coefficients based on characteristics of the quantized transform coefficients of the one-dimensional vector form. The entropy encoding module 190 may perform various encoding schemes such as exponential Golomb, context-adaptive variable length coding (CAVLC), and context-adaptive binary arithmetic coding (CABAC). The entropy encoding module 190 may encode information necessary for video/image reconstruction (e.g., values of syntax elements) along with or separately from the quantized transform coefficients. Encoded information (e.g., video/image information) may be transmitted or stored in the form of a bitstream in network abstraction layer (NAL) unit. The bitstream may be transmitted through a network or stored in a digital storage medium. Here, the network may include a broadcast network and/or a communication network, and the digital storage medium may include various storage media such as USB, SD, CD, DVD, Blueray, HDD and SSD. A transmitter (not shown) which transmits the signal output from the entropy encoding module 190 and/or a storage (not shown) which stores the signal may be configured as internal/external elements of the encoding apparatus 100, or the transmitter may be a component of the entropy encoding module 190.

The quantized transform coefficients output from the quantization module 130 may be used to generate a reconstructed signal. For example, a residual signal can be reconstructed by applying dequantization and inverse transform to the quantized transform coefficients through a dequantization module 140 and an inverse transform module 150 in the loop. An addition module 155 may add the reconstructed residual signal to the predicted signal output from the inter-prediction module 180 or the intra-prediction module 185 to generate a reconstructed signal (reconstructed picture, reconstructed block or reconstructed sample array). When there is no residual signal for a processing target block as in a case in which the skip mode is applied, a predicted block may be used as a reconstructed block. The addition module 155 may also be called a reconstruction unit or a reconstructed block generator. The generated reconstructed signal can be used for intra-prediction of the next processing target block in the current picture or used for inter-prediction of the next picture through filtering which will be described later.

A filtering module 160 can improve subjective/objective picture quality by applying filtering to the reconstructed signal. For example, the filtering module 160 may generate a modified reconstructed picture by applying various filtering methods to the reconstructed picture and transmit the modified reconstructed picture to a decoded picture buffer (DBP) 170. Examples of the various filtering methods may include deblocking filtering, sample adaptive offset (SAO), adaptive loop filtering (ALF), and bilateral filtering. The filtering module 160 may generate information on filtering and transmit the information on filtering to the entropy encoding module 190 as will be described later in description of each filtering method. The information on filtering may be output in the form of a bitstream through entropy encoding in the entropy encoding module 190.

The modified reconstructed picture transmitted to the decoded picture buffer 170 may be used as a reference picture in the inter-prediction module 180. When inter-prediction is applied, the encoding apparatus 100 can avoid mismatch between the encoding apparatus 100 and the decoding apparatus 200 using the modified reconstructed picture and improve encoding efficiency. The decoded picture buffer 170 may store the modified reconstructed picture such that the modified reconstructed picture is used as a reference picture in the inter-prediction module 180.

Figure 3:
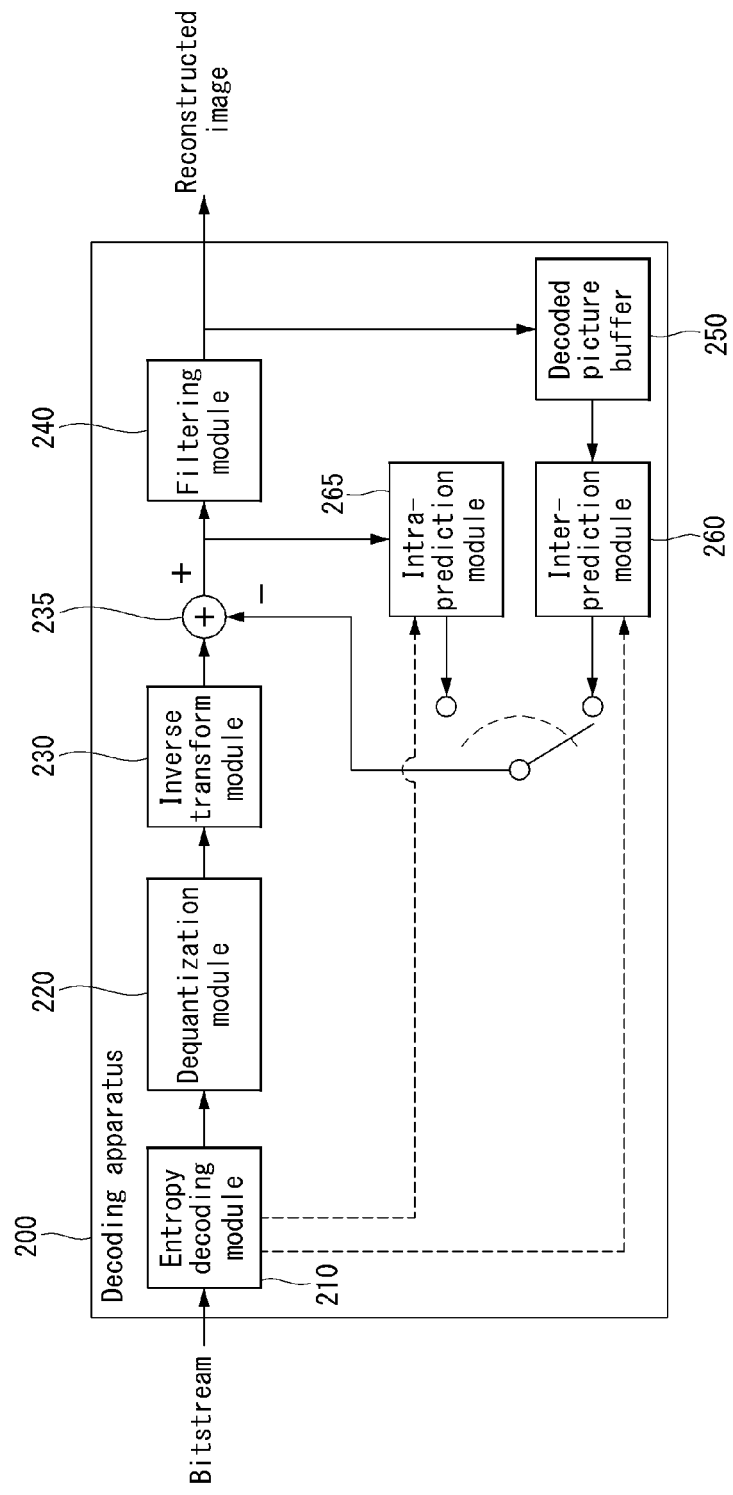
FIG. 3 is a schematic block diagram of a decoding apparatus which decodes image signals as an embodiment to which the present disclosure is applied.

FIG. 3 is a schematic block diagram of a decoding apparatus which performs decoding of a video signal according to an embodiment of the present disclosure. The decoding apparatus 200 of FIG. 3 corresponds to the decoding apparatus 22 of FIG. 1.

Referring to FIG. 3, the decoding apparatus 200 may include an entropy decoding module 210, a dequantization module 220, an inverse transform module 230, an addition module 235, a filtering module 240, a decoded picture buffer (DPB) 250, an inter-prediction module 260, and an intra-prediction module 265. The inter-prediction module 260 and the intra-prediction module 265 may be collectively called a prediction module. That is, the prediction module may include the inter-prediction module 180 and the intra-prediction module 185. The dequantization module 220 and the inverse transform module 230 may be collectively called a residual processing module. That is, the residual processing module may include the dequantization module 220 and the inverse transform module 230. In some embodiments, the entropy decoding module 210, the dequantization module 220, the inverse transform module 230, the addition module 235, the filtering module 240, the inter-prediction module 260, and the intra-prediction module 265 described above may be configured as a single hardware component (e.g., a decoder or a processor). In some embodiments, the decoded picture buffer 250 may be configured as a single hardware component (e.g., a memory or a digital storage medium).

When a bitstream including video/image information is input, the decoding apparatus 200 may reconstruct an image through a process corresponding to the process of processing the video/image information in the encoding apparatus 100 of FIG. 2. For example, the decoding apparatus 200 may perform decoding using a processing unit applied in the encoding apparatus 100. Thus, a processing unit upon the decoding may be a coding unit, for example, and the coding unit may be partitioned from a coding tree unit or a largest coding unit according to a quadtree structure and/or a binary tree structure. In addition, a reconstructed video signal decoded and output by the decoding apparatus 200 may be reproduced through a reproduction apparatus.

The decoding apparatus 200 may receive a signal output from the encoding apparatus 100 of FIG. 2 in the form of a bitstream, and the received signal may be decoded through the entropy decoding module 210. For example, the entropy decoding module 210 may parse the bitstream to derive information (e.g., video/image information) necessary for image reconstruction (or picture reconstruction). For example, the entropy decoding module 210 may obtain information in the bitstream using a coding scheme such as exponential Golomb, CAVLC or CABAC, and output a syntax element value necessary for image reconstruction and a quantized value of transform coefficients for residual. More specifically, the CABAC entropy decoding method may receive a bin corresponding to each syntax element in the bitstream, determine a context model using decoding target syntax element information and decoding information of neighboring and decoding target blocks or information on symbols/bins decoded in a previous stage, predict the probability of generation of the bin according to the determined context model, and perform arithmetic decoding of bins to thereby generate a symbol corresponding to each syntax element value. The CABAC entropy decoding method can update the context model using information on symbols/bins decoded for the next symbol/bin context model after the context model is determined. Information about prediction among the information decoded in the entropy decoding module 210 may be provided to the prediction module (the inter-prediction module 260 and the intra-prediction module 265), and residual values, on which entropy decoding has been performed in the entropy decoding module 210, that is, quantized transform coefficients and related parameter information may be input to the dequantization module 220. Further, information on filtering among the information decoded in the entropy decoding module 210 may be provided to the filtering module 240. A receiver (not shown) receiving a signal output from the encoding apparatus 100 may be additionally configured as an internal/external element of the decoding apparatus 200, or the receiver may be a component of the entropy decoding module 210.

The dequantization module 220 may output transform coefficients through dequantization of the quantized transform coefficients. The dequantization module 220 may rearrange the quantized transform coefficients in the form of a two-dimensional (2D) block. In this case, rearrangement may be performed based on the coefficient scan order performed in the encoding apparatus 100. The dequantization module 220 may perform dequantization on the quantized transform coefficients using a quantization parameter (e.g., quantization step size information) and obtain transform coefficients.

The inverse transform module 230 inversely transforms the transform coefficients to obtain a residual signal (residual block or residual sample array).

The prediction module may perform prediction on a current block and generate a predicted block including predicted samples for the current block. The prediction module may determine whether intra-prediction or inter-prediction is applied to the current block based on information on prediction output from the entropy decoding module 210, and determine a specific intra/inter-prediction mode.

The intra-prediction module 265 may predict the current block with reference to samples in a current picture. The referred samples may neighbor the current block or may be separated from the current block according to a prediction mode. In intra-prediction, prediction modes may include a plurality of nondirectional modes and a plurality of directional modes. The intra-prediction 265 may determine a prediction mode applied to the current block using a prediction mode applied to neighboring blocks.

The inter-prediction module 260 may derive a predicted block for the current block based on a reference block (reference sample array) specified by a motion vector on a reference picture. To reduce an amount of motion information transmitted in the inter-prediction mode, the motion information may be predicted based on correlation of motion information between a neighboring block and the current block on a per block, subblock or sample basis. The motion information may include a motion vector and a reference picture index. The motion information may further include inter-prediction direction (L0 prediction, L1 prediction, Bi prediction) information. In the case of inter-prediction, the neighboring blocks may include a spatial neighboring block present in a current picture and a temporal neighboring block present in a reference picture. For example, the inter-prediction module 260 may construct a motion information candidate list based on neighboring blocks and derive the motion vector and/or the reference picture index of the current block based on received candidate selection information. The inter-prediction may be performed based on various prediction modes, and information on prediction may include information indicating the inter-prediction mode for the current block.

The addition module 235 can generate a reconstructed signal (reconstructed picture, reconstructed block or reconstructed sample array) by adding the obtained residual signal to the predicted signal (predicted block or predicted sample array) output from the inter-prediction module 260 or the intra-prediction module 265. When there is no residual for the processing target block as in a case in which the skip mode is applied, the predicted block may be used as a reconstructed block.

The addition module 235 may also be called a reconstruction unit or a reconstructed block generator. The generated reconstructed signal may be used for intra-prediction of a next processing target block in the current picture or used for inter-prediction of a next picture through filtering which will be described later.

The filtering module 240 can improve subjective/objective picture quality by applying filtering to the reconstructed signal. For example, the filtering module 240 may generate a modified reconstructed picture by applying various filtering methods to the reconstructed picture, and transmit the modified reconstructed picture to a decoded picture buffer 250. Examples of the various filtering methods may include deblocking filtering, sample adaptive offset, adaptive loop filtering, and bilateral filtering.

The modified reconstructed picture transmitted to the decoded picture buffer 250 may be used as a reference picture by the inter-prediction module 260.

In the present disclosure, implementations described in the filtering module 160, the inter-prediction module 180, and the intra-prediction module 185 of the encoding apparatus 100 can be applied to the filtering module 240, the inter-prediction module 260 and the intra-prediction module 265 of the decoding apparatus equally or in a corresponding manner.

Figure 4:
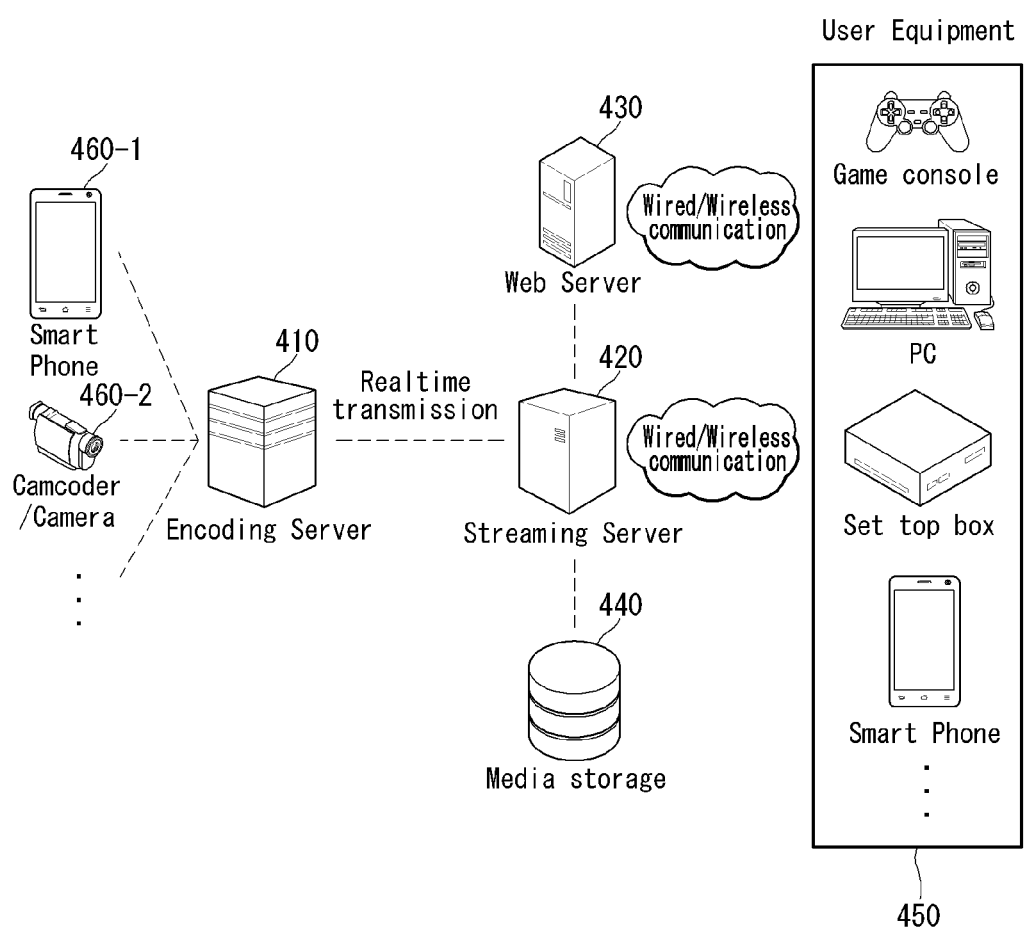
FIG. 4 is a configuration diagram of a content streaming system an embodiment to which the present disclosure is applied.

FIG. 4 is a configuration diagram of a content streaming system according to an embodiment of the present disclosure.

A content streaming system to which an embodiment of the present disclosure is applied may roughly include an encoding server 410, a streaming server 420, a web server 430, a media storage 440, a user equipment 450, and a multimedia input device 460.

The encoding server 410 compresses content input from a multimedia input device 460 such as a smartphone, a camera, and a camcorder into digital data to generate a bitstream, and transmits the generated bitstream to the streaming server 420. As another example, when the multimedia input device 460 such as a smartphone, a camera and a camcorder directly generates the bitstream, the encoding server 410 may be omitted.

The bitstream may be generated by an encoding method or a bitstream generation method to which an embodiment of the present disclosure is applied, and the streaming server 420 may temporarily store the bitstream in the process of transmitting or receiving the bitstream.

The streaming server 420 transmits multimedia data to the user equipment 450 based on a user request via the web server 430, and the web server 430 serves as a medium that informs a user of types of services. If the user sends a request for a desired service to the web server 430, the web server 430 sends information on the requested service to the streaming server 420, and the streaming server 420 transmits multimedia data to the user. The content streaming system may include a separate control server, and in this case, the control server serves to control commands/responses between the respective devices in the content streaming system.

The streaming server 420 may receive content from the media storage 440 and/or the encoding server 410. For example, if content is received from the encoding server 410, the streaming server 420 may receive the content in real time. In this case, the streaming server 420 may store a bitstream for a predetermined time in order to provide a smooth streaming service.

Examples of the user equipment 450 may include a cellular phone, a smartphone, a laptop computer, a digital broadcast terminal, a personal digital assistant (PDA), a portable multimedia player (PMP), a navigation, a slate PC, a tablet PC, an ultrabook, a wearable device (e.g., a smartwatch, a smart glass, and a head mounted display (HMD)), a digital TV, a desktop computer, and a digital signage.

Each server in the content streaming system may be operated as a distributed server, and in this case, data received by each server may be distributed and processed.

Figure 5A:
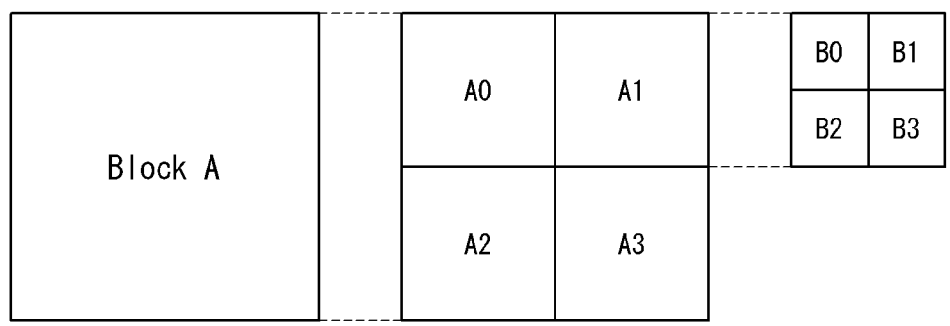
FIGS. 5*a* to 5*d* show embodiments to which the present disclosure is applicable.
Figure 5B:
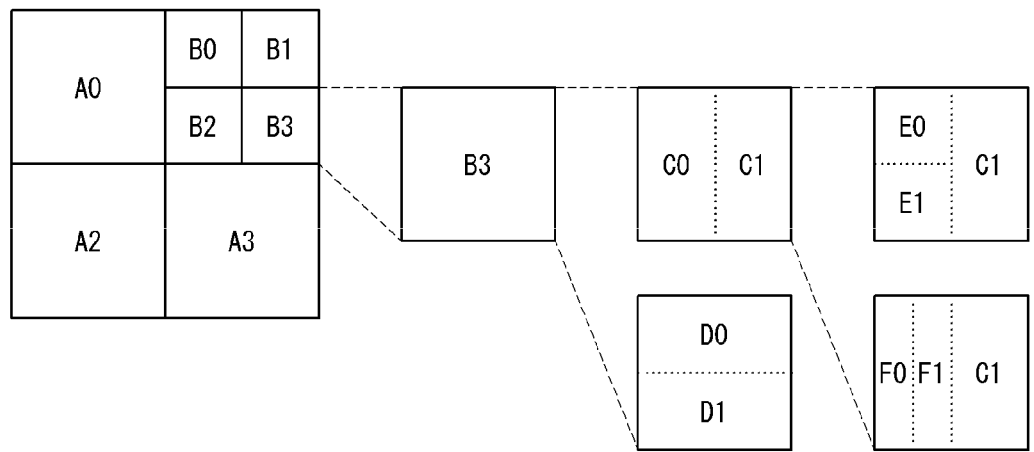
Figure 5C:
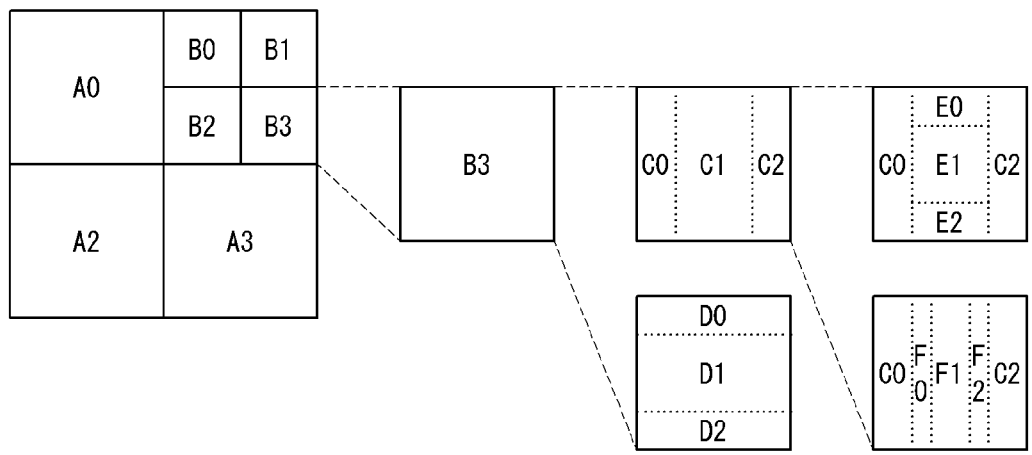
Figure 5D:
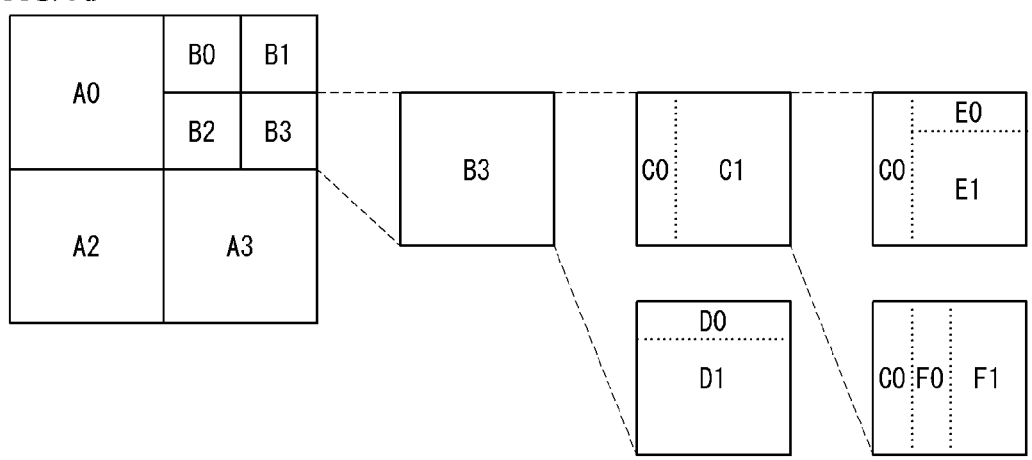

FIG. 5a to 5d illustrate examples of a block partitioning structure according to an embodiment of the present disclosure. More particularly, FIG. 5a illustrates an example of a block partitioning structure according to quadtree (QT), FIG. 5b illustrates an example of a block partitioning structure according to binary tree (BT), FIG. 5c illustrates an example of a block partitioning structure according to ternary tree (TT), and FIG. 5d illustrates an example of a block partitioning structure according to asymmetric tree (AT).

In the video coding system, one block may be partitioned based on a QT partitioning scheme. One subblock partitioned using the QT partitioning scheme may be further recursively partitioned according to the QT partitioning scheme. A leaf block that is no longer partitioned by the QT partitioning scheme may be partitioned using at least one of BT, TT, or AT partitioning scheme. BT may have two types of partitions such as horizontal BT (2N×N, 2N×N) and vertical BT (N×2N, N×2N). TT may have two types of partitions such as horizontal TT (2N×½N, 2N×N, 2N×½N) and vertical TT (½N×2N, N×2N, ½N×2N). AT may have four types of partitions such as horizontal-up AT (2N×½N, 2N×³⁄₂N), horizontal-down AT (2N×³⁄₂N, 2N×½N), vertical-left AT (½N×2N, ³⁄₂N×2N), and vertical-right AT (³⁄₂N×2N, ½N×2N). Each of BT, TT and AT may be further recursively partitioned using BT, TT and AT.

FIG. 5a illustrates an example of QT partition. A block A may be partitioned into four subblocks A0, A1, A2 and A3 by QT. The subblock A1 may be further partitioned into four subblocks B0, B1, B2 and B3 by QT.

FIG. 5b illustrates an example of BT partition. The block B3 that is no longer partitioned by QT may be partitioned by vertical BT (C0, C1) or horizontal BT (D0, D1). Each subblock such as the block C0 may be further recursively partitioned as in the form of horizontal BT (E0, E1) or vertical BT (F0, F1).

FIG. 5c illustrates an example of TT partition. The block B3 that is no longer partitioned by QT may be partitioned into vertical TT (C0, C1, C2) or horizontal TT (D0, D1, D2). Each subblock such as the block C1 may be further recursively partitioned as in the form of horizontal TT (E0, E1, E2) or vertical TT (F0, F1, F2).

FIG. 5d illustrates an example of AT partition. The block B3 that is no longer partitioned by QT may be partitioned into vertical AT (C0, C1) or horizontal AT (D0, D1). Each subblock such as the block C1 may be further recursively partitioned as in the form of horizontal AT (E0, E1) or vertical TT (F0, F1).

BT, TT and AT partitions may be applied to one block together. For example, a subblock partitioned by BT may be partitioned by TT or AT. Further, a subblock partitioned by TT may be partitioned by BT or AT. A subblock partitioned by AT may be partitioned by BT or TT. For example, after horizontal BT partition, each subblock may be partitioned by vertical BT. After vertical BT partition, each subblock may also be partitioned by horizontal BT. In this case, partition orders are different, but finally partitioned shapes are the same.

If a block is partitioned, a block search order may be variously defined. In general, search is performed from left to right and from top to bottom, and searching the block may mean the order of determining whether each partitioned subblock is additionally partitioned, or mean an encoding order of each subblock when the block is no longer partitioned, or mean a search order when a subblock refers to information of other neighboring block.

The transform may be performed per processing unit (or transform block) partitioned by the partition structures as illustrated in FIGS. 5a to 5d, and in particular, a transform matrix may be applied by performing the partition in a row direction and a column direction. According to an embodiment of the present disclosure, different transform types may be used depending on a length of the processing unit (or transform block) in the row direction or the column direction.

The transform is applied to residual blocks, and this is to decorrelate the residual blocks as much as possible, concentrate coefficients at a low frequency, and generate a zero tail at an end of a block. A transform scheme according to an embodiment of the present disclosure may include two stage of transforms (primary transform and secondary transform). The primary transform (or core transform) may be composed of DCT or DST transform families applied to all rows and columns of a residual block. Thereafter, the secondary transform may be additionally applied to a top left corner of an output of the core transform. Similarly, an inverse transform may be applied in the order of an inverse secondary transform and an inverse core transform. The inverse secondary transform may be first applied to a top left corner of a coefficient block. Then, the inverse core transform may be applied to the output of the inverse secondary transform.

Figure 6:
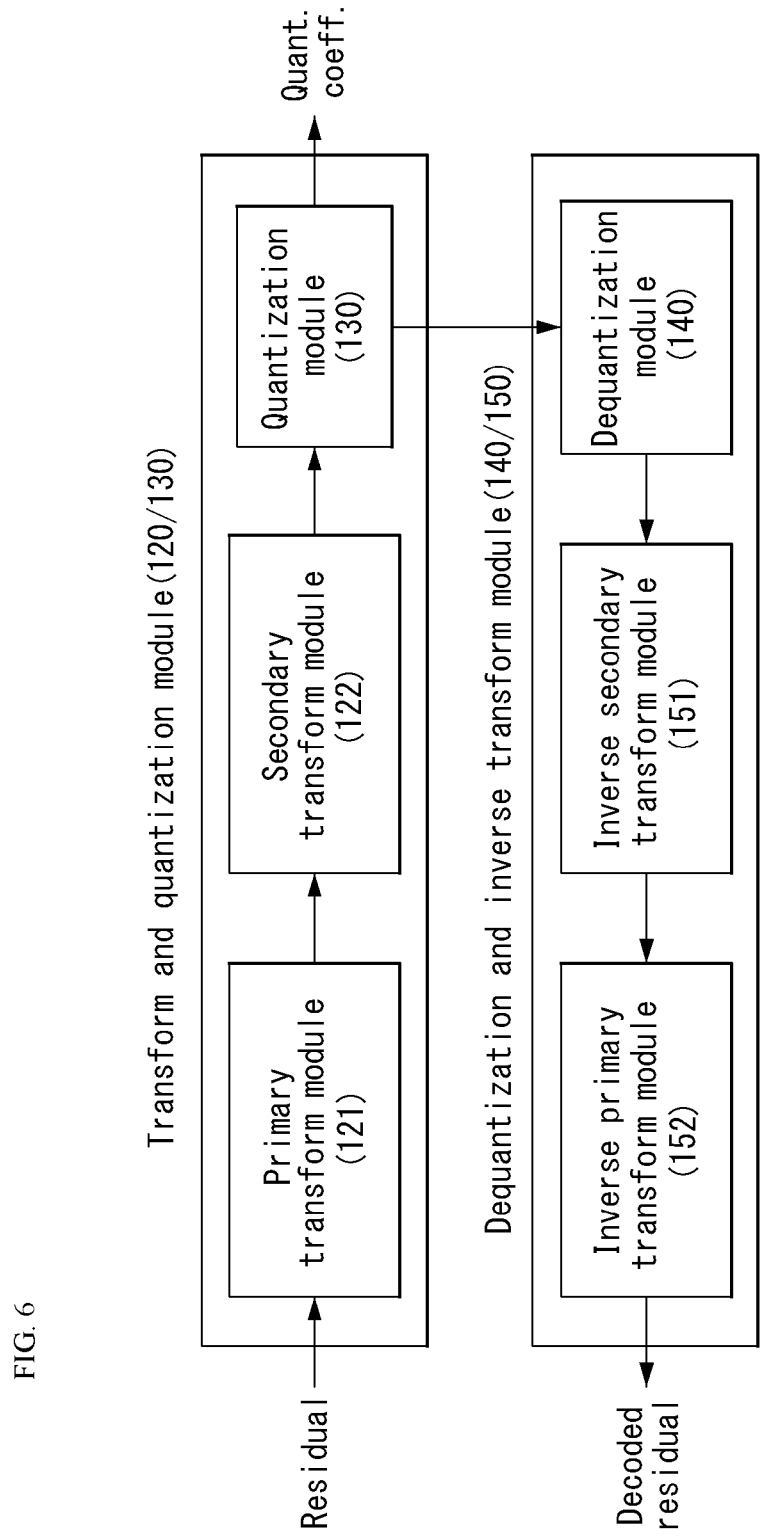
FIG. 6 is a schematic block diagram of a transform and quantization unit, and a dequantization and inverse transform unit in an encoding apparatus.
Figure 7:
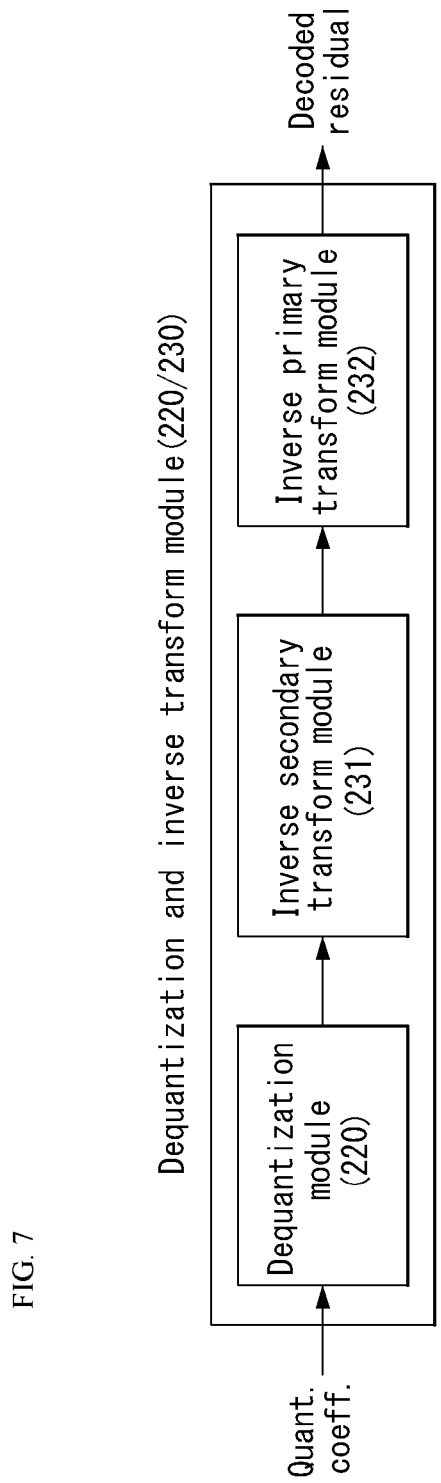
FIG. 7 is a schematic block diagram of a dequantization and inverse transform unit in a decoding apparatus.

FIG. 6 is a schematic block diagram of the transform and quantization module 120/130 and the dequantization and inverse transform module 140/150 in the encoding apparatus 100 illustrated in FIG. 2, and FIG. 7 is a schematic block diagram of the dequantization and inverse transform module 220/230 in the decoding apparatus 200.

Referring to FIG. 6, the transform and quantization module 120/130 may include a primary transform module 121, a secondary transform module 122, and a quantization module 130. The dequantization and inverse transform module 140/150 may include a dequantization module 140, an inverse secondary transform module 151, and an inverse primary transform module 152.

Referring to FIG. 7, the dequantization and inverse transform module 220/230 may include a dequantization module 220, an inverse secondary transform module 231, and an inverse primary transform module 232. According to an embodiment of the present disclosure, a transform may be performed through a plurality of stages. For example, as illustrated in FIG. 6, two states of a primary transform and a secondary transform may be applied, or more than two transform stages may be used according to algorithms. As described above, the primary transform may be referred to as a core transform.

The primary transform module 121 may apply the primary transform to a residual signal, and the primary transform may be predefined as a table in an encoder and/or a decoder. The secondary transform module 122 may apply the secondary transform to a primarily transformed signal, and the secondary transform may be predefined as a table in the encoder and/or the decoder.

In an embodiment, a non-separable transform may be conditionally applied as the secondary transform. For example, the secondary transform may be applied only to the case of intra-prediction blocks, and may have an applicable transform set for each prediction mode group.

The prediction mode group may be set based on symmetry with respect to a prediction direction. For example, since prediction mode 52 and prediction mode 16 are symmetrical based on prediction mode 34 (diagonal direction), one group may be formed and the same transform set may be applied thereto. When transform for prediction mode 52 is applied, transposed input data is applied, and this is because a transform set of prediction mode 52 is the same as that of prediction mode 16.

In the planar mode and the DC mode, since there is no symmetry with respect to the direction, a different transform set is applied, and a corresponding transform set may include two transforms. Each transform set may include three transforms in remaining directional modes.

The quantization module 130 may perform quantization on a secondarily transformed signal. The dequantization and inverse transform module 140/150 performs the reverse of the aforementioned procedure, and redundant description is omitted.

FIG. 7 is a schematic block diagram of the dequantization and inverse transform module 220/230 in the decoding apparatus 200. Referring to FIG. 7, the dequantization and inverse transform module 220/230 may include the dequantization module 220, the inverse secondary transform module 231, and the inverse primary transform module 232.

The dequantization module 220 obtains transform coefficients from an entropy-decoded signal using quantization step size information. The inverse secondary transform module 231 performs an inverse secondary transform on the transform coefficients. Here, the inverse secondary transform refers to an inverse transform of the secondary transform described with reference to FIG. 6. The inverse primary transform module 232 performs an inverse primary transform on the inversely secondarily transformed signal (or block) and obtains a residual signal. Here, the inverse primary transform refers to an inverse transform of the primary transform described with reference to FIG. 6.

Figure 8:
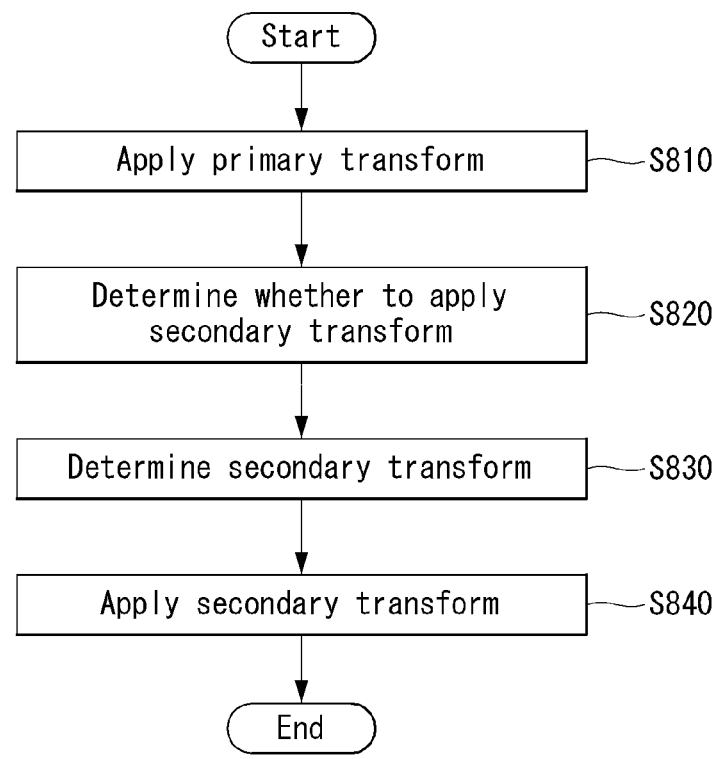
FIG. 8 illustrates an example of a flow chart for a transform when encoding a video signal according to an embodiment of the present disclosure.

FIG. 8 illustrates an example of a flow chart for a transform when encoding a video signal according to an embodiment of the present disclosure.

In step S810, the encoding apparatus 100 performs a primary transform on a residual block. The primary transform may be referred to as a core transform. In an embodiment, the encoding apparatus 100 may perform a primary transform using a transform kernel determined depending on multiple transform selection (MTS) to be described later. Further, the encoding apparatus 100 may transmit, to the decoding apparatus 200, an MTS index indicating a specific MTS among MTS candidates. The MTS candidates may be determined based on an intra-prediction mode of a current block. The encoding apparatus 100 may transmit residual data in a state of omitting a transform. If the transform is omitted, the encoding apparatus 100 may encode a syntax element (e.g., transform skip flag) indicating that the transform is omitted, and include the corresponding syntax element in a bitstream.

The encoding apparatus 100 determines whether to apply a secondary transform, in S820. For example, the encoding apparatus 100 may determine whether the secondary transform is applied to a primarily transformed residual transform coefficient. For example, the secondary transform is a non-separable transform applied to coefficients located in a top left area (e.g., 4×4 or 8×8 top left area) in a block, and may be referred to a low frequency non-separable transform (LFNST). The secondary transform may be applied to a block to which an intra-prediction is applied.

The encoding apparatus 100 determines the secondary transform, in S830. The encoding apparatus 100 determines the secondary transform based on a secondary transform set designated depending on the intra-prediction mode. Before the step S830, the encoding apparatus 100 may determine an area, to which the secondary transform is applied based on a size of the current block, and an output size according to the transform. The encoding apparatus 100 performs the secondary transform using the secondary transform determined in the step S830, in S840.

Figure 9:
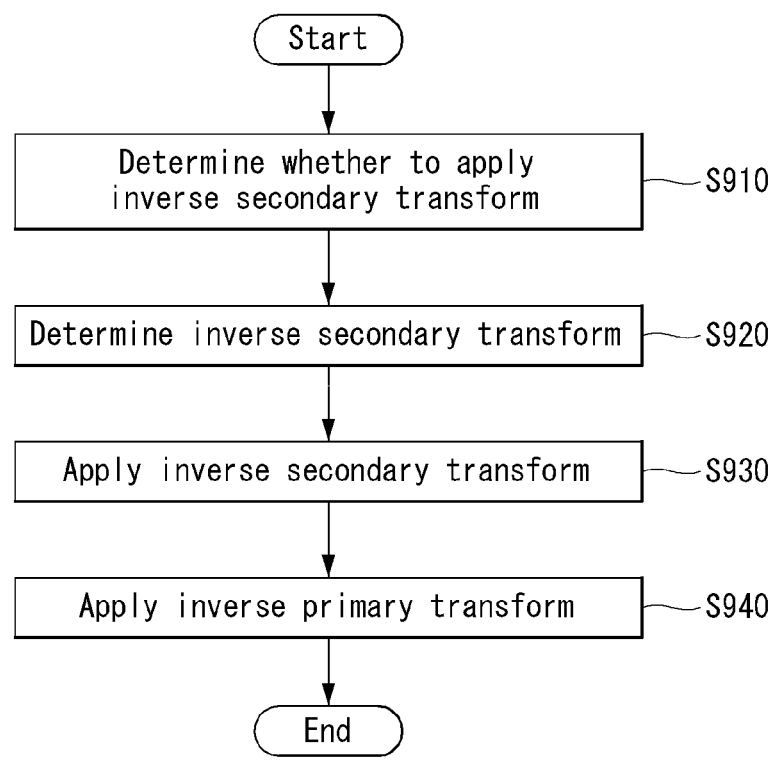
FIG. 9 illustrates an example of a flow chart for a transform in a decoding process of a video signal according to an embodiment of the present disclosure.

FIG. 9 illustrates an example of a flow chart for a transform in a decoding process of a video signal according to an embodiment of the present disclosure.

The decoding apparatus 200 determines whether to apply an inverse secondary transform, in S910. For example, the inverse secondary transform may be a non-separable transform applied for a top left area (e.g., 4×4 or 8×8 top left area) of a block including transform coefficients. For example, the decoding apparatus 200 may determine whether to apply the inverse secondary transform based on a syntax element (e.g., secondary transform flag) indicating whether to apply the secondary transform from the encoding apparatus 100.

The decoding apparatus 200 determines the inverse secondary transform, in S920. The decoding apparatus 200 may determine the inverse secondary transform applied to a current block based on a transform set designated depending on an intra-prediction mode. Before the step S920, the decoding apparatus 200 may determine an area to which the inverse secondary transform is applied based on a size of the current block. The decoding apparatus 200 performs the inverse secondary transform on a dequantized residual block using the inverse secondary transform determined in the step S920, in S930.

The decoding apparatus 200 performs an inverse primary transform on an inverse secondary transformed residual block, in S940. The inverse primary transform may be referred to as an inverse core transform. In an embodiment, the decoding apparatus 200 may perform the inverse primary transform using a transform kernel determined depending on MTS to be described later. Before the step S940, the decoding apparatus 200 may determine whether the MTS is applied to the current block. In this case, a step of determining whether the MTS is applied may be further included in the flow chart of the decoding illustrated in FIG. 9.

In an embodiment, if the MTS is applied to the current block (e.g., if a MTS flag of a CU level is 1), the decoding apparatus 200 may construct MTS candidates based on the intra-prediction mode of the current block. In this case, a step of constructing the MTS candidates may be further included in the flow chart of the decoding illustrated in FIG. 9. The decoding apparatus 200 may determine the inverse primary transform applied to the current block using an index indicating a specific MTS among the constructed MTS candidates. The decoding apparatus 200 may determine a transform kernel corresponding to the MTS index with reference to a table defining a relationship between the MTS index and the transform kernel.

In addition to DCT-2 and 4×4 DST-7 applied to HEVC, an adaptive (or explicit) multiple transform selection (MTS) scheme may be used for residual coding for inter- and intra-coded blocks. The MTS may be referred to as an adaptive multiple transform (AMT) or an explicit multiple transform (EMT). For example, as a transform according to an embodiment of the present disclosure, transforms selected from DCT/DST families may be used. For example, additional matrixes other than DCT-2 may include DST-7, DCT-8, DST-1, and DCT-5. The following Table 1 represents basic functions of selected DST/DCT.

TABLE 1

| Transform Type | Basis function $T_i(j)$, $i, j = 0, 1, \ldots, N - 1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |

TABLE 1-continued

| Transform Type | Basis function $T_i(j)$, $i, j = 0, 1, \ldots, N - 1$ |
|---|---|
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

The MTS may be applied to CUs having a width and a height that are less than or equal to 64, and whether the MTS is applied may be controlled by a flag of a per CU basis (e.g., cu_mts_flag). If a CU level flag is 0, DCT-2 is applied to the CU in order to encode a residue. A luma coding block in the CU to which the MTS is applied may be signaled in order to identify horizontal and vertical transforms in which two additional flags will be used. If a transform skip mode is applied, a transform for residual samples of the block may be omitted. For coding (intra-residual coding) of the residual samples to which intra-prediction is applied, a mode-dependent transform candidate selection process may be used. Three transform subsets may be defined as in the following Table 2, and a transform subset may be selected based on an intra-prediction mode as shown in Table 3 below.

TABLE 2

| Transform Set | Transform Candidates |
|---|---|
| 0 | DST-VII, DCT-VIII |
| 1 | DST-VII, DST-I |
| 2 | DST-VII, DCT-VIII |

Along with a subset concept, a transform subset is initially confirmed based on Table 2 by using the intra-prediction mode of a CU having a CU-level MTS flag of 1. Thereafter, for each of a horizontal transform (indicated by EMT_TU_horizontal_flag) and a vertical transform (indicated by EMT_TU_vertical_flag), one of two transform candidates in the confirmed transform subset may be selected based on explicit signaling using flags according to Table 3.

TABLE 3

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

TABLE 3-continued

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

In Table 3, 'Intra Mode' denotes the intra-prediction mode (67 mode basis) applied to the CU, 'V' denotes an index indicating a transform set for a vertical transform, and 'H' denotes an index indicating a transform set for a horizontal transform. As shown in Table 3, a transform set that can be applied per intra-prediction mode is configured, and EMT_TU_horizontal_flag/EMT_TU_vertical_flag indicates a transform kernel for horizontal/vertical transform in each horizontal/vertical transform set among transform candidates (Table 2) constituting horizontal/vertical transform sets (H/V) corresponding to the prediction mode.

TABLE 4

| Configuration group | | Horizontal (row) transform | Horizontal (column) transform | 35 Intra Prediction modes | 67 Intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 54, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

Table 4 illustrates an example of a transform configuration group, to which MTS is applied, as an embodiment to which the present disclosure is applied.

Referring to Table 4, transform configuration groups may be determined based on a prediction mode, and the number of groups may be 6 (G0 to G5). In addition, G0 to G4 correspond to a case to which intra-prediction is applied, and G5 represents transform combinations (or transform set or transform combination set) applied to a residual block generated by inter-prediction.

One transform combination may consist of a horizontal transform (or row transform) applied to rows of a corresponding 2D block and a vertical transform (or column transform) applied to columns thereof.

Each of the transform configuration groups may have four transform combination candidates. The four transform combination candidates may be selected or determined using transform combination indexes 0 to 3, and a transform combination index may be encoded and transmitted from an encoder to a decoder.

In an embodiment, residual data (or residual signal) obtained through intra-prediction may have different statistical characteristics depending on the intra-prediction mode. Thus, as shown in Table 4, transforms other than a normal cosine transform (e.g., DCT-2) may be applied per intra-prediction. In the present disclosure, a transform type may be represented as DCT-Type 2, DCT-II, and DCT-2, for example.

Referring to Table 4, a case of using 35 intra-prediction modes and a case of using 67 intra-prediction modes are shown. A plurality of transform combinations may be applied for each transform configuration group divided from each intra-prediction mode column. For example, a plurality of transform combinations may consist of four transform combinations. As a specific example, DST-7 and DCT-5 can be applied to group 0 in both the row (horizontal) direction and the column (vertical) direction, and thus a total of four combinations can be applied.

Since a total of four transform kernel combinations can be applied to each intra-prediction mode, a transform combination index for selecting one from among them can be transmitted per transform unit. In the present disclosure, the transform combination index may be referred to as an MTS index and may be represented by mts_idx.

Furthermore, there may occur a case in which DCT-2 is optimal for both the row direction and the column direction due to characteristics of a residual signal, in addition to the transform kernels shown in Table 4. Thus, a transform can be adaptively applied by defining an MTS flag for each coding unit. If the MTS flag is 0, DCT-2 may be applied for both the row direction and the column direction, and if the MTS flag is 1, one of four combinations may be selected or determined through an MTS index.

In an embodiment, if the number of transform coefficients is less than a specific value (e.g., 3) for one transform unit even if the MTS flag is 1, the transform kernels of Table 4 is not applied and the same transform kernel (e.g., DST-7) may be applied for both the row direction and the column direction.

In an embodiment, if transform coefficient values are previously parsed and the number of transform coefficients is less than a specific value (e.g., 3), an MTS index is not parsed and a specific transform kernel (e.g., DST-7) may be applied. Hence, an amount of transmission of additional information can be reduced.

In an embodiment, MTS may be applied only if a width or a height of the transform unit is equal to or less than a reference size (e.g., 32), or MTS may be applied only when both the width and the height of the transform unit is equal to or less than the reference size (e.g., 32).

In an embodiment, the transform configuration groups as shown in Table 4 may be pre-configured through off-line training.

In an embodiment, the MTS index may be defined as one index that can simultaneously indicate a combination of the horizontal transform and the vertical transform. Further, the MTS index may be defined as each of a separate horizontal transform index and a separate vertical transform index.

Figure 10:
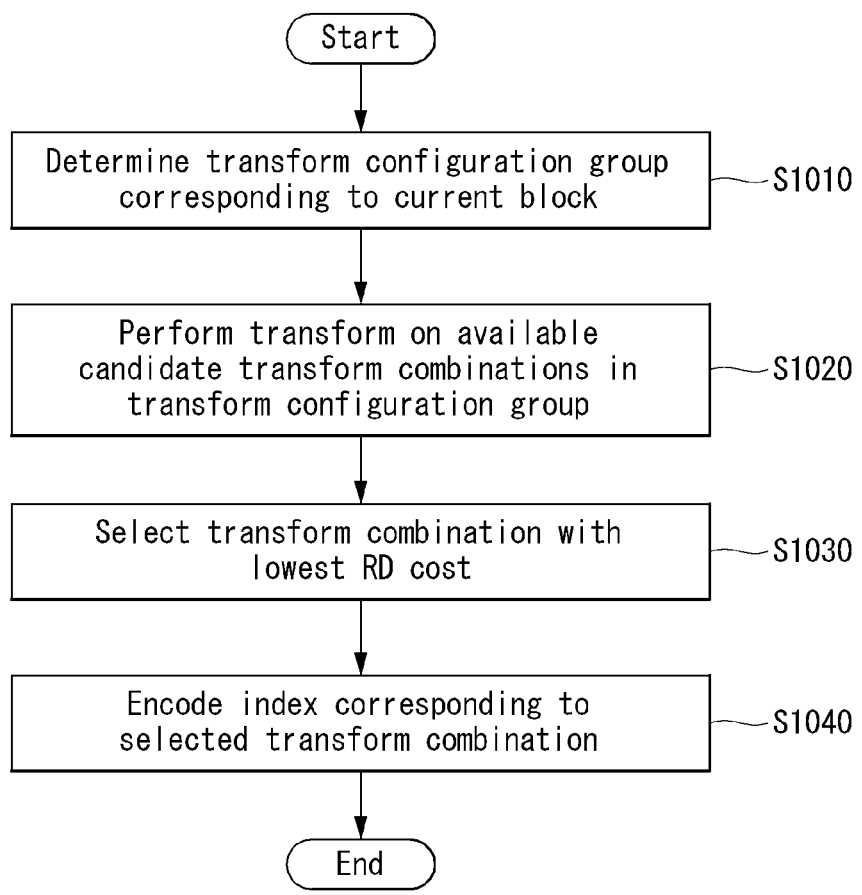
FIG. 10 illustrates an example of a flow chart for performing a transform through multiple transform selection in an encoding process of a video signal according to an embodiment of the present disclosure.

FIG. 10 illustrates an example of a flow chart for performing a transform through multiple transform selection in an encoding process of a video signal according to an embodiment of the present disclosure.

Although the present disclosure basically describes an embodiment for a separable transform in which a transform is applied by being separated in the horizontal direction and the vertical direction, a transform combination may consist of non-separable transforms.

Alternatively, a transform combination may be configured as a mixture of separable transforms and non-separable transforms. In this case, if the non-separable transform is used, transform selection per row/column or selection per the horizontal/vertical direction is unnecessary, and the transform combinations of Table 4 can be used only when separable transform is selected.

In addition, methods described in the present disclosure can be applied irrespective of the primary transform or the secondary transform. That is, there is no limit in which the methods shall be applied only to one of the two transforms, and the methods can be applied to all the two transforms. The primary transform may refer to a transform for first transforming a residual block, and the secondary transform may refer to a transform for applying a transform to a block generated as a result of the primary transform.

First, the encoding apparatus 100 may determine a transform group corresponding to a current block, in S1010. The transform group may refer to a transform group of Table 4, but the present disclosure is not limited thereto. For example, the transform group may consist of other transform combinations.

The encoding apparatus 100 may perform a transform on available candidate transform combinations in the transform group, in S1020. As a result of the transform, the encoding apparatus 100 may determine or select a transform combination with the lowest rate distortion (RD) cost, in S1030. The encoding apparatus 100 may encode a transform combination index corresponding to the selected transform combination in S1040.

Figure 11:
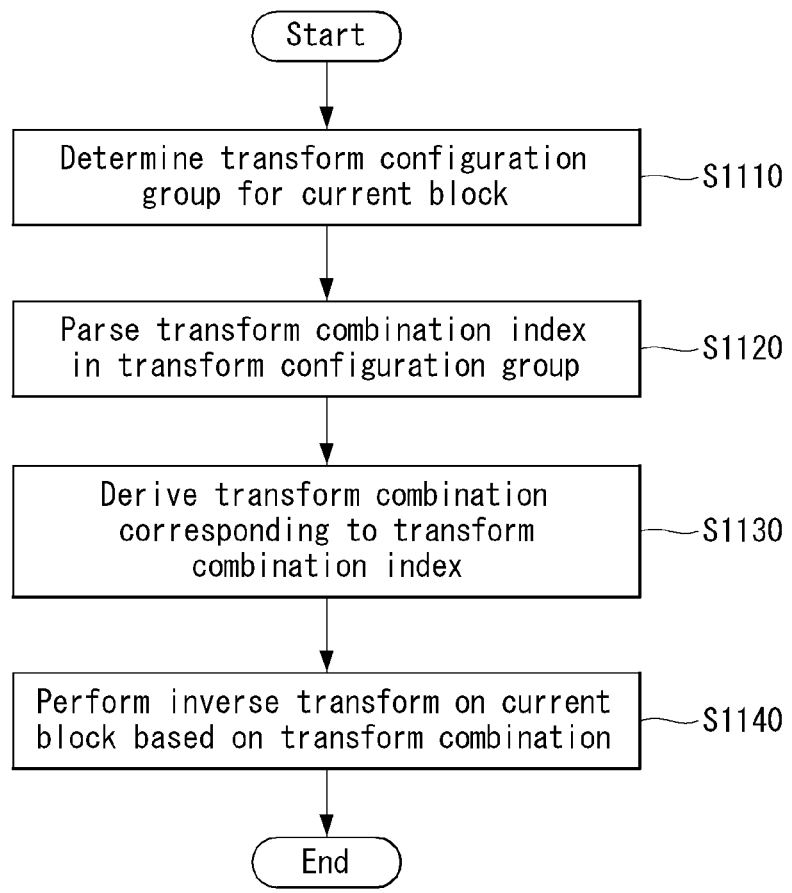
FIG. 11 illustrates an example of a flow chart for performing a transform through multiple transform selection in a decoding process of a video signal according to an embodiment of the present disclosure.

FIG. 11 illustrates an example of a flow chart for performing a transform through multiple transform selection in a decoding process of a video signal according to an embodiment of the present disclosure. First, the decoding apparatus 200 may determine a transform group for a current block, in S1110. The decoding apparatus 200 may parse a transform combination index, and the transform combination index may correspond to one of a plurality of transform combinations in the transform group, in S1120. The decoding apparatus 200 may derive a transform combination corresponding to the transform combination index, in S1130. Although the transform combination may refer to a transform combination described in Table 4, the present disclosure is not limited thereto. That is, the transform combination may be configured as other transform combinations.

The decoding apparatus 200 may perform an inverse transform on the current block based on the transform combination, in S1140. When the transform combination consists of a row transform and a column transform, the column transform may be first applied, and then the row transform may be applied. However, the present disclosure is not limited thereto, and the row transform may be applied and then the column transform may be applied. Alternatively, when the transform combination consists of non-separable transforms, a non-separable transform may be immediately applied. In some embodiments, a process of determining a transform group and a process of parsing a transform combination index may be performed at the same time.

In an embodiment of the present disclosure, as described below, two MTS candidates may be used for directional modes, and four MTS candidates may be used for nondirectional modes.

A) Nondirectional Modes (DC and Planar)

When MTS index is 0, DST-7 is used for horizontal and vertical transforms

When MTS index is 1, DST-7 is used for vertical transform and DCT-8 is used for horizontal transform When MTS index is 2, DCT-8 is used for vertical transform and DST-7 is used for horizontal transform When MTS index is 3, DCT-8 is used for horizontal and vertical transforms B) Modes Belonging to Horizontal Group Modes When MTS index is 0, DST-7 is used for horizontal and vertical transforms When MTS index is 1, DCT-8 is used for vertical transform and DST-7 is used for horizontal transform C) Modes Belonging to Vertical Group Modes When MTS index is 0, DST-7 is used for horizontal and vertical transforms When MTS index is 1, DST-7 is used for vertical transform and DCT-8 is used for horizontal transform Here (in the case where 67 intra-prediction modes are used), horizontal group modes include intra-prediction modes of Nos. 2 to 34, and vertical modes include intra-prediction modes of Nos. 35 to 66.

In another embodiment of the present disclosure, three MTS candidates may be used for all the intra-prediction modes.

When MTS index is 0, DST-7 is used for horizontal and vertical transforms

When MTS index is 1, DST-7 is used for vertical transform and DCT-8 is used for horizontal transform When MTS index is 2, DCT-8 is used for vertical transform and DST-7 is used for horizontal transform In another embodiment of the present disclosure, two MTS candidates may be used for directional prediction modes, and three MTS candidates may be used for nondirectional modes.

A) Nondirectional Modes (DC and Planar)

When MTS index is 0, DST-7 is used for horizontal and vertical transforms

When MTS index is 1, DST-7 is used for vertical transform and DCT-8 is used for horizontal transform When MTS index is 2, DCT-8 is used for vertical transform and DST-7 is used for horizontal transform B) Prediction Modes Corresponding to Horizontal Group Modes When MTS index is 0, DST-7 is used for horizontal and vertical transforms When MTS index is 1, DCT-8 is used for vertical transform and DST-7 is used for horizontal transform C) Prediction Modes Corresponding to Vertical Group Modes When MTS index is 0, DST-7 is used for horizontal and vertical transforms When MTS index is 1, DST-7 is used for vertical transform and DCT-8 is used for horizontal transform In another embodiment of the present disclosure, one MTS candidate (e.g., DST-7) may be used for all the intra-modes. In this case, encoding time can be reduced by 40% along with a minor coding loss. In addition, one flag may be used to indicate one of DCT-2 and DST-7.

A method for performing the decoding based on information related to MTS of the encoding apparatus 100 according to an embodiment of the present disclosure is as follows.

The decoding apparatus 200 according to an embodiment of the present disclosure may obtain a flag sps_mts_intra_enabled_flag indicating whether a flag cu_mts_flag indicating whether to apply MTS is present in in a residual coding syntax of an intra-coding unit, or a flag sps_mts_inter_enabled_flag indicating whether a flag cu_mts_flag indicating whether to apply MTS is present in in a residual coding syntax of an inter-coding unit. For example, if sps_mts_intra_enabled_flag=0, cu_mts_flag is not present in the residual coding syntax of the intra-coding unit, and if sps_mts_intra_enabled_flag=1, cu_mts_flag is present in the residual coding syntax of the intra-coding unit. In addition, sps_mts_inter_enabled_flag indicates whether cu_mts_flag is present in the residual coding syntax of the inter-coding unit. For example, if sps_mts_inter_enabled_flag=0, cu_mts_flag is not present in the residual coding syntax of the inter-coding unit, and if sps_mts_inter_enabled_flag=1, cu_mts_flag is present in the residual coding syntax of the inter-coding unit.

The decoding apparatus 200 may obtain cu_mts_flag based on sps_mts_intra_enabled_flag or sps_mts_inter_enabled_flag. For example, when sps_mts_intra_enabled_flag=1 or sps_mts_inter_enabled_flag=1, the decoding apparatus 200 may obtain cu_mts_flag. Here, cu_mts_flag indicates whether MTS is applied to a residual sample of a luma transform block. For example, if cu_mts_flag=0, MTS is not applied to the residual sample of the luma transform block, and if cu_mts_flag=1, MTS is applied to the residual sample of the luma transform block.

The decoding apparatus 200 may obtain an MTS index mts_idx based on cu_mts_flag. For example, when cu_mts_flag=1, the decoding apparatus 200 may obtain mts_idx. Here, mts_idx indicates which transform kernel is applied to luma residual samples of a current transform block in the horizontal direction and/or the vertical direction. For example, at least one of embodiments described in the present disclosure may be applied for mts_idx.

The decoding apparatus 200 may derive a transform kernel corresponding to mts_idx. For example, the transform kernel corresponding to mts_idx may be defined by being divided into a horizontal transform and a vertical transform.

For example, if MTS is applied to the current block (i.e., cu_mts_flag=1), the decoding apparatus 200 may construct MTS candidates based on the intra-prediction mode of the current block. Further, the decoding apparatus 200 may determine an MTS candidate applied to the current block from among the constructed MTS candidates using mts_idx.

As another example, different transform kernels may be applied to the horizontal transform and the vertical transform. However, the present disclosure is not limited thereto, and the same transform kernel may be applied to the horizontal transform and the vertical transform.

The decoding apparatus 200 may perform an inverse transform based on the transform kernel.

Furthermore, in the present disclosure, MTS may be represented as AMT or EMT, and mts_idx may be represented as AMT_idx, EMT_idx, AMT_TU_idx, EMT_TU_idx, or the like, in the same manner. The present disclosure is not limited thereto.

The present disclosure is described by being divided into a case, in which the MTS is applied, and a case, in which the MTS is not applied, based on the MTS flag, but embodiments of the present disclosure are not limited to such an expression. For example, whether to apply the MTS may be the same meaning as whether to use other transform types (or transform kernels) other than a predefined specific transform type (which may be referred to as a basic transform type, a default transform type, etc.). If the MTS is applied, a transform type (e.g., any one transform type or a combined transform type of two or more transform types among a plurality of transform types) other than a basic transform type may be used for a transform. Further, if the MTS is not applied, the basic transform type may be used for the transform. In an embodiment, the basic transform type may be configured (or defined) as DCT-2.

As an example, when an MTS flag syntax indicating whether the MTS is applied to a current transform block, and an MTS index syntax indicating a transform type applied to the current transform block if the MTS are applied may also be individually transmitted from the encoding apparatus 100 to the decoding apparatus 200. As another example, when whether the MTS is applied to a current transform block, and a syntax (e.g., MTS index) including all the transform types applied to the current transform block if the MTS are applied may also be transmitted from the encoding apparatus 100 to the decoding apparatus 200. That is, in the latter example, a syntax (or syntax element) indicating a transform type applied to the current transform block (or unit) may be transmitted from the encoding apparatus 100 to the decoding apparatus 200 within all of transform type groups (or transform type sets) including the above-described basic transform type.

Accordingly, the MTS index may represent together a transform type applied to the current transform block and whether to apply MTS. In other words, in the latter embodiment, only an MTS index may be signaled without an MTS flag. In this case, DCT-2 may be interpreted as being included in MTS. However, in the present disclosure, a case where DCT-2 is applied may be described as a case where MTS is not applied. Nevertheless, a technical range related to MTS is not limited to corresponding defined contents.

A method for the decoding apparatus 200 to generate a block including residual samples from a transform block through an inverse transform may be as follows.

Input to this process is as follows:

luma position position (xTbY, yTbY) indicating a top left sample of a current luma transform block for a top left luma sample of a current picture, a variable nTbW indicating a width of a current transform block, a variable nTbH indicating a height of the current transform block, a variable cIdx indicating a chroma component of a current block, (nTbW)×(nTbH) array d[x][y] of scaled transform coefficients for x=0 . . . nTbW−1, and y=0 . . . nTbH−1.

Output from this process is (nTbW)×(nTbH) array r[x][y] of residual samples for x=0 . . . nTbW−1, and y=0 . . . nTbH−1.

A variable trTypeHor indicating a horizontal transform kernel and a variable trTypeVer indicating a vertical transform kernel may be derived based on mts_idx[x][y] and CuPredMode[x][y] of Table 5.

The (nTbW)×(nTbH) array of the residual samples may be derived as follows:

1. A (vertical) column of each scaled transform coefficient d[x][y] (x=0 . . . nTbW−1, y=0 . . . nTbH−1) is transformed into e[x][y] (x=0 . . . nTbW−1, y=0 . . . nTbH−1) by an one-dimensional transform process for a column x=0 . . . nTbW−1. In this case, an input is a transform type variable trType which is set to be same as the height nTbH of the transform block, the list d[x][y] (y=0 . . . nTbH−1), and trTypeVer, and the list e[x][y] (y=0 . . . nTbH−1) is output.

2. Intermediate sample values g[x][y] (x=0 . . . nTbW−1, y=0 . . . nTbH−1) are derived as in Equation 4 below.

2. Intermediate sample values g[x][y] (x=0 . . . nonZeroW−1, y=0 . . . nTbH−1) are derived as in Equation 4 below.

$$g[x][y]=\text{Clip3}(\text{CoeffMin},\text{CoeffMax},(e[x][y]+64)\gg 7)$$

3. For each row of (nonZeroW)×(nTbH) array block g[x][y] (where x=0 . . . nonZeroW−1, y=0 . . . nTbH−1) (each row is distinguished by y=0 . . . nTbH−1), the corresponding 1 D transform process is called (by a total of nTbH calls), and thus the (nTbW)×(nTbH) array block r[x][y] is obtained as an output (where x=0 . . . nTbW−1, y=0 . . . nTbH−1). When the corresponding 1 D transform process for y-th row is called, a length nTbW of the transform, an input vector length non-ZeroW, an input vector g[x][y] (where y value denotes the y-th row, x=0 . . . nonZeroW−1), and trTypeHor denoting a transform type (transferred to parameter trType) are transferred as input factors, and vector (list) r[x][y] (where y value denotes the y-th row, x=0 . . . nTbW−1) is obtained as an output of the corresponding 1 D transform process (where y value denotes the y-th row, x=0 . . . nTbW−1).

TABLE 5

| mts_idx[ x ][ y ] | CuPredMode[ x ][ y ] == MODE_INTRA | | CuPredMode[ x ][ y ] == MODE_INTER | |
| --- | --- | --- | --- | --- |
| | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

$$g[x][y]=\text{Clip3}(\text{CoeffMin},\text{CoeffMax},(e[x][y]+256)\gg 9)$$

3. A (horizontal) row of each intermediate array g[x][y] (x=0 . . . nTbW−1, y=0 . . . nTbH−1) is transformed into r[x][y] (x=0 . . . nTbW−1, y=0 . . . nTbH−1) by an one-dimensional (1D) transform process for each row y=0 . . . nTbH−1. In this case, an input is a transform type variable trType which is set to be same as the width nTbW of the transform block, the list g[x][y] (x=0 . . . nTbW−1), and trTypeHor, and the list r[x][y] (x=0 . . . nTbW−1) is output.

Considering a non-zero width (nonZeroW) and a non-zero height (nonZeroH) by zero-out described below, a process of deriving a residual sample array may be represented again as follows.

1. For each column of a scaled (nonZeroW)×(nonZeroH) array transform coefficient block d[x][y] (where x=0 . . . nonZeroW−1, y=0 . . . nonZeroH−1) (each column is distinguished by x=0 . . . nonZeroW−1), the corresponding 1D transform process is called (by a total of nonZeroW calls), and thus (nonZeroW)×(nTbH) array block e[x][y] is obtained as an output, where x=0 . . . nonZeroW−1, y=0 . . . nTbH−1. When the corresponding 1 D transform process for x-th column is called, a length nTbH of the transform, a scaled transform coefficient vector length non-ZeroH, a scaled transform coefficient vector d[x][y] (where x value denotes x-th column, y=0 . . . nonZeroH−1), and trTypeVer denoting a transform type (transferred to parameter trType) are transferred as input factors, and vector (list) e[x][y] is obtained as an output of the corresponding 1 D transform process (where x value denotes x-th column, y=0 . . . nTbH−1)

In Table 5, CuPredMode denotes a prediction mode applied to a current CU, trTypeHor denotes a type of a transform kernel for a horizontal transform, and trTypeVer denotes a type of a transform kernel for a vertical transform.

Embodiments of the present disclosure provide a syntax element for MTS. A sequence parameter set according to an embodiment of the present disclosure may include a flag (sps_mts_intra_enabled_flag) indicating whether an MTS flag or an MTS index is present in a low level syntax for an intra-coding unit (e.g., residual coding syntax, transform unit syntax), and a flag (sps_mts_inter_enabled_flag) indicating whether the MTS flag or the MTS index is present in a low level syntax for an inter-coding unit.

According to a syntax structure for decoding of a transform unit according to an embodiment of the present disclosure, if specific condition is satisfied, the decoding apparatus 200 may parse an MTS flag (cu_mts_flag). For example, the condition for parsing the MTS flag may include a case in which sps_mts_intra_enabled_flag is 1 while a prediction mode of a current coding unit is an intra-prediction mode or sps_mts_inter_enabled_flag is 1 while the prediction mode of the current coding unit is an inter-prediction mode, there is a non-zero transform coefficient for a luma component, a current tree type is not a dual tree for a chroma component, and each of a width and a height of a transform block is less than or equal to a specific length (e.g., 32).

After the MTS index (cu_mts_flag) is obtained, for example, if cu_mts_flag=0, MTS is not applied to a residual sample of a luma transform block, and if cu_mts_flag=1, MTS may be applied to the residual sample of the luma transform block.

As described above, the present disclosure dividedly describes a case of applying the MTS and a case of not applying the MTS based on the MTS flag, but the present disclosure is not limited thereto. For example, whether to apply the MTS may mean whether to use transform types (or transform kernels) other than a predefined specific transform type (which may be referred to as a basic transform type, a default transform type, etc.). If the MTS is applied, a transform type (e.g., any one of a plurality of transform types or a combination of two or more transform types) other than the basic transform type may be used for the transform, and if the MTS is not applied, the basic transform type may be used for the transform. In an embodiment, the basic transform type may be configured (or defined) as DCT-2.

For example, an MTS flag syntax indicating whether MTS is applied to a current transform block, and an MTS index syntax indicating a transform type applied to the current block when MTS is applied may be individually transmitted from the encoding apparatus 100 to the decoding apparatus 200. As another example, a syntax (e.g., MTS index) including both information about whether MTS is applied to the current transform block and a transform type applied to the current block when MTS is applied may be transmitted from the encoding apparatus 100 to the decoding apparatus 200. That is, in the latter embodiment, a syntax (or syntax element) indicating a transform type applied to the current transform block (or unit) in all of transform type groups (or transform type set) including the aforementioned basic transform type may be transmitted from the encoding apparatus 100 to the decoding apparatus 200.

Accordingly, despite the expression, a syntax (MTS index) indicating the transform type applied to the current transform block may include information about whether MTS is applied. In other words, in the latter embodiment, only an MTS index may be signaled without an MTS flag. In this case, DCT-2 may be interpreted as being included in MTS. However, the present disclosure may describe a case of applying DCT-2 as a case of not applying the MTS. Nevertheless, a technical range related to the MTS is not limited to corresponding defined contents.

According to an embodiment of the present disclosure, flag (transform_skip_flag) indicating whether there is a transform skip, and the MTS index (mts_idx) may be signaled via a residual syntax. However, this is merely an example, and the present disclosure is not limited thereto. For example, transform_skip_flag and/or mts_idx syntax may be signaled via a transform unit syntax.

Hereinafter, a method is proposed to improve complexity by applying a primary transform only to a predefined area. When combinations of various transforms (or transform kernels) such as MTS (e.g., DCT-2, DST-7, DCT-8, DST-1, DCT-5, etc.) are selectively applied to the primary transform, complexity may increase. Particularly, various transforms need to be considered as a size of a coding block (or transform block) increases, which may considerably increase complexity.

Accordingly, an embodiment of the present disclosure proposes a method for performing a transform only on a predefined area according to specific conditions, instead of performing (or applying) the transform on all the areas in order to reduce complexity.

In an embodiment, according to a reduced transform (RT) method, the encoding apparatus 100 may obtain an encoder may obtain an R×R transform block instead of an M×M transform block by applying a forward primary transform to an M×M pixel block (luma block). For example, an R×R area may be a top-left R×R area in a current block (coding block, transform block). The decoding apparatus 200 may obtain an M×M transform block by performing an inverse primary transform only on an R×R (M≥R) area.

Consequently, non-zero coefficients may be present only in the R×R area. For example, in this case, the decoding apparatus 200 may zero-out coefficients present in areas other than the R×R area without performing calculation therefor. The encoding apparatus 100 may perform a forward transform so that only the R×R area remains (so that non-zero coefficients are present only in the R×R area).

Further, the decoding apparatus 200 may apply a primary transform (i.e., inverse transform) only to a predefined area determined depending on a size of a coding block (or transform block) and/or transform (or transform kernel) type. The following table 6 shows an example of a reduced adaptive multiple transform (RAMT) using a predefined R (which may be referred to as a reduced factor, a reduced transform factor, etc.) value depending on a size of a transform (or a size of a transform block). In the present disclosure, the RAMT representing a reduced transform adaptively determined depending on a block size may be referred to as a reduced MTS, a reduced explicit multiple transform, a reduced primary transform, etc.

TABLE 6

| Transform size | Reduced transform 1 | Reduced transform 2 | Reduced transform 3 |
|---|---|---|---|
| 8 × 8 | 4 × 4 | 6 × 6 | 6 × 6 |
| 16 × 16 | 8 × 8 | 12 × 12 | 8 × 8 |
| 32 × 32 | 16 × 16 | 16 × 16 | 16 × 16 |
| 64 × 64 | 32 × 32 | 16 × 16 | 16 × 16 |
| 128 × 128 | 32 × 32 | 16 × 16 | 16 × 16 |

Referring to Table 6, at least one reduced transform may be defined depending on a size of a transform (or a size of a transform block). In an embodiment, which reduced transform from among reduced transforms illustrated in Table 6 is used may be determined according to a transform (or transform kernel) applied to a current block (coding block or transform block). Although Table 6 assumes that three reduced transforms are used, the present disclosure is not limited thereto. One or more various reduced transforms may be predefined depending on the size of the transform.

Further, in an embodiment of the present disclosure, a reduced transform factor (R) may be determined depending on the primary transform in application of the aforementioned reduced adaptive multiple transform. For example, if the primary transform is DCT-2, a reduction of coding performance can be minimized by not using the reduced transform for a small-sized block or by using a relatively large R value because computational complexity of DCT-2 is relatively lower than those of other primary transforms (e.g., a combination of DST-7 and/or DCT-8). The following Table 7 shows an example of an RAMT using a predefined R value depending on a size of a transform (or a size of a transform block) and a transform kernel.

TABLE 7

| Transform size | Reduced transform for DCT2 | Reduced transform except DCT2 |
|---|---|---|
| 8 × 8 | 8 × 8 | 4 × 4 |
| 16 × 16 | 16 × 16 | 8 × 8 |
| 32 × 32 | 32 × 32 | 16 × 16 |

TABLE 7-continued

| Transform size | Reduced transform for DCT2 | Reduced transform except DCT2 |
|---|---|---|
| 64 × 64 | 32 × 32 | 32 × 32 |
| 128 × 128 | 32 × 32 | 32 × 32 |

Referring to Table 7, if a transform applied to the primary transform is DCT-2 and if the transform applied to the primary transform is a transform other than DCT-2 (e.g., combination of DST7 and/or DCT8), different reduced transform factors may be used.

An operation of the encoding apparatus 100 for applying a reduced transform according to an embodiment of the present disclosure is as below. First, the encoding apparatus 100 determines whether to apply a transform to a current block. The encoding apparatus 100 may encode a transform skip flag depending on the determined result. In this case, the encoding apparatus 100 may encode the transform skip flag.

If the transform is applied to the current block, the encoding apparatus 100 determines a transform kernel to be applied to a primary transform of the current block. The encoding apparatus 100 may encode a transform index indicating the determined transform kernel. The encoding apparatus 100 determines an area, in which a significant coefficient is present in the current block, based on the transform kernel applied to the primary transform of the current block and a size of the current block.

In an embodiment, if a transform kernel indicated by a transform index is a predefined transform and a width and/or a height of a current block are greater than a predefined size, the encoding apparatus 100 may determine an area having a width and/or a height of the predefined size as an area in which the significant coefficient is present.

For example, the predefined transform may be one of a plurality of transform combinations consisting of combinations of DST-7 and/or DCT-8, and the predefined size may be 16. Alternatively, the predefined transform may be a transform except DCT-2. As an example, if a transform kernel indicated by a transform index is DCT-2 and a width and/or a height of a current block are greater than 32, the encoding apparatus 100 may determine an area having the width and/or the height of 32 as an area to which the primary transform is applied, and may include a non-zero transform coefficient in a reduced area having the width or the height of 16 when expressing an output according to a transform in two-dimensional form.

Further, in an embodiment, if a transform kernel indicated by a transform index belongs to a first transform group, the encoding apparatus 100 may determine a smaller value of a width of a current block and a first threshold value as a width of an area in which a significant coefficient (non-zero coefficient) according to the primary transform is present, and may determine a smaller value of a height of the current block and the first threshold value as a height of an area in which the significant coefficient is present. For example, the first threshold value may be 32, but the present disclosure is not limited thereto. For example, the first threshold value may be 4, 8, or 16 as shown in Table 6 or Table 7.

In addition, if the transform kernel indicated by the transform index belongs to a second transform group, the encoding apparatus 100 may determine a smaller value of the width of the current block and a second threshold value as a width of an area to which the primary transform is applied, and may determine a smaller value of the height of the current block and the second threshold value as the height of the area in which the significant coefficient is present. For example, the second threshold value may be 16, but the present disclosure is not limited thereto. For example, the second threshold value may be 4, 6, 8, 12, or 32 as shown in Table 6 or Table 7.

In an embodiment, the first transform group may include DCT-2, and the second transform group may include a plurality of transform combinations consisting of combinations of DST-7 and/or DCT-8.

The encoding apparatus 100 performs a forward primary transform using the transform kernel applied to the primary transform of the current block. The encoding apparatus 100 may a primarily transformed transform coefficients in the area in which the significant coefficient is present by performing the forward primary transform. In an embodiment, the encoding apparatus 100 may apply a secondary transform to the primarily transformed transform coefficient.

An operation of the decoding apparatus 200 for applying a reduced transform according to an embodiment of the present disclosure is as below. The decoding apparatus 200 checks whether a transform skip is applied to a current block. If the transform skip is not applied to the current block, the decoding apparatus 200 obtains, from a video signal, a transform index indicating a transform kernel applied to the current block.

The decoding apparatus 200 determines an area, in which a primary transform (i.e., inverse primary transform) is applied to the current block, based on the transform kernel indicated by the transform index and a size (i.e., width and/or height) of the current block. In an embodiment, the decoding apparatus 200 may consider coefficients of a remaining area other than the area, to which the primary transform is applied, as zero in the current block. In addition, if the transform kernel indicated by the transform index is a predefined transform and the width and/or the height of the current block are greater than a predefined size, the decoding apparatus 200 may determine an area having a width and/or a height of the predefined size as the area to which the primary transform is applied.

For example, the predefined transform may be any one of a plurality of transform combinations consisting of combinations of DST-7 and/or DCT-8, and the predefined size may be 16. Alternatively, the predefined transform may be a transform except DCT-2. For example, if the transform kernel indicated by the transform index is DCT-2 and the width and/or the height of the current block are greater than 32, the decoding apparatus 200 may determine an area having a width and/or a height of 32 as the area to which the primary transform is applied.

Furthermore, in an embodiment, if a transform kernel indicated by a transform index belongs to a first transform group, the decoding apparatus 200 may determine a smaller value of the width of the current block and a first threshold value as a width of an area to which the primary transform is applied, and may determine a smaller value of the height of the current block and the first threshold value as a height of an area to which the primary transform is applied. For example, the first threshold value may be 32, but the present disclosure is not limited thereto. For example, the first threshold value may be 4, 8, or 16 as shown in Table 6 or Table 7.

In addition, if the transform kernel indicated by the transform index belongs to a second transform group, the decoding apparatus 200 may determine a smaller value of the width of the current block and a second threshold value as the width of the area to which the primary transform is applied, and may determine a smaller value of the height of the current block and the second threshold value as the height of the area to which the primary transform is applied. For example, the second threshold value may be 16, but the present disclosure is not limited thereto. For example, the second threshold value may be 4, 6, 8, 12, or 32 as shown in Table 6 or Table 7.

In an embodiment, the first transform group may include DCT-2, and the second transform group may include a plurality of transform combinations consisting of combinations of DST-7 and/or DCT-8.

The decoding apparatus 200 performs an inverse primary transform on the area, to which the inverse primary transform is applied, using the transform kernel indicated by the transform index. The decoding apparatus 200 may obtain inverse primary transformed transform coefficients by performing the inverse primary transform. In an embodiment, the decoding apparatus 200 may apply an inverse secondary transform to a dequantized transform coefficient before performing the inverse primary transform.

First Embodiment

According to an embodiment of the present disclosure, worst case complexity can be considerably reduced by performing a transform only on a predefined area according to specific conditions.

In addition, in an embodiment of the present disclosure, if an MTS (EMT or AMT) flag is 0 (i.e., if DCT-2 transform is applied in both a horizontal (lateral) direction and a vertical (longitudinal) direction), the decoding apparatus 200 may leave only 32 coefficients from each of the left side and the upper side in the horizontal and vertical directions and perform zero-out for a high frequency component (i.e., consider or set the high frequency component as 0). Although this embodiment is referred to as the first embodiment for convenience of explanation in embodiments to be described later, embodiments of the present disclosure are not limited thereto.

For example, for a 64×64 TU (or CU), the decoding apparatus 200 may leave transform coefficients only for a 32×32 top left area and perform zero-out for coefficients of a remaining area. Further, for a 64×16 TU, the decoding apparatus 200 may leave transform coefficients only for a 32×16 top left area and perform zero-out for coefficients of a remaining area. In addition, for an 8×64 TU, the encoding apparatus 100/decoding apparatus 200 may leave transform coefficients only for a 8×32 top left area and perform zero-out for coefficients of a remaining area. That is, it may be configured so that transform coefficients are present only for a maximum length of 32 in both the horizontal and vertical directions, which can improve transform efficiency.

In an embodiment, such a zero-out method may be applied only to a residual signal to which intra-prediction is applied, or may be applied only to a residual signal to which inter-prediction is applied, or applied to both a residual signal to which intra-prediction is applied and a residual signal to which inter-prediction is applied.

Second Embodiment

In an embodiment of the present disclosure, if an MTS flag is 1 (i.e., if a transform (e.g., DST-7 or DCT-8) other than DCT-2 transform is applicable in the horizontal direction and the vertical direction), the decoding apparatus 200 may leave coefficients of a specific top-left area and perform zero-out for a remaining high frequency component (i.e., consider or set the high frequency component as 0). Although this embodiment is referred to as the second embodiment for convenience of explanation in embodiments to be described later, embodiments of the present disclosure are not limited thereto.

In an embodiment, the decoding apparatus 200 may be configured to leave only a transform coefficient area of a part of the top-left area as in the following example. That is, the encoding apparatus 100 may leave coefficients of a predefined top-left area and perform zero-out for a remaining high frequency component, and the decoding apparatus 200 may preset the length (or the number) of transform coefficients in the horizontal and/or vertical directions to which a primary transform is applied depending on a width and/or a height. For example, coefficients outside the length to which an inverse primary transform is applied may be zero-out.

If a width (w) is equal to or greater than $2^n$, transform coefficients only for a length of $w/2^p$ from the left side may be left, and transform coefficients of a remaining area may be fixed (or set or consider) to 0 (zero-out).

If a height (h) is equal to or greater than $2^n$, transform coefficients may be left only for a length of $h/2^q$ from the top, and transform coefficients of a remaining area may be fixed to a value of 0.

For example, values m, n, p, and q may be predefined as various values. For example, the values m, n, p, and q may be set to integer values equal to or greater than 0. Alternatively, they may be set as in the following examples.

1) (m, n, p, q)=(5, 5, 1, 1)
2) (m, n, p, q)=(4, 4, 1, 1)

For example, if they are predefined as the example of 1), transform coefficients may be left only for a 16×16 top left area in a 32×16 TU, and transform coefficients may be left only for a 8×16 top left area in an 8×32 TU.

In an embodiment, such a zero-out method may be applied only to a residual signal to which intra-prediction is applied, or may be applied only to a residual signal to which inter-prediction is applied, or applied to both a residual signal to which intra-prediction is applied and a residual signal to which inter-prediction is applied.

Third Embodiment

In another embodiment of the present disclosure, when an MTS flag is 1 (i.e., if a transform (e.g., DST-7 or DCT-8) other than DCT-2 transform is applicable in the horizontal direction and the vertical direction), the decoding apparatus 200 may leave coefficients of a specific top-left area and perform zero-out for a remaining high frequency component (i.e., consider or set the high frequency component as 0). Alternatively, more specifically, the encoding apparatus 100 may leave coefficients of a predefined top-left area and perform zero-out for a remaining high frequency component, and the decoding apparatus 200 may previously recognize a zero-out area and perform decoding using coefficients of the non-zero-out area. However, embodiments of the present disclosure are not limited thereto, and the zero-out process from a decoder perspective may be understood as a process of considering (or recognizing or setting) a zero-out area as 0. Although this embodiment is referred to as the third embodiment for convenience of explanation in embodiments to be described later, embodiments of the present disclosure are not limited thereto.

In an embodiment, the decoding apparatus 200 may be configured to leave only a transform coefficient area of a part of the top-left area as in the following example. That is, the encoding apparatus 100/decoding apparatus 200 may preset the length (or the number) of transform coefficients in the horizontal and/or vertical directions to which an inverse primary transform is applied depending on a width and/or a height. For example, coefficients outside the length to which the inverse primary transform is applied may be zero-out.

When the height (h) is equal to or greater than the width (w) and is equal to or greater than $2^n$, only a w×(h/$2^p$) top-left area may leave a transform coefficient, and a transform coefficient of a remaining area may be fixed (or set or consider) to zero.

When the width (w) is greater than the height (h) and is equal to or greater than $2^n$, only a (w/$2^q$)×h top-left area may leave a transform coefficient, and a transform coefficient of a remaining area may be fixed to zero.

Although the above-described example describes that the length in the vertical direction is reduced to (h/$2^p$) when the height (h) is equal to the width (w), the length in the horizontal direction may be configured to be reduced to (w/$2^q$).

For example, values m, n, p, and q may be predefined as various values. For example, the values m, n, p, and q may be set to integer values equal to or greater than 0. Alternatively, more specifically, they may be set as in the following examples.

1) (m, n, p, q)=(4, 4, 1, 1)
2) (m, n, p, q)=(5, 5, 1, 1)

For example, if they are predefined as the example of 1), transform coefficients may be left only for a 16×16 top left area in a 32×16 TU, and transform coefficients may be left only for a 8×8 top left area in an 8×16 TU.

In an embodiment, such a zero-out method may be applied only to a residual signal to which intra-prediction is applied, or may be applied only to a residual signal to which inter-prediction is applied, or applied to both a residual signal to which intra-prediction is applied and a residual signal to which inter-prediction is applied.

The first embodiment relating to a method of limiting a transform coefficient area when the MTS flag is 0, and the second and third embodiments relating to a method of limiting a transform coefficient area when the MTS flag is 1 may be individually applied or may be combined and applied.

In an embodiment, the following combined configurations may be applied.

1) First embodiment+Second embodiment
2) First embodiment+Third embodiment

As mentioned in the second and third embodiments, as an embodiment, the zero-out method may be applied only to a residual signal to which intra-prediction is applied, or may be applied only to a residual signal to which inter-prediction is applied, or may be applied to both a residual signal to which intra-prediction is applied and a residual signal to which inter-prediction is applied. Accordingly, the following combined configurations may be applied when the MTS flag is 1. In this instance, the first embodiment may be applied when the MTS flag is 0.

TABLE 8

| Config. index | Intra-prediction residual signal | Inter-prediction residual signal |
| --- | --- | --- |
| 1 | Zero-out is not applied | Zero-out is not applied |
| 2 | Zero-out is not applied | First embodiment |
| 3 | Zero-out is not applied | Second embodiment |
| 4 | First embodiment | Zero-out is not applied |
| 5 | First embodiment | First embodiment |
| 6 | First embodiment | Second embodiment |
| 7 | Second embodiment | Zero-out is not applied |
| 8 | Second embodiment | First embodiment |
| 9 | Second embodiment | Second embodiment |

In an embodiment of the present disclosure, the encoding apparatus 100/decoding apparatus 200 may not perform a residual coding on an area that is regarded as an area having a transform coefficient of 0 according to zero-out of the above-described embodiments. That is, the encoding apparatus 100/decoding apparatus 200 may define to perform the residual coding only on areas other than a zero-out area.

In the above-described first, second and third embodiments, an area (or coefficient) that can only have a value of 0 in a TU is obviously determined. That is, areas other than the top left area in which presence of transform coefficients is permitted are zero-out. Thus, in an entropy coding (or residual coding) process, the encoding apparatus 100/decoding apparatus 200 may be configured to bypass an area guaranteed to have a value of 0 without performing residual coding on the area.

In an embodiment, the encoding apparatus 100/decoding apparatus 200 may code a flag (referred to as a coded block flag (CBF)) (or a syntax or a syntax element) indicating presence or absence of a non-zero transform coefficient in a coefficient group (CG). Here, the CG is a subblock of a TU and may be configured as a 4×4 or 2×2 block depending on a shape of a TU block and/or whether the TU is a chroma/luma component.

In this instance, the encoding apparatus 100/decoding apparatus 200 may scan the inside of the corresponding CG to code coefficient values (or coefficient level values) only when the CBF is 1. Thus, the encoding apparatus 100/decoding apparatus 200 does not perform CBF coding on CGs belonging to an area zeroed out to zero and may configure so that the CGs have a value of zero by default.

In an embodiment, the encoding apparatus 100 may first code a position of a coefficient that is last located in the forward scan order (or a syntax or a syntax element indicating a position of a last significant coefficient). For example, the encoding apparatus 100 may code last_coefficient_position_x that is a horizontal position, and last_coefficient_position_y that is a vertical position. In the present disclosure, the last significant coefficient is a non-zero transform coefficient that is last disposed when transform coefficients are disposed according to the scan order from a top left position in one transform block. A position after the last significant coefficient in the scan order is filled with zero (considered to be zero).

Maximum values of available values of last_coefficient_position_x and last_coefficient_position_y may be respectively determined as (width −1) and (height −1) of a TU. However, when an area in which non-zero coefficients can be present is limited by zero-out, the maximum values of available values of last_coefficient_position_x and last_coefficient_position_y may also be limited.

Accordingly, the encoding apparatus 100/decoding apparatus 200 may limit the maximum values of available values of last_coefficient_position_x and last_coefficient_position_y in consideration of zero-out, and then code them. For example, when a binarization method applied to last_coefficient_position_x and last_coefficient_position_y is a (truncated unary (or truncated rice (TR) or truncated binary (TB)) binarization method, the encoding apparatus 100/decoding apparatus 200 may control (reduce) so that a maximum length of a truncated unary code corresponds to an adjusted maximum value (i.e., available maximum values of last_coefficient_position_x and last_coefficient_position_y).

Figure 12A:
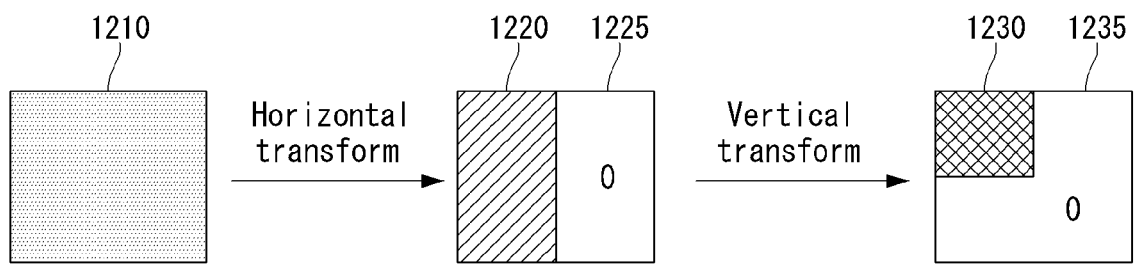
FIGS. 12*a* and 12*b* illustrate an example where a separable transform according to an embodiment of the present disclosure is applied, and more specifically.
Figure 12B:
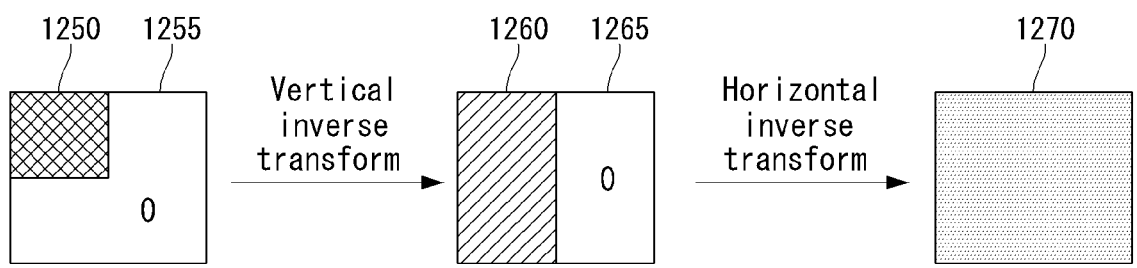

FIGS. 12a and 12b illustrate an example where a separable transform according to an embodiment of the present disclosure is applied. More specifically, FIG. 12a illustrates an area where a significant coefficient is present and an area where zero-out is applied upon forward transform (upon encoding), and FIG. 12b illustrates an area where a significant coefficient is present and an area where zero-out is applied upon inverse transform (upon decoding).

A scheme for leaving only coefficients of a low frequency area (e.g., a 16×16 top left area in a 32×32 block) for a block to which MTS is applied based on a forward transform and applying zero-out (filled with 0 or derived as 0) to a remainder may be referred to as reduced multiple transform selection (RMTS). For example, in FIG. 12a, if the size of a block 1210 including residual sample values is 32×32 and a 16×16 reduced block is output by the application of the RMTS, only coefficients (16 coefficients from the left) disposed in a left area 1220 in a row direction among coefficients generated by the application of a horizontal transform are left, and a right area 1225 is considered to have a coefficient of 0. Thereafter, only coefficients (16 coefficients from the top) disposed in a top area 1230 in a column direction among coefficients generated by the application of a vertical transform are left, and a remaining area 1235 is considered to have a coefficient of 0.

Referring to FIG. 12b, the size of a transform block 1255 including transform coefficients is 32×32, a transform is applied to a 16×16 top left area 1250 by the application of the RMTS, and a remaining area is considered to have a coefficient of 0. Since a vertical inverse transform is applied to the 16×16 area, significant coefficients are generated in a left area 1260 of the transform block, and a right area 1265 is still considered to have a coefficient of 0. Thereafter, since a horizontal inverse transform is applied to the left area 1260, significant coefficients may be present for the entire 32×32 area of the transform block.

In an embodiment of the present disclosure, there is proposed reduced 32-point MTS (RMTS32) in which a transform for high frequency coefficients is omitted. The 32-point MTS represents a method of applying a transform to a row or a column with a length of 32. The 32-point MTS can require up to 64 multiplication operations per output sample by considering the worst computational complexity, and thus the RMTS32 can reduce the computational complexity and also reduce memory usage.

According to the RMTS32, when an MTS flag is 1 (or when an MTS index is greater than 0) and a block width (height) is greater than or equal to 32, a remaining area is considered to be 0 (zero-out) while a maximum 16×16 top left area is maintained, and up to left (top) 16 coefficients are maintained. Since zero-out is independently applied in the horizontal and vertical directions, the RMTS may be applied to all block shapes. Assuming that RMTS is applied to a 32-length, a 16×16 top left area may be maintained for a 32×32 transform block, a 16×8 top left area may be maintained for a 32×8 transform block, and a 16×16 top left area may be maintained for a 16×32 transform block.

The computational complexity of 32-point MTS can be reduced to a half by using the RMTS32 from a perspective of an operation count. In this case, the 32-point MTS is a transform matrix applied to a row or a column with a length 32 of a block (when an MTS index is greater than 0 while only an MTS index is used for deriving a transform combination). Furthermore, from a perspective of memory usage, only a half the transform basis vectors of 32-point MTS matrices needs to be stored. With respect to an area considered to be zero, residual coding may be omitted because a related subblock flag is implicitly derived as 0, and a parameter for truncated unary binarization of the last coefficient position may be adjusted depending on a position at which a sufficient transform coefficient can be present.

From a perspective of memory usage, the RMTS32 proposed in this embodiment generates 16 coefficients for a row or a column with a 32-length. Hence, in 32×32 DST-7/DCT-8, only the first 16 transform basis vectors need to be stored, and the memory usage for storing 32-length DST-7/DCT-8 can be reduced to a half (e.g., from 2 KB to 1 KB).

For example, a residual coding syntax for implementing the above-described RMTS32 may be configured as in the following Table 9.

TABLE 9

| | Descriptor |
|---|---|
| residual_coding( x0, y0, log2TbWidth, log2TbHeight, cIdx ) { | |
|   if( transform_skip_enabled_flag && | |
|   ( cIdx != 0 \|\| tu_mts_flag[ x0 ][ y0 ] == 0 ) && | |
|     ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   ...... | |
|   for( i = lastSubBlock; i >= 0; i− − ) { | |
|     ...... | |
|     if( ( i < lastSubBlock ) && ( i > 0 ) ) { | |
|       if( transform_skip_flag[ x0 ][ y0 ][ cIdx ] == 1 \|\| ( tu_mts_flag[ x0 ][ y0 ] == 0 && | |
|         ( xS << log2SbSize ) < 32 && ( yS << log2SbSize ) < 32 ) \|\| | |
|         ( tu_mts_flag[ x0 ][ y0 ] == 1 && ( cIdx != 0 \|\| ( ( xS << log2SbSize ) < 16 ) && | |
|         ( ( yS << log2SbSize ) < 16 ) ) ) ) | |
|       coded_sub_block_flag[ xS ][ yS ] | ae(v) |
|       inferSbDcSigCoeffFlag = 1 | |
|     } | |

TABLE 9-continued

|  | Descriptor |
|---|---|
| ......<br>}<br>if( tu_mts_flag[ x0 ][ y0 ] && ( cIdx = = 0 ) )<br>   mts_idx[ x0 ][ y0 ][ cIdx ]<br>} | <br><br><br>ae(v) |

Furthermore, a non-zero width (nonZeroW) and a non-zero height (nonZeroH) of an area to which a transform is applied in a transform block may be determined as follows.

nonZeroW=Min(nTbW,trTypeHor==0?32:16)

nonZeroH=Min(nTbH,trTypeVer==0?32:16)

Here, nTbW denotes a width of a current block (transform block), nTbH denotes a height of the current block (transform block), and trTypeHor and trTypeVer denote a type of horizontal transform kernel and a type of vertical transform kernel, respectively. Min(A, B) is a function for outputting a smaller value of A and B.

For example, trTypeHor and trTypeVer may be determined as in the following Table 10 based on an MTS index (mts_idx) that is an index indicating a transform type.

TABLE 10

| mts_idx | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

Here, values of trTypeHor and trTypeVer denote one of types of transform kernel. For example, 0 may denote DCT-2, 1 may denote DST-7, and 2 may denote DCT-8. In Table 10, if mts_idx is 0, trTypeHor and trTypeVer are also determined as 0. If mts_idx is not 0 (if it is greater than 0), trTypeHor and trTypeVer are also determined as a non-zero value (greater than 0).

In other words, the non-zero width (nonZeroW) of an area to which a transform is applied may be determined as a smaller value of a width (nTbw) of a current block (transform block) and 16 if a transform index (trTypeHor) is greater than a threshold value (e.g., 0) (i.e., if trTypeHor is not 0), and may be determined a smaller value of the width of the current block and 32 if the transform index (trType-Hor) is not greater than the threshold value (e.g., 0) (i.e., if trTypeHor is 0).

Furthermore, the non-zero height (nonZeroH) of the area to which the transform is applied may be determined as a smaller value of the height (nTbH) of the current block (transform block) and 16 if a vertical transform type index (trTypeVer) is greater than the threshold value (e.g., 0), and may be determined as a smaller value of the height (nTbH) of the current block (transform block) and 32 if the vertical transform type index (trTypeVer) is not greater than the threshold value (e.g., 0).

According to an embodiment of the present disclosure, only a half the 32-length DST-7/DCT-8 may be stored in the memory as follows.

For example, if a (horizontal or vertical) transform type index (trType) is 1 (e.g., DST-7) and the number of samples (nTbs) of a row or column of a transform target block is 32, a transform matrix may be derived as in the following Tables 11 and 12. Matrices of Tables 11 and 12 are horizontally concatenated to constitute one matrix. In [m][n], m is a transverse index, and n is a longitudinal index. If the matrix of Table 11 and the matrix of Table 12 are concatenated, a 16×32 matrix is derived, and the corresponding matrix becomes a matrix for a forward transform. An inverse transform may be performed through the matrix configured by Tables 11 and 12 and proper indexing. Furthermore, in Tables 11 and 12, the strike-out for 16 rows below means that the 16 rows are deleted because they are unnecessary by the application of a reduced transform.

TABLE 11 transMatrix[ m ][ n ] = transMatrixCol0to15[ m ][ n ] with m = 0..15, n = 0..15
transMatrixCol0to15 =
{
{ 4 9 13 17 21 26 30 34 38 42 45 50 53 56 60 63 }
{ 13 26 38 50 60 68 77 82 86 89 90 88 85 80 74 66 }
{ 21 42 60 74 84 89 89 84 74 60 42 21 0 −21 −42 −60 }
{ 30 56 77 88 89 80 63 38 9 −21 −50 −72 −85 −90 −84 −68 }
{ 38 68 86 88 74 45 9 −30 −63 −84 −90 −78 −53 −17 21 56 }
{ 45 78 90 77 42 −4 −58 −80 −90 −74 −38 9 53 82 89 72 }
{ 53 85 85 53 0 −53 −85 −85 −53 0 53 85 85 53 0 −53 }
{ 60 89 74 21 −42 −84 −84 −42 21 74 89 60 0 −60 −89 −74 }
{ 66 90 56 −13 −74 −88 −45 26 80 84 34 −38 −85 −78 −21 50 }
{ 72 86 34 −45 −89 −63 13 78 82 21 −56 −90 −53 26 84 77 }
{ 77 80 9 −72 −84 −17 66 86 26 −60 −88 −34 53 90 42 −45 }
{ 80 72 −17 −36 −60 34 90 46 −50 −89 −30 63 85 13 −74 −78 }
{ 84 60 −42 −89 −21 74 74 −21 −89 −42 60 84 0 −84 −60 42 }
{ 86 45 −63 −78 21 90 26 −77 −66 42 88 4 −85 −50 60 80 }
{ 88 30 −78 −56 60 77 −34 −88 4 89 26 −80 −53 63 74 −38 }
{ 90 13 −88 −26 84 88 −78 −50 72 60 −63 −68 53 77 −42 −82 }
{ ~~90 -4 -90 9 89 -13 -88 17 88 -21 -86 26 85 -30 -84 34~~ }
{ ~~89 -21 -84 42 74 -60 -60 74 42 -84 -21 89 0 -89 21 84~~ }
{ ~~88 -38 -72 68 42 -86 -4 88 -34 -74 66 45 -85 -9 89 -30~~ }
{ ~~85 -53 -53 85 0 -85 53 53 -85 0 85 -53 -53 85 0 -85~~ }

TABLE 11-continued

{
~~{ 82 -66 -30 90 -42 -56 86 -13 -77 74 17 -88 53 45 -89 26 }~~
~~{ 78 -77 -4 80 -74 -9 82 -72 -13 84 -68 -17 85 -66 -21 86 }~~
~~{ -74 -84 21 60 -89 42 42 -89 60 21 -84 74 0 -74 84 -21 }~~
~~{ -68 -88 45 30 -84 78 -17 -56 90 -60 -13 77 -85 34 42 -88 }~~
~~{ -63 -90 66 -4 -60 90 -68 9 56 -89 72 -13 -53 88 -74 17 }~~
~~{ -56 -88 80 -38 -21 72 -90 68 -17 -42 82 -86 53 4 -60 88 }~~
~~{ -50 -82 88 -66 21 30 -72 90 -78 42 9 -56 85 -86 60 -13 }~~
~~{ -42 -74 89 -84 60 -21 -21 60 -84 89 -74 42 0 -42 74 -89 }~~
~~{ -34 -63 82 -90 84 -66 38 -4 -30 60 -80 90 -85 68 -42 9 }~~
~~{ -26 -50 68 -82 89 -88 80 -65 45 -21 -4 30 -53 72 -84 90 }~~
~~{ -17 -34 50 -63 74 -82 88 -90 88 -84 77 -66 53 -38 21 -4 }~~
~~{ -9 -17 26 -34 42 -50 56 -63 68 -74 78 -82 85 -88 89 -90 }~~
},

TABLE 12 transMatrix[ m ][ n ] = transMatrixCol16to31 [ m − 16 ][ n ] with m = 16..31, n = 0..15
transMatrixCol16to31 =
{
{ 66 68 72 74 77 78 80 82 84 85 86 88 88 89 90 90 }
{ 56 45 34 21 9 −4 −17 −30 −42 −53 −63 −72 −78 −84 −88 −90 }
{ −74 −84 −89 −89 −84 −74 −60 −42 −21 0 21 42 60 74 84 89 }
{ −45 −17 13 42 66 82 90 86 74 53 26 −4 −34 −60 −78 −88 }
{ 80 90 82 60 26 −13 −50 −77 −89 −85 −66 −34 4 42 72 88 }
{ 34 −13 −56 −84 −88 −68 −30 17 60 85 88 66 26 −21 −63 −86 }
{ −85 −85 −53 0 53 85 85 53 0 −53 −85 −85 −53 0 53 85 }
{ −21 42 84 84 42 −21 −74 −89 −60 0 60 89 74 21 −42 −84 }
{ 88 72 9 −60 −90 −63 4 68 89 53 −17 −77 −86 −42 30 82 }
{ 9 −66 −88 −42 38 88 68 −4 −74 −85 −30 50 90 60 −17 −80 }
{ −90 −50 38 89 56 −30 −88 −63 21 85 68 −13 −82 −74 4 78 }
{ 4 82 68 −21 −88 −56 38 90 42 −53 −88 −26 66 84 9 −77 }
{ 89 21 −74 −74 21 89 42 −60 −84 0 84 60 −42 −89 −21 74 }
{ −17 −90 −30 74 68 −38 −88 −9 84 53 −56 −82 13 89 34 −72 }
{ −86 9 90 21 −82 −50 66 72 −42 −85 13 90 17 −84 −45 68 }
{ 30 86 −17 −89 4 90 9 −88 −21 85 34 −80 −45 74 56 −66 }
~~{ 82 -38 -80 -42 -78 -45 -77 -50 -74 -53 -72 -56 -68 -60 -66 -63 }~~
~~{ -42 -74 60 60 -74 -42 84 21 -89 0 89 -21 -84 42 74 -60 }~~
~~{ -77 63 50 -84 -13 90 -26 -78 60 53 -82 -17 90 -21 -80 56 }~~
~~{ 53 53 -85 0 85 -53 -53 85 0 -85 53 53 -85 0 85 -53 }~~
~~{ 68 -80 -4 84 -63 -34 90 -38 -60 85 -9 -78 72 21 -88 50 }~~
~~{ -63 -26 88 -60 -30 88 -56 -34 89 -53 -38 90 -50 -42 90 -45 }~~
~~{ -60 89 -42 -42 89 -60 -21 84 -74 0 74 -84 21 60 -89 42 }~~
~~{ 72 -4 -66 89 -50 -26 82 -80 21 53 -90 63 9 -74 86 -38 }~~
~~{ 50 -88 77 -21 -45 86 -78 26 42 -85 80 -30 -38 84 -82 34 }~~
~~{ -78 34 26 -74 90 -66 13 45 -84 85 -50 -9 63 -89 77 -30 }~~
~~{ -38 77 -90 74 -34 -17 63 -88 84 -53 4 45 -80 89 -68 26 }~~
~~{ 84 -60 22 21 -60 84 -89 74 -42 0 42 -74 89 -84 60 -21 }~~
~~{ 26 -56 78 -89 86 -72 45 -13 -21 53 -77 88 -88 74 -50 17 }~~
~~{ -88 78 -63 42 -17 -9 34 -56 74 -85 90 -86 77 -60 38 -13 }~~
~~{ -13 30 -45 60 -72 80 -86 90 -89 85 -78 68 -56 42 -26 9 }~~
~~{ -90 88 -86 84 -80 -77 72 -66 60 -53 45 -38 30 -21 13 -4 }~~
}, Furthermore, if a (horizontal or vertical) transform type index (trType) is 2 (e.g., DCT-8) and the number of samples (nTbs) of a row or column of a transform target block is 32, a transform matrix may be derived as in the following Tables 13 and 14. Matrices of Tables 13 and 14 are horizontally concatenated to constitute one matrix. In [m][n], m is a transverse index, and n is a longitudinal index. If the matrix of Table 13 and the matrix of Table 14 are concatenated, a 16×32 matrix is derived, and the corresponding matrix becomes a matrix for a forward transform. An inverse transform may be performed through the matrix configured by Tables 13 and 14 and proper indexing. Furthermore, in Tables 13 and 14, the strike-out for 16 rows below means that the 16 rows are deleted because they are unnecessary by the application of a reduced transform.

TABLE 13 transMatrix[ m ][ n ] = transMatrixCol0to15[ m ][ n ] with m = 0..15, n = 0..15
transMatrixCol0to15 =
{
{ 90 90 89 88 88 86 85 84 82 80 78 77 74 72 68 66 }
{ 90 88 84 78 72 63 53 42 30 17 4 −9 −21 −34 −45 −56 }
{ 89 84 74 60 42 21 0 −21 −42 −60 −74 −84 −89 −89 −84 −74 }
{ 88 78 60 34 4 −26 −53 −74 −86 −90 −82 −66 −42 −13 17 45 }
{ 88 72 42 4 −34 −66 −85 −89 −77 −50 −13 26 60 82 90 80 }
{ 86 63 21 −26 −66 −88 −85 −60 −17 30 68 88 84 56 13 −34 }

TABLE 13-continued

```
{ 85 53 0 -53 -85 -53 0 53 85 85 53 0 -53 -85 -85 }
{ 84 42 -21 -74 -89 -60 0 60 89 74 21 -42 -84 -84 -42 21 }
{ 82 30 -42 -86 -77 -17 53 89 68 4 -63 -90 -60 9 72 88 }
{ 80 17 -60 -90 -50 30 85 74 4 -68 -88 -38 42 88 66 9 }
{ 78 4 -74 -82 -13 68 85 21 -63 -88 -30 56 89 38 -50 -90 }
{ 77 -9 -84 -66 26 88 53 -42 -90 -38 56 88 21 -68 -82 -4 }
{ 74 -21 -89 -42 60 84 0 -84 -60 42 89 21 -74 -74 21 89 }
{ 72 -34 -89 -13 82 56 -53 -84 9 88 38 -68 -74 30 90 17 }
{ 68 -45 -84 17 90 13 -85 -42 72 66 -50 -82 21 90 9 -86 }
{ 66 -56 -74 45 80 -34 -85 21 88 -9 -90 -4 89 17 -86 -30 }
```
~~{ 63 -66 -60 68 56 -72 -53 74 50 -77 -45 78 42 -80 -38 82 }~~
~~{ 60 -74 -42 84 21 -89 0 89 -21 -84 -42 74 -60 -60 74 42 }~~
~~{ 56 -80 -21 90 -17 -82 53 60 -78 -26 90 -13 -84 50 63 -77 }~~
~~{ 53 -85 0 85 -53 -53 85 0 -85 53 53 -85 0 85 -53 -53 }~~
~~{ 50 -88 21 72 -78 -9 85 -60 -38 90 -34 -63 84 -4 -80 68 }~~
~~{ 45 -90 42 50 -90 38 53 -89 34 56 -88 30 60 -88 26 63 }~~
~~{ 42 -89 60 21 -84 74 0 -74 84 21 -60 89 -42 -42 89 -60 }~~
~~{ 38 -86 74 -9 -63 90 -53 -21 80 -82 26 50 -89 66 -4 72 }~~
~~{ 34 -82 84 -38 -30 80 -85 42 -26 -78 86 -45 -21 77 -88 50 }~~
~~{ 30 -77 89 -63 9 50 -85 84 -45 -13 66 -90 74 -26 -34 78 }~~
~~{ 26 -68 89 -80 45 -4 -53 84 -88 63 -17 -34 74 -90 77 -38 }~~
~~{ 21 -60 84 -89 74 -42 0 42 -74 89 -84 60 -21 -21 60 -84 }~~
~~{ 17 -50 74 -88 88 -77 53 -21 -13 45 -72 86 -89 78 -56 26 }~~
~~{ 13 -38 60 -77 86 -90 85 -74 56 -34 9 17 -42 63 -78 88 }~~
~~{ 9 -26 42 -56 68 -78 85 -89 90 -86 80 -72 60 -45 30 -13 }~~
~~{ 4 -13 21 -30 38 -45 53 -60 66 -72 77 -80 84 -86 88 -90 }~~
```
},
```

TABLE 14 transMatrix[ m ][ n ] = transMatrixCol16to31[ m − 16 ][ n ] with m = 16..31, n = 0..15
transMatrixCol16to31 =

```
{
{ 63 60 56 53 50 45 42 38 34 30 26 21 17 13 9 4 }
{ -66 -74 -80 -85 -88 90 -89 -86 -82 -77 -68 -60 -50 -38 -26 -13 }
{ -60 -42 -21 0 21 42 60 74 84 89 89 84 74 60 42 21 }
{ 68 84 90 85 72 50 21 -9 -38 -63 -80 -89 -88 -77 -56 -30 }
{ 56 21 -17 -53 -78 -90 -84 -63 -30 9 45 74 88 86 68 38 }
{ -72 -89 -82 -53 -9 38 74 90 80 50 4 -42 -77 -90 -78 -45 }
{ -53 0 53 85 85 53 0 -53 -85 -85 -53 0 53 85 85 53 }
{ 74 89 60 0 -60 -89 -74 -21 42 84 84 42 -21 -74 -89 -60 }
{ 50 -21 -78 -85 -38 34 84 80 26 -45 -88 -74 -13 56 90 66 }
{ -77 -84 -26 53 90 56 -21 -82 -78 -13 63 89 45 -34 -86 -72 }
{ -45 42- 90 53 -34 -88 -60 26 86 66 -17 -84 -72 9 80 77 }
{ 78 74 -13 -85 -63 30 89 50 -45 -90 -34 60 86 17 -72 -80 }
{ 42 -60 -84 0 84 60 -42 -89 -21 74 74 -21 -89 -42 60 84 }
{ -80 -60 50 85 -4 -88 -42 66 77 -26 -90 -21 78 63 -45 -86 }
{ -38 74 63 -53 -80 26 89 4 -88 -34 77 60 -56 -78 30 88 }
{ 82 42 -77 -53 68 63 -60 -72 50 78 -38 -84 26 88 -13 -90 }
```
~~{ 34 -84 -30 85 26 -86 -21 88 17 -88 -13 89 9 -90 -4 90 }~~
~~{ -84 -21 89 0 -89 21 84 -42 -74 60 60 -74 -42 84 21 -89 }~~
~~{ -30 89 -9 -85 45 66 -74 -34 88 -4 -86 42 68 -72 -38 88 }~~
~~{ 85 0 -85 53 53 -85 0 85 -53 -53 85 0 -85 53 53 -85 }~~
~~{ 26 -89 45 53 -88 17 74 -77 -13 86 -56 -42 90 -30 -66 82 }~~
~~{ -86 21 66 -85 17 68 -84 13 72 -82 9 74 -80 4 77 -78 }~~
~~{ -21 84 -74 0 74 -84 21 60 -89 42 42 -89 60 21 -84 74 }~~
~~{ 88 -42 -34 85 -77 13 60 -90 56 17 -78 84 -30 -45 88 -68 }~~
~~{ 17 -74 88 -53 -13 72 -89 56 9 -68 90 -60 -4 66 -90 63 }~~
~~{ -88 60 -4 -53 86 -82 42 17 -68 -90 -72 21 38 -80 88 -56 }~~
~~{ -13 60 -86 85 -56 9 42 -78 90 -72 30 21 -66 88 -82 50 }~~
~~{ 89 -74 42 0 -42 74 -89 84 -60 21 21 -60 84 -89 74 -42 }~~
~~{ 9 -42 68 -85 90 -80 60 -30 -4 38 -66 84 -90 82 -63 34 }~~
~~{ -90 84 -72 53 -30 4 21 -45 66 -80 88 -89 82 -68 50 -26 }~~
~~{ 4 -21 -38 53 -66 77 -84 88 -90 88 -82 74 -63 50 -34 17 }~~
~~{ -90 -89 88 -85 82 -78 74 -68 63 -56 50 -42 34 -26 17 -9 }~~
```
},
```

By constructing a transform matrix for generating an output vector including 16 sample values for an input vector including 32 residual signal samples (upon forward transform) as in Tables 11 and 12 or Tables 13 and 14 and performing an inverse transform that outputs an output vector including 32 residual signal samples for an input vector including 16 values using the matrices of Tables 11 and 12 or Tables 13 and 14 and using the indexing for an inverse transform (upon inverse transform), computational complexity and memory usage can be reduced. For example, a when a 16×32 matrix derived by concatenating Tables 11 and 12 (or Tables 13 and 14) in the horizontal direction is left as a forward transform matrix, a matrix derived by transposing the forward transform matrix is an inverse transform matrix, and therefore the decoding apparatus 200 may perform an inverse transform through the indexing corresponding to a transpose operation on each component of the forward transform matrix.

Another embodiment of the present disclosure provides a method for residual coding for RMTS32. In the present embodiment, coefficients may be scanned only in an area in which non-zero coefficients may be present. In other words, a zero-out area is not scanned and may be considered to be filled with values of 0. In the zero-out case of the RMTS32, a scanned area may be a 16×16 top left area, and the same scan order as 16×16 TU may be applied to the 16×16 top left area. Furthermore, truncated unary binarization at the last coefficient position may be adjusted by considering a maximum possible position.

Although some of the above-described embodiments of the present disclosure are described as separate embodiments, the present disclosure is not limited thereto. That is, the above-described embodiments may be independently performed or one or more embodiments may be performed in a combined manner.

An embodiment which will be described below provides a method for partitioning a block into sub-blocks and applying a transform to the partitioned sub-blocks. A transform technique applied to each sub-block partitioned from a block corresponding to a transform unit may be called a sub-block transform (SBT).

RMTS32 proposed above may be applied to all cases in which 32-point DST-7 or 32-point DCT-8 is applied as well as cases in which MTS is applied. For example, a transform may be applied as illustrated in FIG. 13a to FIG. 18d.

Although DST-7 or DCT-8 may be applied to components of each sub-block as illustrated in FIG. 13a to FIG. 18d, a transform pair applied in the horizontal direction and the vertical direction is not limited to example of FIG. 13a to FIG. 18d and various transform pairs may be applied. For example, a transform pair applied to each sub-block may be indicated by an index (e.g., MTS index) or may be implicitly determined according to a block partitioned form and the position of a sub-block to which a transform is applied.

In FIG. 13a to FIG. 18d, the width and the height of a block (e.g., coding unit) are represented by w and h. When the width and the height of a sub-block to which a separable transform is actually applied are represented as a pair of (width, height), the transform may be applied to sub-blocks having sizes of (w1, h), (w−w1, h), (w, h1), and (w, h−h1). Here, w1 may be ¼, ½, ¾, or p/m width w, and h1 may be ¼, ½, ¾, or q/n height h.

A sub-block to which the transform is applied may be positioned on the left or right of a block when the block is partitioned in the vertical direction as illustrated in FIGS. 13a, 13b, 15a, and 15b and may be positioned on the top or bottom of the block as illustrated in FIGS. 14a, 14b, 16a, and 16b. The sub-block transform may be applied to a residual signal of a block to which an inter-prediction is applied, as illustrated in FIG. 13a to FIG. 18d.

A flag (sub-block transform (SBT) flag) for indicating whether a block including a corresponding residual signal is partitioned and a transform is applied to one sub-block may be signaled. When the SBT flag is 1, the block is partitioned into a plurality of sub-blocks and a transform is performed. When the SBT flag is 0, the block is not additionally partitioned. In the present specification, SBT represents a method of applying a transform to only one of sub-blocks (transform units) partitioned from a coding unit.

Figure 13A:
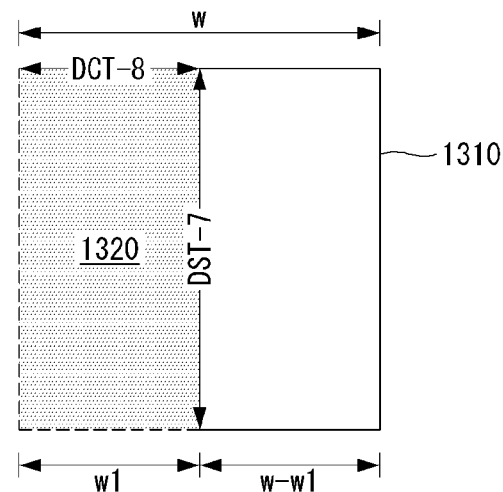
FIGS. 13*a* and 13*b* illustrate an example of a transform for subblocks of a block, to which a symmetric vertical split is applied, according to an embodiment of the present disclosure.
Figure 13B:
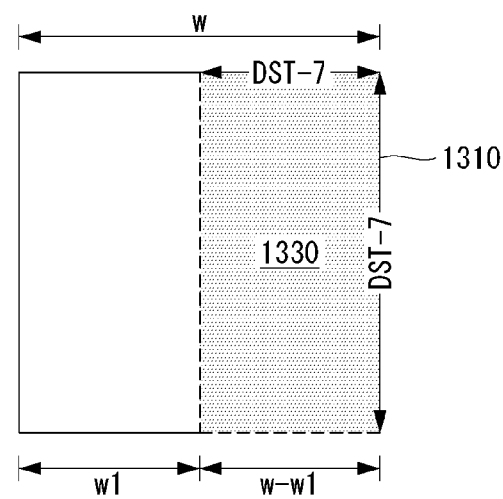
Figure 14A:
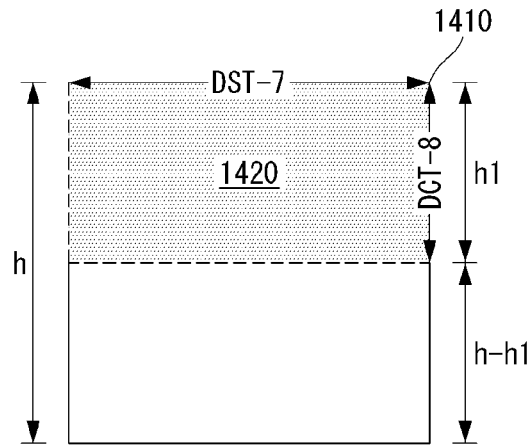
FIGS. 14*a* and 14*b* illustrate an example of a transform for subblocks of a block, to which a symmetric horizontal split is applied, according to an embodiment of the present disclosure.
Figure 14B:
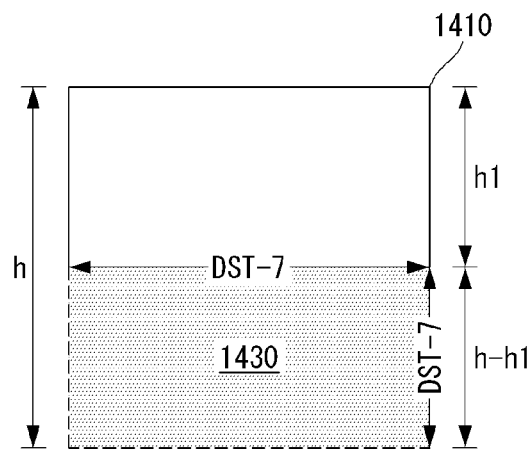

When the SBT flag is 1, a flag (SBT horizontal flag) indicating a partitioning direction (vertical direction or horizontal direction) of the block may be signaled. Here, when the SBT horizontal flag is 0, the block may be partitioned in the vertical direction as illustrated in FIG. 13a or 13b. When the SBT horizontal flag is 1, the block may be partitioned in the horizontal direction as illustrated in FIG. 14a or 14b.

In addition, when the SBT flag is 1, a flag (SBT position flag) indicating the position of a sub-block to which a transform is actually applied among sub-blocks partitioned from the horizontal block may be signaled. For example, a transform may be applied to a first sub-block (left or upper sub-block) when the SBT position flag is 0 and the transform may be applied to a second sub-block (right or lower sub-block) when the SBT position flag is 1.

Furthermore, a block may be partitioned based on ½ or ¼ the width (w) or the height (h) thereof, and a flag (SBT quad flag) indicating a point at the width or the height may be signaled. The block may be partitioned based on ½ the width or the height thereof as illustrated in FIG. 13a, 13b, 14a, or 14b when the SBT quad block flag is 0 and may be partitioned based on ¼ the width or the height thereof as illustrated in FIG. 15a, 15b, 16a, or 16b when the SBT quad block flag is 1.

FIGS. 13a and 13b illustrate an example of a transform for subblocks of a block, to which a symmetric vertical partitioning is applied, according to an embodiment of the present disclosure. When the flag (SBT horizontal flag) indicating a partitioning direction of a block 1310 is 0, the block may be partitioned in the vertical direction as illustrated in FIGS. 13a and 13b. When the flag (SBT horizontal flag) indicating a partitioning direction of a block 1310 is 0, the block (e.g., coding unit) 1310 is partitioned into a first sub-block 1320 positioned on the left and a second sub-block 1330 positioned on the right based on the vertical boundary, as illustrated in FIGS. 13a and 13b. In the FIGS. 13a and 13b, the block 1310 may be partitioned into the first sub-block 1320 and the second sub-block 1330 based on ½ the width of the block (w1=½*w) when the width of the block 1510 is w.

When the block 1310 is partitioned as illustrated in FIGS. 13a and 13b, a sub-block to which a transform is applied between the sub-blocks 1320 and 1330 may be determined based on the flag (SBT position flag) indicating a sub-block to which a transform is applied. A transform may be applied to the first sub-block 1320 positioned on the left, as illustrated in FIG. 13a, when the SBT position flag is 0 and the transform may be applied to the second sub-block 1330 positioned on the right, as illustrated in FIG. 13b, when the SBT position flag is 1.

FIGS. 14a and 14b illustrate an example of a transform for subblocks of a block, to which a symmetric horizontal partitioning is applied, according to an embodiment of the present disclosure. When the flag (SBT horizontal flag) indicating a partitioning direction of a block 1410 is 1, the block 1410 may be partitioned in the horizontal direction as illustrated in FIGS. 14a and 14b. The block (e.g., coding unit) 1410 is partitioned into a first sub-block 1420 positioned in the upper part and a second sub-block 1430 positioned in the lower part based on the horizontal boundary, as illustrated in FIGS. 14a and 14b. When the flag (SBT horizontal flag) indicating a partitioning direction of the block 1410 is 1, the block 1410 may be partitioned into the first sub-block 1420 and the second sub-block 1430 based on ½ the height of the block 1410 (h1=½*h) when the height of the block 1510 is h, as illustrated in FIGS. 14a and 14b.

When the block 1410 is partitioned as illustrated in FIGS. 14a and 14b, a sub-block to which a transform is applied between the sub-blocks 1420 and 1430 may be determined based on the flag (SBT position flag) indicating a sub-block to which a transform is applied. A transform may be applied to the first sub-block 1420 positioned in the upper part, as illustrated in FIG. 14*a*, when the SBT position flag is 0 and the transform may be applied to the second sub-block 1430 positioned in the lower part, as illustrated in FIG. 14*b*, when the SBT position flag is 1.

Figure 15A:
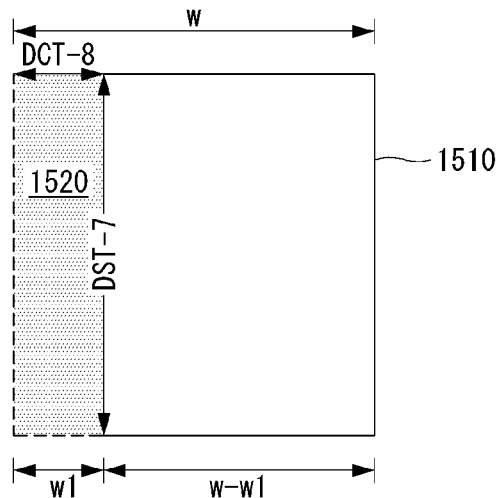
FIGS. 15*a* and 15*b* illustrate an example of a transform for subblocks of a block, to which an asymmetric vertical split is applied, according to an embodiment of the present disclosure.
Figure 15B:
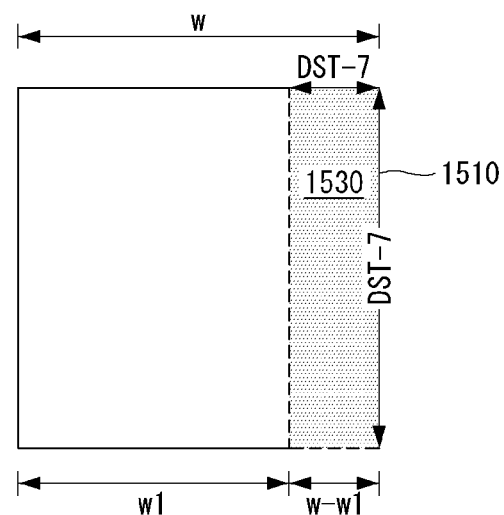

FIGS. 15*a* and 15*b* illustrate an example of a transform for subblocks of a block, to which an asymmetric vertical partitioning is applied, according to an embodiment of the present disclosure. When the flag (SBT horizontal flag) indicating a partitioning direction of a block 1510 is 0, the block 1510 may be partitioned in the vertical direction as illustrated in FIGS. 15*a* and 15*b*. The block (e.g., coding unit) 1510 is partitioned into a left sub-block and a right sub-block based on the vertical boundary, as illustrated in FIGS. 15*a* and 15*b*. The block 1510 may be partitioned based on ¼ the width of the block 1510 (w1=¼*w) and a transform may be applied to the first sub-block 1520 corresponding to the left region corresponding to ¼ the width when the width of the block 1510 is w, as illustrated in FIG. 15*a*, or the block 1510 may be partitioned based on ¾ the width of the block 1510 (w1=¾*w) and a transform may be applied to the second sub-block 1530 corresponding to the right region corresponding to ¼ the width when the width of the block 1510 is w, as illustrated in FIG. 15*b*.

When the block 1510 is partitioned as illustrated in FIGS. 15*a* and 15*b*, a sub-block to which a transform is applied between the sub-blocks 1520 and 1530 may be determined based on the flag (SBT position flag) indicating a sub-block to which a transform is applied. A transform may be applied to the first sub-block 1520 corresponding to the ¼ left region, as illustrated in FIG. 15*a*, when the SBT position flag is 0 and the transform may be applied to the second sub-block 1530 corresponding to the ¼ right region, as illustrated in FIG. 15*b*, when the SBT position flag is 1.

Figure 16A:
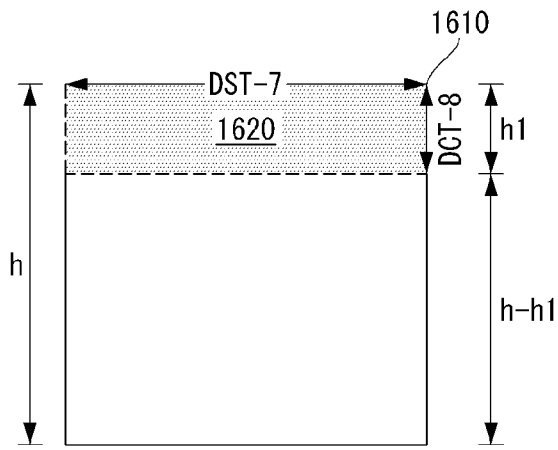
FIGS. 16*a* and 16*b* illustrate an example of a transform for subblocks of a block, to which an asymmetric horizontal split is applied, according to an embodiment of the present disclosure.
Figure 16B:
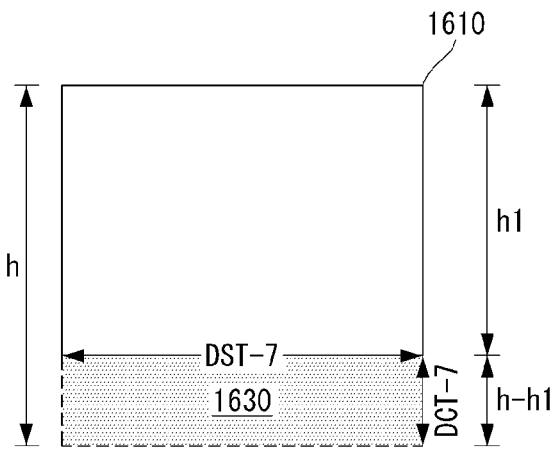

FIGS. 16*a* and 16*b* illustrate an example of a transform for subblocks of a block, to which an asymmetric horizontal partitioning is applied, according to an embodiment of the present disclosure. When the flag (SBT horizontal flag) indicating a partitioning direction of a block 1610 is 1, the block 1610 may be partitioned in the horizontal direction as illustrated in FIGS. 16*a* and 16*b*. The block (e.g., coding unit) 1610 may be partitioned into an upper sub-block and a lower sub-block based on the horizontal boundary, as illustrated in FIGS. 16*a* and 16*b*. The block 1610 may be partitioned based on ¼ the height of the block 1610 (h1=¼*h) and a transform may be applied to the first sub-block 1620 corresponding to the ¼ upper region when the height of the block 1610 is h, as illustrated in FIG. 16*a*, or the block 1610 may be partitioned based on ¾ the height of the block 1610 (h1=¾*h) and a transform may be applied to the second sub-block 1630 corresponding to the ¼ lower region when the height of the block 1610 is h, as illustrated in FIG. 16*b*.

When the block 1610 is partitioned as illustrated in FIGS. 16*a* and 16*b*, a sub-block to which a transform is applied between the sub-blocks 1620 and 1630 may be determined based on the flag (SBT position flag) indicating a sub-block to which a transform is applied. A transform may be applied to the first sub-block 1620 corresponding to the ¼ upper region, as illustrated in FIG. 16*a*, when the SBT position flag is 0 and the transform may be applied to the second sub-block 1630 corresponding to the ¼ lower region, as illustrated in FIG. 16*b*, when the SBT position flag is 1.

When a horizontal transform and a vertical transform are determined for a specific block (without designating a horizontal transform and a vertical transform through MTS signaling) as illustrated in FIGS. 13*a* to 18*d*, the above-described RMTS32 may be applied if the width or the height of the block I s 32. When SBT is applied as illustrated in FIGS. 13*a* to 18*d*, DST-7 or DCT-8 may be used as a transform kernel for the horizontal transform and the vertical transform. When RMTS32 is applied, residual coding may be omitted for a region to which zero-out is applied. Alternatively, scanning and residual coding may be applied to only a region to which zero-out is not applied. Sub-blocks according to symmetric partitioning for a residual block may have (width, height) of (w/2, h) or (w, h/2), as illustrated in FIGS. 17*a* to 17*d*, and zero-out may be applied to a sub-block having a side of a reference length (e.g., 32) or longer. Further, sub-blocks according to asymmetric partitioning for a residual block may have (width, height) of (w/4, h) or (w, h/4), as illustrated in FIGS. 18*a* to 18*d*, and zero-out may be applied to a sub-block having a side of a reference length (e.g., 16) or longer.

Figure 17A:
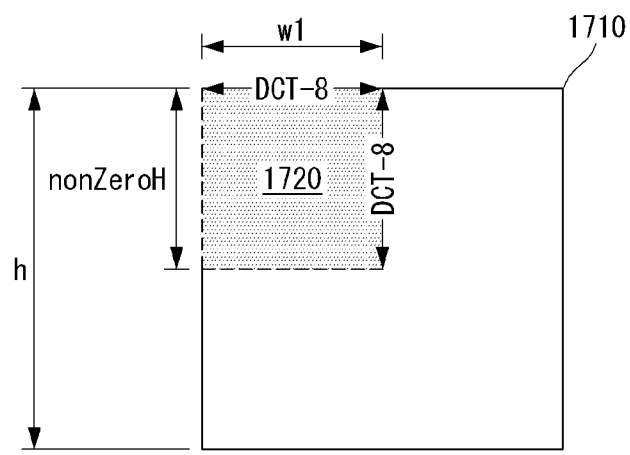
FIGS. 17a to 17d illustrate examples of transforms to which zero-out is applied in subblocks of a block, to which a symmetric split is applied, according to an embodiment of the present disclosure.
Figure 17B:
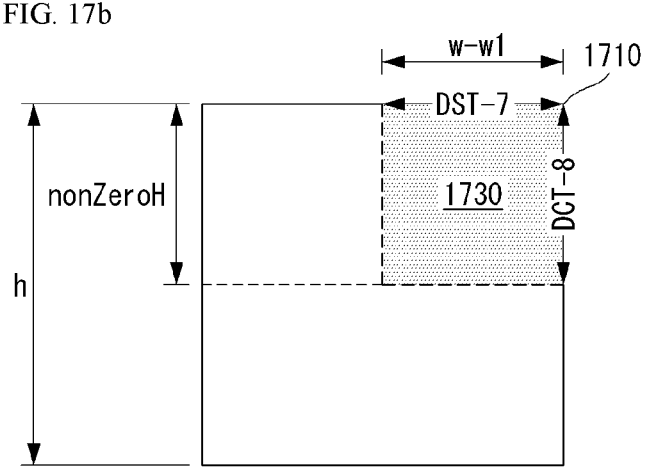
Figure 17C:
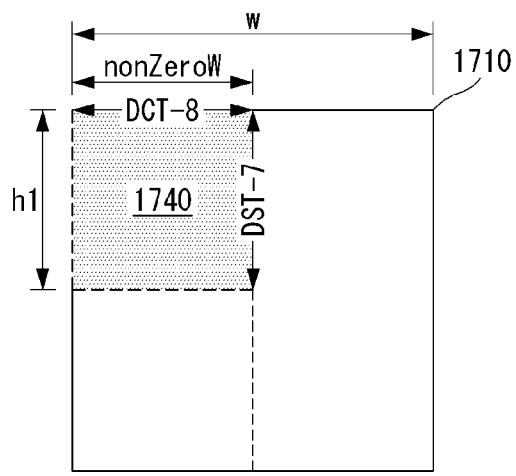
Figure 17D:
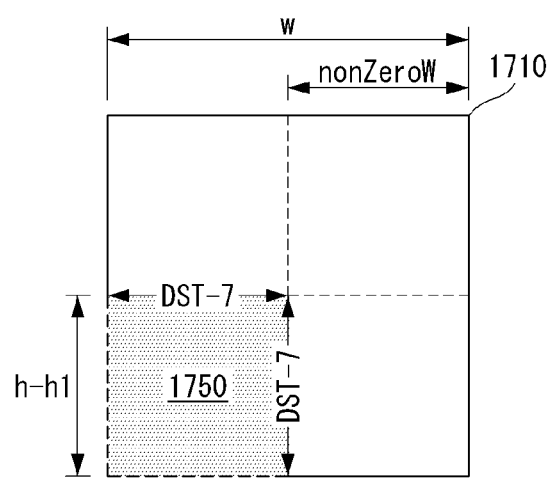

When a block is symmetrically partitioned and the width w or the height h thereof is equal to or greater than a predefined first length (e.g., 32) in FIGS. 17*a* to 17*d*, the width nonZeroW or the height nonZeroH of a transform target region is reduced to a second length (e.g., 16) less than the first length. For example, when a block 1710 is partitioned into a left sub-block and a right sub-block based on the vertical boundary, an upper region 1720 of the left sub-block may be determined as a transform target region, as illustrated in FIG. 17*a*, or an upper region 1730 of the right sub-block may be determined as a transform target region, as illustrated in FIG. 17*b*. Furthermore, when a block 1710 is partitioned into an upper sub-block and a lower sub-block based on the horizontal boundary, a left region 1740 of the upper sub-block may be determined as a transform target region, as illustrated in FIG. 17*c*, or a left region 1750 of the lower sub-block may be determined as a transform target region, as illustrated in FIG. 17*d*. In the present specification, a transform target region is a region in which a non-zero transform coefficient may be present when a decoder performs an (inverse) transform and may be substituted with an inverse transform target region.

Figure 18A:
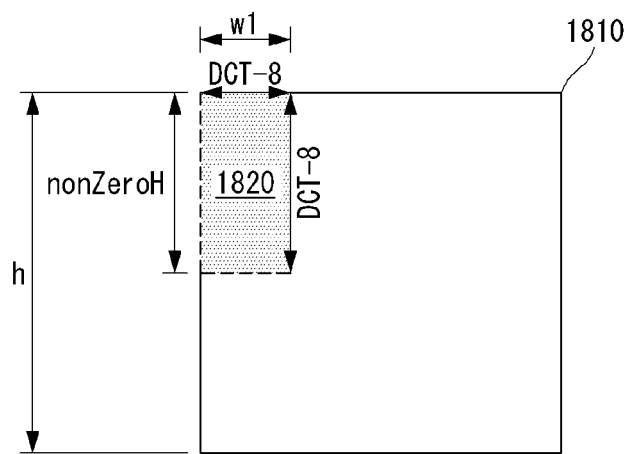
FIGS. 18a to 18d illustrate examples of transforms to which zero-out is applied in subblocks of a block, to which an asymmetric split is applied, according to an embodiment of the present disclosure.
Figure 18B:
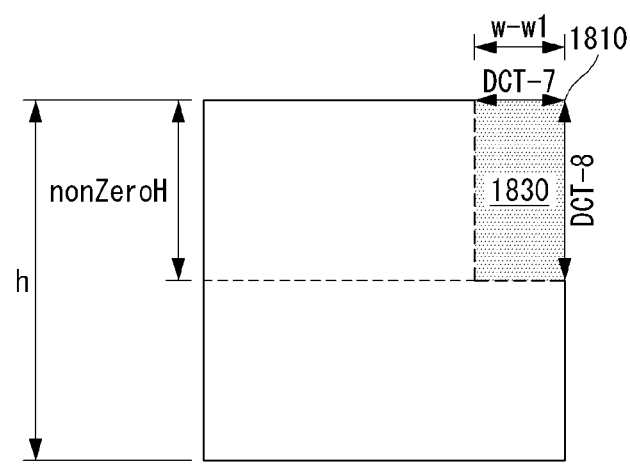
Figure 18C:
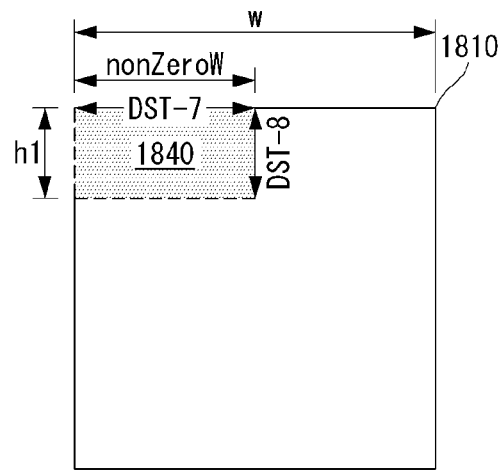
Figure 18D:
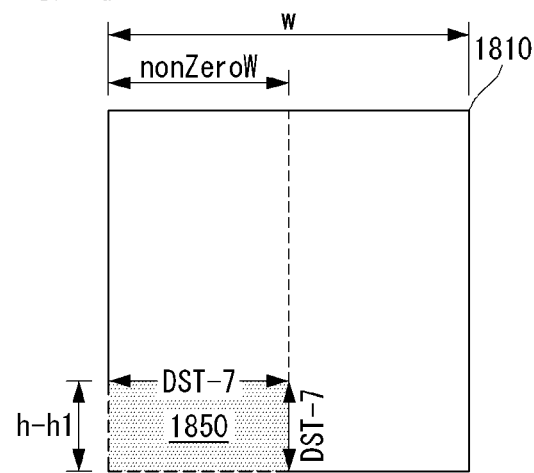

When a block is partitioned at a point corresponding to ¼ or ¾ the width w therein in the vertical direction, as illustrated in FIGS. 15*a* and 15*b*, and the width w or the height h thereof is equal to or greater than the predefined first length (e.g., 32) in FIGS. 18*a* to 18*d*, the width nonZeroW or the height nonZeroH of a transform target region is reduced to the second length (e.g., 16) less than the first length. For example, an upper region 1820 of the ¼ left region may be determined as a transform target region, as illustrated in FIG. 18*a*, when a block 1810 is partitioned based on ¼ the width w (w1=¼*w) and an upper region 1830 of the ¼ right region may be determined as a transform target region, as illustrated in FIG. 18*b*, when the block 1810 is partitioned based on ¾ the width w (w1=¾*w). Furthermore, a left region 1840 of the ¼ upper region may be determined as a transform target region, as illustrated in FIG. 18*c*, when the block 1810 is partitioned based on ¼ the height h thereof (h1=¼*h) and a left region 1850 of the ¼ lower region may be determined as a transform target region, as illustrated in FIG. 18*d*, when the block 1810 is partitioned based on ¾ the height h thereof (h1=¾*h).

The following embodiment provides a more specific method for realizing partitioning and transform per sub-block.

A residual signal block may be partitioned into a plurality of sub-blocks by applying SBT and a transform (horizontal transform and vertical transform) may be applied to one of the partitioned sub-blocks. DCT-2 may be applied in both the horizontal and vertical direction if any of the width and the height of a sub-block to which the transform is applied is equal to or greater than a reference value (e.g., 64) and DCT-8 may be applied if not. For example, a transform combination applied to a sub-block to which a transform is applied may be determined based on a partitioning direction and the position of the sub-block to which the transform is applied as shown in Table 22 below. Accordingly, when SBT is applied, the aforementioned reduced transform RMTS32 may be applied to perform zero-out if both the width and the height of a sub-block to which a transform is applied is the reference value (e.g., 32) or less.

That is, in the case of forward transform, the encoding apparatus 100 may apply length-M DST-7 or DCT-8 to M (e.g., 32) residual samples arranged in the row or column direction and output R (e.g., 16) (R<M) transform coefficients. On the other hand, in the case of reverse transform, the decoding 200 may apply reverse transform to only R transform coefficients corresponding to some of M transform coefficients arranged in the row or column direction and regard the remaining transform coefficients as 0.

A partitioning form of a transform unit to which SBT is applied may be determined by the following four syntax elements.

An SBT flag cu_sbt_flag indicates whether a current CU is partitioned into a plurality of sub-blocks (whether SBT is applied to a CU). For example, SBT is not applied to the current CU if the SBT flag cu_sbt_flag is 0 and SBT is applied to the current CU if the SBT flag cu_sbt_flag is 1.

An SBT size flag cu_sbt_quad_flag is parsed when SBT is applied and indicates the size of each sub-block. For example, a sub-block partitioned from a CU is ½ the size of the current CU if the SBT size flag cu_sbt_quad_flag is 0 and is ¼ the size of the current CU if the SBT size flag cu_sbt_quad_flag is 1. In other words, the CU is partitioned based on ½ the width or the height of the current CU, as illustrated in FIGS. 13a to 14b, if the SBT size flag cu_sbt_quad_flag is 0 and is partitioned based on ¼ or ¾ the width or the height of the current CU, as illustrated in FIGS. 15a to 16b, if the SBT size flag cu_sbt_quad_flag is 1.

An SBT direction flag cu_sbt_horizontal_flag is parsed when SBT is applied and indicates a partitioning direction of the current CU. Here, the partitioning direction may include the vertical direction and the horizontal direction. For example, the current CU is partitioned in the vertical direction, as illustrated in FIGS. 13a and 13b or FIGS. 15a and 15b, if the SBT direction flag cu_sbt_horizontal_flag is 0 and is partitioned in the horizontal direction, as illustrated in FIGS. 14a and 14b or FIGS. 16a and 16b, if the SBT direction flag cu_sbt_horizontal_flag is 1.

An SBT position flag cu_sbt_pos_flag indicates a sub-block having CBF indicating whether a valid transform coefficient is present in sub-blocks partitioned from the current CU based on the SBT size flag cu_sbt_quad_flag and the SBT direction flag cu_sbt_horizontal_flag. That is, the SBT position flag cu_sbt_pos_flag indicates a sub-block (transform unit) that may include a non-zero transform coefficient in the current CU. For example, the current CU is partitioned based on ½ the width thereof in the vertical direction, as illustrated in FIGS. 13a and 13b, if the SBT size flag cu_sbt_quad_flag is 0 and the SBT direction flag cu_sbt_horizontal_flag is 0, the transform is applied to the left sub-block 1320 if the SBT position flag cu_sbt_pos_flag is 0 and the transform is applied to the right sub-block 1330 if the SBT position flag cu_sbt_pos_flag is 1. The current CU is partitioned based on ½ the height thereof in the horizontal direction, as illustrated in FIGS. 14a and 14b, if the SBT size flag cu_sbt_quad_flag is 0 and the SBT direction flag cu_sbt_horizontal_flag is 1, the transform is applied to the upper sub-block 1420 if the SBT position flag cu_sbt_pos_flag is 0, and the transform is applied to the lower sub-block 1430 if the SBT position flag cu_sbt_pos_flag is 1. The current CU is partitioned based on ¼ the width thereof in the vertical direction, as illustrated in FIGS. 15a and 15b, if the SBT size flag cu_sbt_quad_flag is 1 and the SBT direction flag cu_sbt_horizontal_flag is 0, the transform is applied to the left sub-block 1520 if the SBT position flag cu_sbt_pos_flag is 0, and the transform is applied to the right sub-block 1530 if the SBT position flag cu_sbt_pos_flag is 1. The current CU is partitioned based on ¼ the height thereof in the horizontal direction, as illustrated in FIGS. 16a and 16b, if the SBT size flag cu_sbt_quad_flag is 1 and the SBT direction flag cu_sbt_horizontal_flag is 1, the transform is applied to the upper sub-block 1620 if the SBT position flag cu_sbt_pos_flag is 0, and the transform is applied to the lower sub-block 1630 if the SBT position flag cu_sbt_pos_flag is 1.

Syntax structures for realizing an embodiment of the present disclosure may be configured as shown in Table 15 to Table 19 below. Each syntax is merely an example and may be modified in various manners. Further, syntax elements less related to the embodiment of the present disclosure are omitted for simplification of description.

Table 15 shows an example of a sequence parameter set raw byte sequence payload (RBSP) syntax seq_parameter_set_rbsp according to an embodiment of the present disclosure

TABLE 15

|  | Descriptor |
|---|---|
| seq_parameter_set_rbsp( ) { |  |
| ...... |  |
| sps_mts_enabled_flag | u(1) |
| if( sps_mts_enabled_flag ) { |  |
| sps_explicit_mts_intra_enabled_flag | u(1) |
| sps_explicit_mts_inter_enabled_flag | u(1) |
| } |  |
| sps_sbt_enabled_flag | u(1) |
| if( sps_sbt_enabled_flag ) |  |
| sps_sbt_max_size_64_flag | u(1) |
| ...... |  |
| } |  |

In Table 15, sps_mts_enabled_flag indicates whether the sequence set RBSP syntax includes sps_explicit_mts_intra_enabled_flag and sps_explicit_mts_inter_enabled_flag. For example, the sequence parameter set RBSP syntax includes sps_explicit_mts_intra_enabled_flag and sps_explicit_mts_inter_enabled_flag if sps_mts_enabled_flag is 1 and the sequence parameter set RBSP syntax does not include sps_explicit_mts_intra_enabled_flag and sps_explicit_mts_inter_enabled_flag if sps_mts_enabled_flag is 0.

sps_explicit_mts_intra_enabled_flag indicates whether a transform unit syntax for intra coding units includes tu_mts_idx. For example, the transform unit syntax for intra coding units includes tu_mts_idx if sps_explicit_mts_intra_enabled_flag is 1 and the transform unit syntax for intra coding units does not include tu_mts_idx if sps_explicit_mts_intra_enabled_flag is 0. If sps_explicit_mts_intra_enabled_flag is not included, sps_explicit_mts_intra_enabled_flag is inferred as 0.

sps_explicit_mts_inter_enabled_flag indicates whether a transform unit syntax for intra coding units includes tu_mts_idx. For example, the transform unit syntax for intra coding units includes tu_mts_idx if sps_explicit_mts_inter_enabled_flag is 1 and the transform unit syntax for intra coding units does not include tu_mts_idx if sps_explicit_mts_inter_enabled_flag is 0. If sps_explicit_mts_inter_enabled_flag is not included, sps_explicit_mts_inter_enabled_flag is inferred as 0.

sps_sbt_enabled_flag indicates whether sub-block transform (SBT) is applicable to inter-predicted CUs. For example, SBT is disabled for inter-predicted CUs if sps_sbt_enabled_flag is 0 and SBT is enabled for the inter-predicted CUs if sps_sbt_enabled_flag is 1.

sps_sbt_max_size_64_flag indicates a maximum CU width and height that allow SBT. For example, the maximum CU width and height that allow SBT are 32 luma samples if sps_sbt_max_size_64_flag is 0 and the maximum CU width and height that allow SBT are 64 luma samples if sps_sbt_max_size_64_flag is 1. A maximum size MaxSbtSize that allows SBT may be determined based on sps_sbt_max_size_64_flag as follows.

MaxSbtSize=sps_sbt_max_size_64_flag?64:32

Table 16 shows an example of a picture parameter set RBSP syntax pic_parameter_set_rbsp according to an embodiment of the present disclosure.

TABLE 16

| | Descriptor |
|---|---|
| pic_parameter_set_rbsp( ) { | |
| ...... | |
| transform_skip_enabled_flag | se(v) |
| | u(1) |
| if( transform_skip_enabled_flag ) | |

TABLE 16-continued

| | Descriptor |
|---|---|
| log2_transform_skip_max_size_minus2 | ue(v) |
| ...... | |
| } | |

In Table 16, transform_skip_enabled_flag indicates whether the transform unit syntax can include transform_skip_flag. For example, the transform unit syntax includes transform_skip_flag if transform_skip_enabled_flag is 1 and the transform unit syntax does not include transform_skip_flag if transform_skip_enabled_flag is 0.

log 2_transform_skip_max_size_minus2 indicates a maximum block size for which transform skip is used and may have a value in the range of 0 to 3. If log 2_transform_skip_max_size_minus2 is not present, log 2_transform_skip_max_size_minus2 is inferred as 0. A variable MaxTsSize indicating the maximum block size for which transform skip can be applied may be set to 1<<(log 2_transform_skip_max_size_minus2+2).

Table 17 shows an example of a coding unit syntax coding_unit according to an embodiment of the present disclosure.

TABLE 17

| | Descriptor |
|---|---|
| coding_unit( x0, y0, cbWidth, cbHeight, treeType ) { | |
| ...... | |
|   if( !pcm_flag[ x0 ][ y0 ] ) { | |
|     if( CuPredMode[ x0 ][ y0 ] != MODE_INTRA && cu_skip_flag[ x0 ][ y0 ] = = 0 ) | |
|       cu_cbf | ae(v) |
|     if( cu_cbf ) { | |
|       if( CuPredMode[ x0 ][ y0 ] != MODE_INTRA && sps_sbt_enabled_flag && !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH || allowSbtHorH || allowSbtVerQ || allowSbtHorQ ) | |
|             cu_sbt_flag | ae(v) |
|         } | |
|         if( cu_sbt_flag ) { | |
|           if( ( allowSbtVerH || allowSbtHorH ) && ( allowSbtVerQ || allowSbtHorQ) ) | |
|             cu_sbt_quad_flag | ae(v) |
|           if( ( cu_sbt_quad_flag && allowSbtVerQ && allowSbtHorQ ) || ( !cu_sbt_quad_flag && allowSbtVerH && allowSbtHorH ) ) | |
|             cu_sbt_horizontal_flag | ae(v) |
|           cu_sbt_pos_flag | ae(v) |
|         } | |
|       } | |
|       transform_tree( x0, y0, cbWidth, cbHeight, treeType ) | |
|     } | |
|   } | |
| } | |

In Table 17, cu_sbt_flag indicates whether SBT is used for the current coding unit. For example, SBT is used for the current coding unit if cu_sbt_flag is 1 and SBT is not used for the current coding unit if cu_sbt_flag is 0. When SBT is used, a coding unit is partitioned into two transform units, one transform unit includes residual data, and the other transform unit does not include residual data.

cu_sbt_quad_flag indicates the size of a sub-block partitioned from the current coding unit. For example, a sub-block includes a transform unit that is ¼ the size of the current coding unit for the current coding unit if cu_sbt_quad_flag 1 and the sub-block includes a transform unit that is ½ the size of the current coding unit for the current coding unit if cu_sbt_quad_flag is 0. If cu_sbt_quad_ flag is not present, the value thereof is inferred as 0.

cu_sbt_horizontal_flag indicates a partitioning direction of the current coding unit. For example, the current coding unit is horizontally partitioned into two transform units if cu_sbt_horizontal_flag is 1 and the current coding unit is vertically partitioned into two transform units if cu_sbt_horizontal_flag is 0.

If cu_sbt_horizontal_flag is not present, the value thereof may be derived as follows.

If cu_sbt_quad_flag is 1, cu_sbt_horizontal_flag is set to be the same as allowSbtHorQ.

If not (if cu_sbt_quad_flag is 0), cu_sbt_horizontal_flag is set to be the same as allowSbtHorH.

cu_sbt_pos_flag indicates the position of a transform unit in which CBF flag tu_cbf_luma, tu_cbf_cb, and tu_cbf_cr) is present in the current coding unit. For example, CBF flag tu_cbf_luma, tu_cbf_cb, and tu_cbf_cr of a first transform unit is not present in the current coding unit if cu_sbt_ pos_flag is 1 and CBF flag tu_cbf_luma, tu_cbf_cb, and tu_cbf_cr of a second transform unit is not present in the current coding unit if cu_sbt_pos_flag is 0. A variable SbtNumFourthsTb0 may be derived as follows.

sbtMinNumFourths=cu_sbt_quad_flag?1:2

SbtNumFourthsTb0=cu_sbt_pos_flag?(4−sbtMin-NumFourths):sbtMinNumFourths

Figure 19:
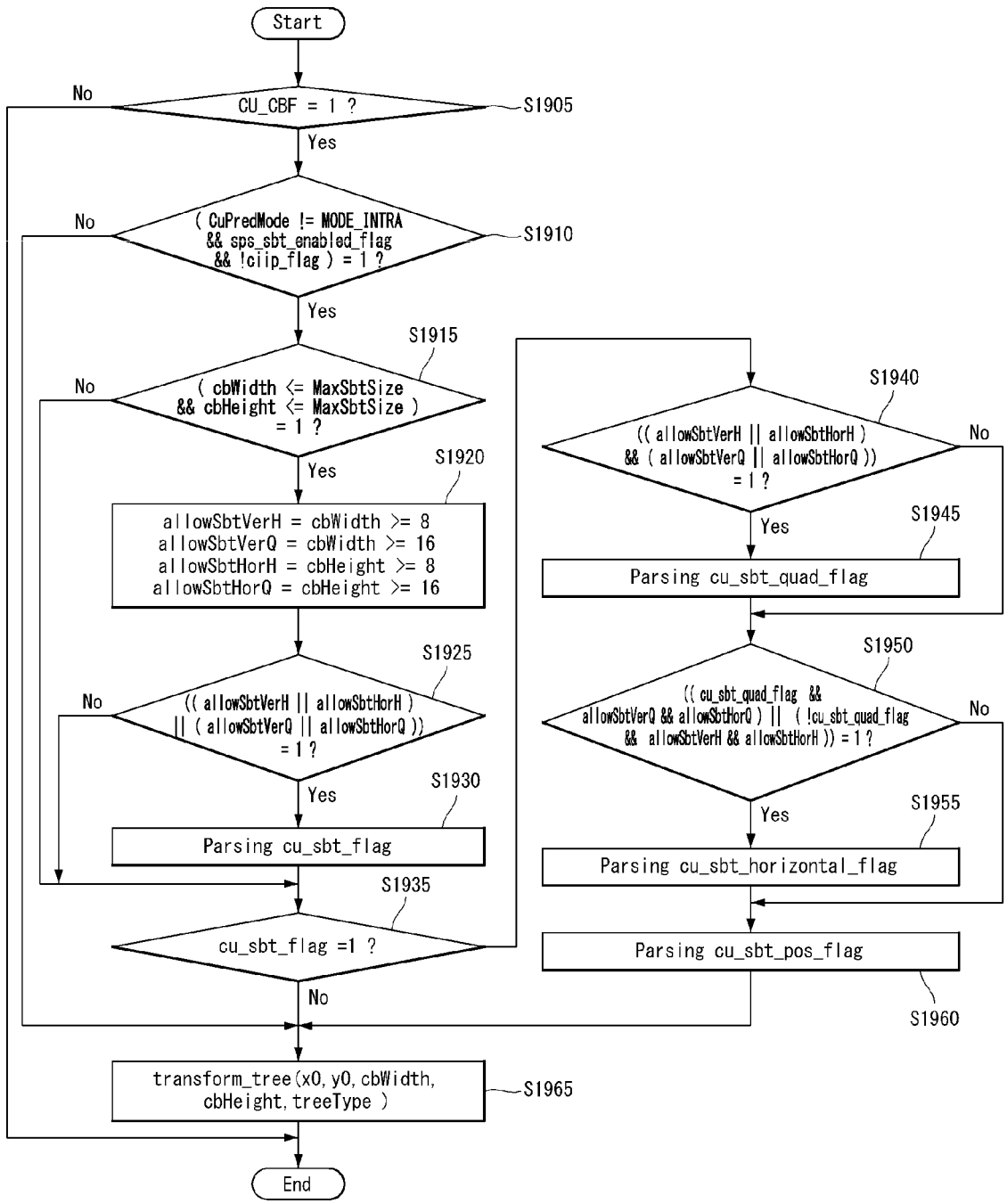
FIG. 19 is a flowchart of a process for decoding a coding unit based on a coding unit syntax according to an embodiment of the present disclosure.

FIG. 19 is a flowchart of a process for decoding a coding unit based on a coding unit syntax according to an embodiment of the present disclosure. The flowchart of FIG. 19 schematically illustrates the operation of the decoding apparatus 200 according to Table 17.

The decoding apparatus 200 checks whether the current CU includes a non-zero transform coefficient (whether CU_CBF is 1) (S1905). If CU_CBF is 1, the decoding apparatus 200 checks i) whether a prediction mode of the current CU is not the intra-prediction mode (CuPredMode != MODE_INTRA) (or the prediction mode of the current CU is the inter-prediction mode (CuPredMode=MODE_INTER)), ii) whether SBT is enabled for the current CU (sps_sbt_enabled_flag), and iii) whether prediction according to a combination of inter-prediction and intra-prediction is not applied (!ciip_flag) in step S1910. If the conditions of step S1910 are satisfied, the decoding apparatus 200 checks whether the width and the height of the current coding unit are equal to or less than a maximum SBT size in step S1915.

If the condition of step S1915 is satisfied, values of variables allowSbtVerH, allowSbtVerQ, allowSbtHorH, and allowSbtHorQ for determining whether to allow SBT are determined based on the width and the height of the current coding unit in step S1920. allowSbtVerH is determined to be 1 if the width cbWidth of the current coding unit is equal to or greater than 8 (0 if not), allowSbtVerQ is determined to be 1 if the width cbWidth of the current coding unit is equal to or greater than 16 (0 if not), allowSbtHorH is determined to be 1 if the height cbHeight of the current coding unit is equal to or greater than 8 (0 if not), and allowSbtHorQ is determined to be 1 if the height cbHeight of the current coding unit is equal to or greater than 16 (0 if not). Thereafter, the decoding apparatus 200 determines i) whether allowSbtVerH or allowSbtHorH is 1 or ii) whether allowSbtVerQ or allowSbtHorQ is 1 in step S1925. If the condition of step S1925 is satisfied, the decoding apparatus 200 parses cu_sbt_flag (S1930) and checks whether cu_ sbt_flag is 1 (i.e., whether SBT is applied to the current coding unit) (S1935).

If cu_sbt_flag is 1, the decoding apparatus 200 determines i) whether allowSbtVerH or allowSbtHorH is 1 and ii) allowSbtVerQ or allowSbtHorQ is 1 in step S1940. If the conditions of step S1940 are satisfied, the decoding apparatus 200 parses cu_sbt_quad_flag (S1945). The decoding apparatus 200 checks i) whether cu_sbt_quad_flag is 1 (CU is partitioned into ¼ size) and allowSbtVerQ and allowSbtHorQ are 1 or ii) whether cu_sbt_quad_flag is 0 (CU is partitioned into ½ size) and allowSbtVerH and allowSbtHorH is 1 in step S1950. If the conditions of step S1950 are satisfied, the decoding apparatus 200 parses cu_sbt_horizontal_flag (S1955). Thereafter, the decoding apparatus 200 parses cu_sbt_pos_flag (irrespective of the conditions of S1950) (S1960). Thereafter, the decoding apparatus 200 calls a transform tree syntax (S1965). When the transform tree syntax is called, the width cbWidth and the height cbHeight of the current coding unit are input as the width tbWidth and the height tbHeight of a transform unit.

Table 18 shows an example of the transform tree syntax transform_tree according to an embodiment of the present disclosure.

TABLE 18

| | Descriptor |
|---|---|
| transform_tree( x0, y0, tbWidth, tbHeight, treeType ) { <br>    InferTuCbfLuma = 1 <br>    if( IntraSubPartSplitType = = NO_ISP_SPLIT ) { <br>        if( tbWidth > MaxTbSizeY \|\| tbHeight > MaxTbSizeY ) { <br>            trafoWidth = ( tbWidth > MaxTbSizeY ) ? (tbWidth / 2) : tbWidth <br>            trafoHeight = ( tbHeight > MaxTbSizeY ) ? (tbHeight / 2) : tbHeight <br>            transform_tree( x0, y0, trafoWidth, trafoHeight ) <br>            if( tbWidth > MaxTbSizeY ) <br>                transform_tree( x0 + trafoWidth, y0, trafoWidth, trafoHeight, treeType ) <br>            if( tbHeight > MaxTbSizeY ) <br>                transform_tree( x0, y0 + trafoHeight, trafoWidth, trafoHeight, treeType ) <br>            if( tbWidth > MaxTbSizeY && tbHeight > MaxTbSizeY ) <br>                transform_tree( x0 + trafoWidth, y0 + trafoHeight, trafoWidth, trafoHeight, treeType ) <br>        } else { <br>            transform_unit( x0, y0, tbWidth, tbHeight, treeType, 0 ) <br>        } <br>    } else if( cu_sbt_flag ) { <br>        if( !cu_sbt_horizontal_flag ) { <br>            trafoWidth = tbWidth * SbtNumFourthsTb0 / 4 <br>            transform_unit( x0, y0, trafoWidth, tbHeight, treeType , 0 ) | |

TABLE 18-continued

| | Descriptor |
|---|---|
| ``             transform_unit( x0 + trafoWidth, y0, tbWidth − trafoWidth , tbHeight, treeType , 1 )         } else {             trafoHeight = tbHeight * SbtNumFourthsTb0 / 4             transform_unit( x0, y0, tbWidth, trafoHeight, treeType , 0 )             transform_unit( x0, y0 + trafoHeight, tbWidth, tbHeight − trafoHeight, treeType , 1 )         }     } else if( IntraSubPartitionsSplitType = = ISP_HOR_SPLIT ) {         trafoHeight = tbHeight / NumIntraSubPartitions         for( partIdx = 0; partIdx < NumIntraSubPartitions; partIdx++ )             transform_unit( x0, y0 + trafoHeight * partIdx, tbWidth, trafoHeight, treeType, partIdx )     } else if( IntraSubPartitionsSplitType = = ISP_VER_SPLIT ) {         trafoWidth = tbWidth / NumIntraSubPartitions         for( partIdx = 0; partIdx < NumIntraSubPartitions; partIdx++ )             transform_unit( x0 + trafoWidth * partIdx, y0, trafoWidth, tbHeight, treeType, partIdx )     } }`` | |

Figure 20:
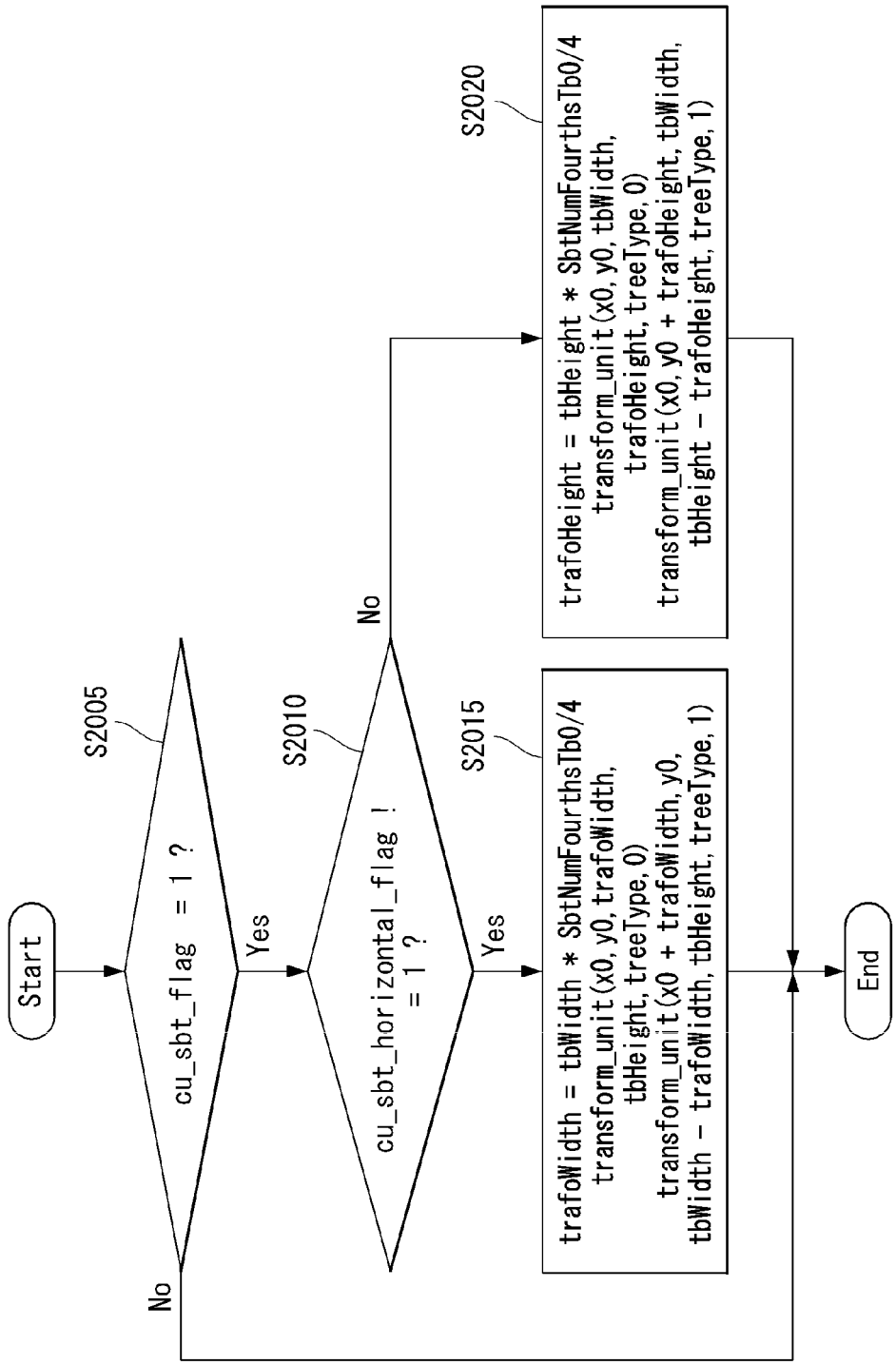
FIG. 20 is a flowchart of a process for decoding a transform tree syntax based on the coding unit syntax according to an embodiment of the present disclosure.

FIG. 20 is a flowchart of a process for decoding the transform tree syntax based on the coding unit syntax according to an embodiment of the present disclosure. The flowchart of FIG. 20 schematically illustrates the operation of the decoding apparatus 200 according to Table 18.

In step S2005, the decoding apparatus 200 checks whether cu_sbt_flag is 1 (whether SBT is applied to the current coding unit). If cu_sbt_flag is 1, the decoding apparatus 200 checks whether cu_sbt_horizontal_flag is 0 in step S2010. If cu_sbt_horizontal_flag is 0 (if the current coding unit is vertically partitioned), the decoding apparatus 200 determines a variable trafoWidth to be tbWidth*SbtNumFourthsTb0/4 in step S2015. Thereafter, the decoding apparatus 200 calls a transform unit syntax for a first sub-block and calls a transform unit syntax for a second sub-block.

If cu_sbt_horizontal_flag is 1 (if the current coding unit is horizontally partitioned), the decoding apparatus 200 determines a variable trafoHeight to be tbHeight*SbtNumFourthsTb0/4 in step S2020. Thereafter, the decoding apparatus 200 calls the transform unit syntax for the first sub-block and calls the transform unit syntax for the second sub-block.

Table 19 shows an example of a transform unit syntax according to an embodiment of the present disclosure.

TABLE 19

| | Descriptor |
|---|---|
| ``transform_unit( x0, y0, tbWidth, tbHeight, treeType, subTuIndex ) {     if( treeType = = SINGLE_TREE || treeType = = DUAL_TREE_LUMA ) {         if( ( IntraSubPartitionsSplitType = = ISP_NO_SPLIT && !( cu_sbt_flag &&                 ( ( subTuIndex = = 0 && cu_sbt_horizontal_flag ) ||                   ( subTuIndex = = 1 && !cu_sbt_horizontal_flag ) ) ) ) ||             ( IntraSubPartitionsSplitType != ISP_NO_SPLIT &&               ( subTuIndex < NumIntraSubPartitions − 1 || !InferTuCbfLuma ) ) )             tu_cbf_luma[ x0 ][ y0 ]`` | ae(v) |
| ``         if (IntraSubPartitionsSplitType != ISP_NO_SPLIT )             InferTuCbfLuma = InferTuCbfLuma && !tu_cbf_luma[ x0 ][ y0 ]     }     if( ( treeType = = SINGLE_TREE || treeType = = DUAL_TREE_CHROMA ) {         if( ( IntraSubPartitionsSplitType = = ISP_NO_SPLIT && !( cu_sbt_flag &&                 ( ( subTuIndex = = 0 && cu_sbt_pos_flag ) ||                   ( subTuIndex = = 1 && !cu_sbt_pos_flag ) ) ) ) ||             ( IntraSubPartitionsSplitType != ISP_NO_SPLIT &&               ( subTuIndex = = NumIntraSubPartitions − 1 ) ) ) {             tu_cbf_cb[ x0 ][ y0 ]`` | ae(v) |
| ``            tu_cbf_cr[ x0 ][ y0 ]`` | ae(v) |
| ``         }     }     if( IntraSubPartitionsSplitType != ISP_NO_SPLIT &&             treeType = = SINGLE_TREE && subTuIndex = = NumIntraSubPartitions − 1 ) )         xC = CbPosX[ x0 ][ y0 ]         yC = CbPosY[ x0 ][ y0 ]         wC = CbWidth[ x0 ][ y0 ] / 2         hC = CbHeight[ x0 ][ y0 ] / 2     } else         xC = x0         yC = y0         wC = tbWidth / SubWidthC         hC = tbHeight / SubHeightC     }     if( ( tu_cbf_luma[ x0 ][ y0 ] || tu_cbf_cb[ x0 ][ y0 ] || tu_cbf_cr[ x0 ][ y0 ] ) &&             treeType != DUAL_TREE_CHROMA ) {         if( cu_qp_delta_enabled_flag && !IsCuQpDeltaCoded ) {             cu_qp_delta_abs`` | ae(v) |
| ``             if( cu_qp_delta_abs )`` | |

TABLE 19-continued

| | Descriptor |
|---|---|
|         cu_qp_delta_sign_flag<br>    }<br>  }<br>  if( tu_cbf_luma[ x0 ][ y0 ] && treeType != DUAL_TREE_CHROMA<br>    && ( tbWidth <= 32 ) && ( tbHeight <= 32 )<br>    && ( IntraSubPartitionsSplit[ x0 ][ y0 ] = = ISP_NO_SPLIT ) && ( !cu_sbt_flag ) ) {<br>    if( transform_skip_enabled_flag &&<br>      log2TbWidth <= MaxTsSize && log2TbHeight <= MaxTsSize )<br>      transform_skip_flag[ x0 ][ y0 ] | ae(v) |
|     if( ( CuPredMode[ x0 ][ y0 ] = = MODE_INTER && sps_mts_inter_enabled_flag ) \|\|<br>      ( CuPredMode[ x0 ][ y0 ] = = MODE_INTRA && sps_mts_intra_enabled_flag ) &&<br>      ( tbWidth <= 32 ) && ( tbHeight <= 32 ) && ( !transform_skip_flag[ x0 ][ y0 ] ) )<br>      tu_mts_idx[ x0 ][ y0 ] | ae(v) |
|   }<br>  if( tu_cbf_luma[ x0 ][ y0 ] )<br>    residual_coding( x0, y0, Log2( tbWidth ), Log2( tbHeight ), 0 )<br>  if( tu_cbf_cb[ x0 ][ y0 ] )<br>    residual_coding( xC, yC, Log2( wC ), Log2( hC ), 1 )<br>  if( tu_cbf_cr[ x0 ][ y0 ] )<br>    residual_coding( xC, yC, Log2( wC ), Log2( hC ), 2 )<br>} | |

In Table 19, transform_skip_flag[x0][y0] indicates whether a transform is applied to a luma transform block. Array indexes x0 and y0 indicate the position (x0, y0) of a top left luma sample of a transform block with respect to a top left luma sample of a picture. For example, a transform is not applied to the luma transform block if transform_skip_flag[x0][y0] is 1, and another syntax element determines whether a transform is applied to the luma transform block if transform_skip_flag[x0][y0] is 0. If transform_skip_flag[x0][y0] is not present, the value thereof is inferred as 0.

tu_mts_idx[x0][y0] indicates transform kernels applied to residual samples in the horizontal and vertical directions of a related luma transform block. Array indexes x0 and y0 indicate the position (x0, y0) of a top left luma sample with respect to a top left luma sample of a picture. If tu_mts_idx [x0][y0] is not present, the value thereof is inferred as 0.

Figure 21:
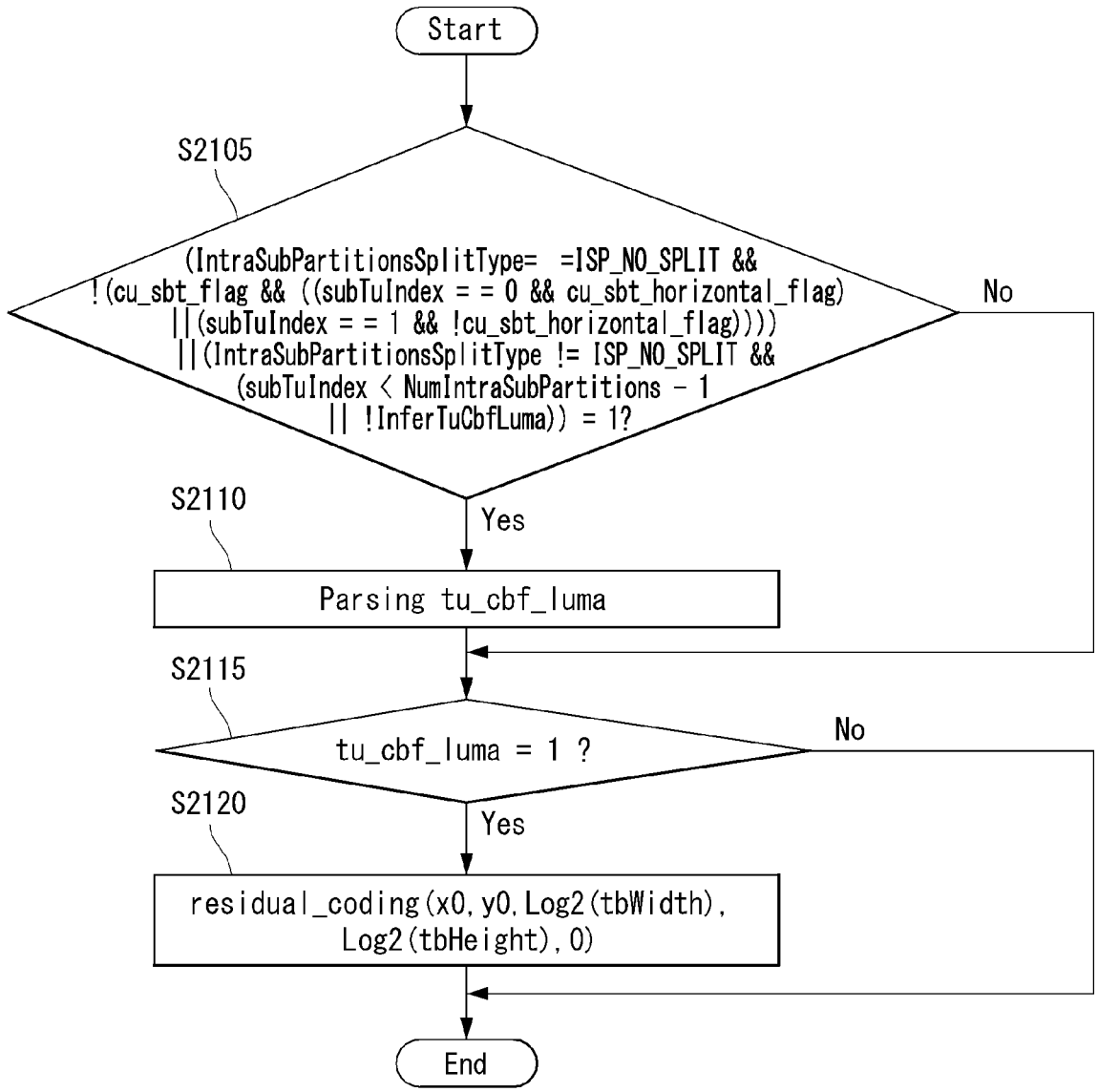
FIG. 21 is a flowchart of a process for decoding the transform tree syntax based on the coding unit syntax according to an embodiment of the present disclosure.

FIG. 21 is a flowchart of a process for decoding the transform tree syntax based on the coding unit syntax according to an embodiment of the present disclosure. The flowchart of FIG. 21 schematically illustrates the operation of the decoding apparatus 200 according to Table 19.

In step S2105, the decoding apparatus 200 checks whether conditions for parsing CBF of a transform unit are satisfied. CBF may be parsed if one of the following conditions (1) and (2) is satisfied.

Condition (1): When both (1)-1 and (1)-2 are satisfied
(1)-1. ISP (intra subpartitions) are not applied (IntraSubPartitionsSplitType==ISP_NO_SPLIT)

(1)-2. A case in which a transform is applied to the current sub-block when SBT is not applied (!cu_sbt_flag) or when SBT is applied (cu_sbt_flag). Here, a case in which a transform is applied refers to a case in which subTuIndex is 0 and cu_sbt_pos_flag is 0 (subTuIndex==0 && !cu_sbt_pos_flag), or (ii) a case in which subTuIndex is 1 and cu_sbt_pos_flag is 1 (subTuIndex==1 && cu_sbt_pos_flag).

Condition (2): Both (2)-1 and (2)-2 are satisfied
(2)-1. ISP is applied (IntraSubPartitionsSplitType !=ISP_NO_SPLIT)

(2)-2. (i) A block indicated by subTuIndex is not the last ISP partition block (subTuIndex<NumIntraSubPartitions−1), or (ii) InferTuCbfLuma is 0 (!InferTuCbfLuma)

InferTuCbfLuma is a variable for inferring a corresponding CBF as 1 without parsing CBF of the last sub-block when CBF for previous sub-blocks is 0. InferTuCbfLuma is initially set to 1 and is updated after CBF parsing of each sub-block. InferTuCbfLuma is maintained if CBF of the current sub-block is 0 and set to 1 if CBF of the current sub-block is 1 (InferTuCbfLuma=InferTuCbfLuma && !tu_cbf_luma[x0][y0]).

If the condition of step S2105 is satisfied, the decoding apparatus 200 parses CBF (tu_cbf_luma) of the current transform unit (S2110). Thereafter, the decoding apparatus 200 checks whether tu_cbf_luma is 1 and performs residual coding (S2120).

Table 20 shows an example of a residual coding syntax according to an embodiment of the present disclosure.

TABLE 20

| | Descriptor |
|---|---|
| residual_coding( x0, y0, log2TbWidth, log2TbHeight, cIdx ) {<br>  if( ( tu_mts_idx[ x0 ][ y0 ] > 0 \|\| ( cu_sbt_flag && log2TbHeight < 6 &&<br>    log2TbWidth < 6 ) ) && cIdx = = 0 && log2TbWidth > 4 )<br>    log2ZoTbWidth = 4<br>  else<br>    log2ZoTbWidth = log2TbWidth<br>  if( ( tu_mts_idx[ x0 ][ y0 ] > 0 \|\| ( cu_sbt_flag && log2TbHeight < 6 &&<br>    log2TbWidth < 6 ) ) && cIdx = = 0 && log2TbHeight > 4 )<br>    log2ZoTbHeight = 4<br>  else<br>    log2ZoTbHeight = log2TbHeight<br>  if( log2TbWidth > 0 )<br>    last_sig_coeff_x_prefix | ae(v) |

TABLE 20-continued

| | Descriptor |
|---|---|
|     if( log2TbHeight > 0 ) | |
|         last_sig_coeff_y_prefix | ae(v) |
|     if( last_sig_coeff_x_prefix > 3 ) | |
|         last_sig_coeff_x_suffix | ae(v) |
|     if( last_sig_coeff_y_prefix > 3 ) | |
|         last_sig_coeff_y_suffix | ae(v) |
|     log2TbWidth = log2ZoTbWidth | |
|     log2TbHeight = log2ZoTbHeight | |
|     log2SbW = ( Min( log2TbWidth, log2TbHeight ) < 2 ? 1 : 2 ) | |
|     log2SbH = log2SbW | |
|     if ( log2TbWidth < 2 && cIdx = = 0 ) { | |
|         log2SbW = log2TbWidth | |
|         log2SbH = 4 − log2SbW | |
|     } else if ( log2TbHeight < 2 && cIdx = = 0 ) { | |
|         log2SbH = log2TbHeight | |
|         log2SbW = 4 − log2SbH | |
|     } | |
|     numSbCoeff = 1 << ( log2SbW + log2SbH ) | |
|     lastScanPos = numSbCoeff | |
|     lastSubBlock = ( 1 << ( log2TbWidth + log2TbHeight − ( log2SbW + log2SbH ) ) ) − 1 | |
|     do { | |
|         if( lastScanPos = = 0 ) { | |
|             lastScanPos = numSbCoeff | |
|             lastSubBlock− − | |
|         } | |
|         lastScanPos− − | |
|         xS = DiagScanOrder[ log2TbWidth − log2SbW ][ log2TbHeight − log2SbH ] | |
|             [ lastSubBlock ][ 0 ] | |
|         yS = DiagScanOrder[ log2TbWidth − log2SbW ][ log2TbHeight − log2SbH ] | |
|             [ lastSubBlock ][ 1 ] | |
|         xC = ( xS << log2SbW ) + DiagScanOrder[ log2SbW ][ log2SbH ][ lastScanPos ][ 0 ] | |
|         yC = ( yS << log2SbH ) + DiagScanOrder[ log2SbW ][ log2SbH ][ lastScanPos ][ 1 ] | |
|     } while( ( xC != LastSignificantCoeffX ) || ( yC != LastSignificantCoeffY ) ) | |
|     numSigCoeff = 0 | |
|     QState = 0 | |
|     for( i = lastSubBlock; i >= 0; i− − ) { | |
|         startQStateSb = QState | |
|         xS = DiagScanOrder[ log2TbWidth − log2SbW ][ log2TbHeight − log2SbH ] | |
|             [ lastSubBlock ][ 0 ] | |
|         yS = DiagScanOrder[ log2TbWidth − log2SbW ][ log2TbHeight − log2SbH ] | |
|             [ lastSubBlock ][ 1 ] | |
|         inferSbDcSigCoeffFlag = 0 | |
|         if( ( i < lastSubBlock ) && ( i > 0 ) ) { | |
|             coded_sub_block_flag[ xS ][ yS ] | ae(v) |
|             inferSbDcSigCoeffFlag = 1 | |
|         } | |
|         firstSigScanPosSb = numSbCoeff | |
|         lastSigScanPosSb = −1 | |
|         remBinsPass1 = ( ( log2SbW + log2SbH ) < 4 ? 6 : 28 ) | |
|         remBinsPass2 = ( ( log2SbW + log2SbH ) < 4 ? 2 : 4 ) | |
|         firstPosMode0 = ( 1 = = lastSubBlock ? lastScanPos − 1 : numSbCoeff − 1 ) | |
|         firstPosMode1 = −1 | |
|         firstPosMode2 = −1 | |
|         for( n = ( i = = firstPosMode0; n >= 0 && remBinsPass1 >= 3; n− − ) { | |
|             xC = ( xS << log2SbW ) + DiagScanOrder[ log2SbW ][ log2SbH ][ n ][ 0 ] | |
|             yC = ( yS << log2SbH ) + DiagScanOrder[ log2SbW ][ log2SbH ][ n ][ 1 ] | |
|             if( coded_sub_block_flag[ xS ][ yS ] && ( n > 0 || !inferSbDcSigCoeffFlag ) ) | |
|             { | |
|                 sig_coeff_flag[ xC ][ yC ] | ae(v) |
|                 remBinsPass1− − | |
|                 if( sig_coeff_flag[ xC ][ yC ] ) | |
|                     inferSbDcSigCoeffFlag = 0 | |
|             } | |
|             if( sig_coeff_flag[ xC ][ yC ] ) { | |
|                 numSigCoeff++ | |
|                 abs_level_gt1_flag[ n ] | ae(v) |
|                 remBinsPass1− − | |
|                 if( abs_level_gt1_flag[ n ] ) { | |
|                     par_level_flag[ n ] | ae(v) |
|                     remBinsPass1− − | |
|                     if( remBinsPass2 > 0 ) { | |
|                         remBinsPass2− − | |
|                         if( remBinsPass2 = = 0 ) | |
|                             firstPosMode1 = n − 1 | |
|                     } | |
|                 } | |
|                 if( lastSigScanPosSb = = −1 ) | |
|                     lastSigScanPosSb = n | |

TABLE 20-continued

Descriptor

```
                firstSigScanPosSb = n
            }
            AbsLevelPass1[ xC ][ yC ] =
                    sig_coeff_flag[ xC ][ yC ] + par_level_flag[ n ] + abs_level_gt1_flag[ n ]
            if( dep_quant_enabled_flag )
                QState = QStateTransTable[ QState ][ AbsLevelPass1[ xC ][ yC ] & 1 ]
            if( remBinsPass1 < 3 )
                firstPosMode2 = n − 1
    }
    if( firstPosMode1 < firstPosMode2 )
        firstPosMode1 = firstPosMode2
    for( n = numSbCoeff − 1; n >= firstPosMode2; n− − )
        if( abs_level_gt1_flag[ n ] )
            abs_level_gt3_flag[ n ]                                                         ae(v)
    for( n = numSbCoeff − 1; n >= firstPosMode1; n− − ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( abs_level_gt3_flag[ n ] )
            abs_remainder[ n ]                                                              ae(v)
        AbsLevel[ xC ][ yC ] = AbsLevelPass1[ xC ][ yC ] +
                    2 * ( abs_level_gt3_flag[ n ] + abs_remainder[ n ] )
    }
    for( n = firstPosMode1; n > firstPosMode2; n− − ) {
        xC = ( xS << log2SbW ) + DiagScanOrder[ log2SbW ][ log2SbH ][ n ][ 0 ]
        yC = ( yS << log2SbW ) + DiagScanOrder[ log2SbW ][ log2SbH ][ n ][ 1 ]
        if( abs_level_gt1_flag[ n ] )
            abs_remainder[ n ]                                                              ae(v)
        AbsLevel[ xC ][ yC ] = AbsLevelPass1[ xC ][ yC ] + 2 * abs_remainder[ n ]
    }
    for( n = firstPosMode2; n >= 0; n− − ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        dec_abs_level[ n ]                                                                  ae(v)
        if(AbsLevel[ xC ][ yC ] > 0 )
            firstSigScanPosSb = n
        if( dep_quant_enabled_flag )
            QState = QStateTransTable[ QState ][ AbsLevel[ xC ][ yC ] & 1 ]
    }
    if( dep_quant_enabled_flag || !sign_data_hiding_enabled_flag )
        signHidden = 0
    else
        signHidden = ( lastSigScanPosSb − firstSigScanPosSb > 3 ? 1 : 0 )
    for( n = numSbCoeff − 1; n >= 0; n− − ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( sig_coeff_flag[ xC ][ yC ] &&
            ( !signHidden || ( n != firstSigScanPosSb ) ) )
            coeff_sign_flag[ n ]                                                            ae(v)
    }
    if( dep_quant_enabled_flag ) {
        QState = startQStateSb
        for( n = numSbCoeff − 1; n >= 0; n− − ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( sig_coeff_flag[ xC ][ yC ] )
                TransCoeffLevel[ x0 ][ y0 ][ cIdx ][ xC ][ yC ] =
                    ( 2 * AbsLevel[ xC ][ yC ] − ( QState > 1 ? 1 : 0 ) ) *
                    ( 1 − 2 * coeff_sign_flag[ n ] )
            QState = QStateTransTable[ QState ][ par_level_flag[ n ] ]
    } else {
        sumAbsLevel = 0
        for( n = numSbCoeff − 1; n >= 0; n− − ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( sig_coeff_flag[ xC ][ yC ] ) {
                TransCoeffLevel[ x0 ][ y0 ][ cIdx ][ xC ][ yC ] =
                    AbsLevel[ xC ][ yC ] * ( 1 − 2 * coeff_sign_flag[ n ] )
                if( signHidden ) {
                    sumAbsLevel += AbsLevel[ xC ][ yC ]
```

TABLE 20-continued

| | Descriptor |
|---|---|

```
            if( ( n = = firstSigScanPosSb ) && ( sumAbsLevel % 2 ) = = 1 ) )
                TransCoeffLevel[ x0 ][ y0 ][ cIdx ][ xC ][ yC ] =
                    -TransCoeffLevel[ x0][ y0 ][ cIdx ][ xC ][ yC ]
          }
        }
      }
    }
  }
}
```

In Table 20, last_sig_coeff_x_prefix indicates a prefix of the column position of the last significant coefficient in a transform block in scan order. The value of last_sig_coeff_x_prefix may fall within the range of 0 to (log 2TbWidth<<1)-1. If last_sig_coeff_x_prefix is not present, the value thereof is inferred as 0. Since last_sig_coeff_x_prefix is coded based on the variable log 2ZoTbWidth in an embodiment of the present disclosure, the value of last_sig_coeff_x_prefix may also fall within the range of 0 to (log 2ZoTbWidth<<1)-1.

last_sig_coeff_y_prefix indicates a prefix of the row position of the last significant coefficient in the transform block in scan order. The value of last_sig_coeff_y_prefix may fall within the range of 0 to (log 2TbHeight<<1)-1. If last_sig_coeff_y_prefix is not present, the value thereof is inferred as 0. Since last_sig_coeff_y_prefix is coded based on the variable log 2ZoTbHeight in an embodiment of the present disclosure, the value of last_sig_coeff_y_prefix may also fall within the range of 0 to (log 2ZoTbHeight<<1)-1.

The variables log 2ZoTbWidth and log 2ZoTbHeight related to a transform target region (or a region having a non-zero transform coefficient) are determined to be reference values if the SBT flag cu_sbt_flag is 1 and the size values log 2TbWidth and log 2TbHeight of the transform unit are greater than the reference values. In Table 20, if SBT is applied, the height value log 2TbHeight and the width value log 2TbWidth of the transform unit are less than a reference size (e.g., 6) (cu_sbt_flag && log 2TbHeight<6 && log 2TbWidth<6), and the size values log 2TbWidth and log 2TbHeight of the transform unit are greater than a reference value (e.g., 4), the variable values log 2ZoTbWidth and log 2ZoTbHeight are determined to be the corresponding reference value (e.g., 4) (log 2ZoTbWidth=4, log 2ZoTbHeight=4). As shown in Table 20, the width variable value log 2ZoTbWidth and the height variable value of the transform unit are independently determined. Specifically, the width variable value log 2ZoTbWidth is determined to be the corresponding reference value (e.g., 4) if the width value log 2TbWidth of the transform unit is greater than the reference value (e.g., 4). Further, the height variable value log 2ZoTbHeight is determined to be the corresponding reference value (e.g., 4) if the height value log 2TbHeight of the transform unit is greater than the reference value (e.g., 4).

In addition, if the size values log 2TbWidth and log 2TbHeight of the transform unit are equal to or less than the reference value (e.g., 4), the variable values log 2ZoTbWidth and log 2ZoTbHeight are determined to be the size values of the transform unit (log 2ZoTbWidth=log 2TbWidth, log 2ZoTbHeight=log 2TbHeight). In another embodiment, log 2ZoTbWidth=Min(log 2TbWidth, 5) and log 2ZoTbHeight=Min(log 2TbHeight, 5) may be set in consideration of zero-out of a block to which DCT-2 is applied.

Figure 22:
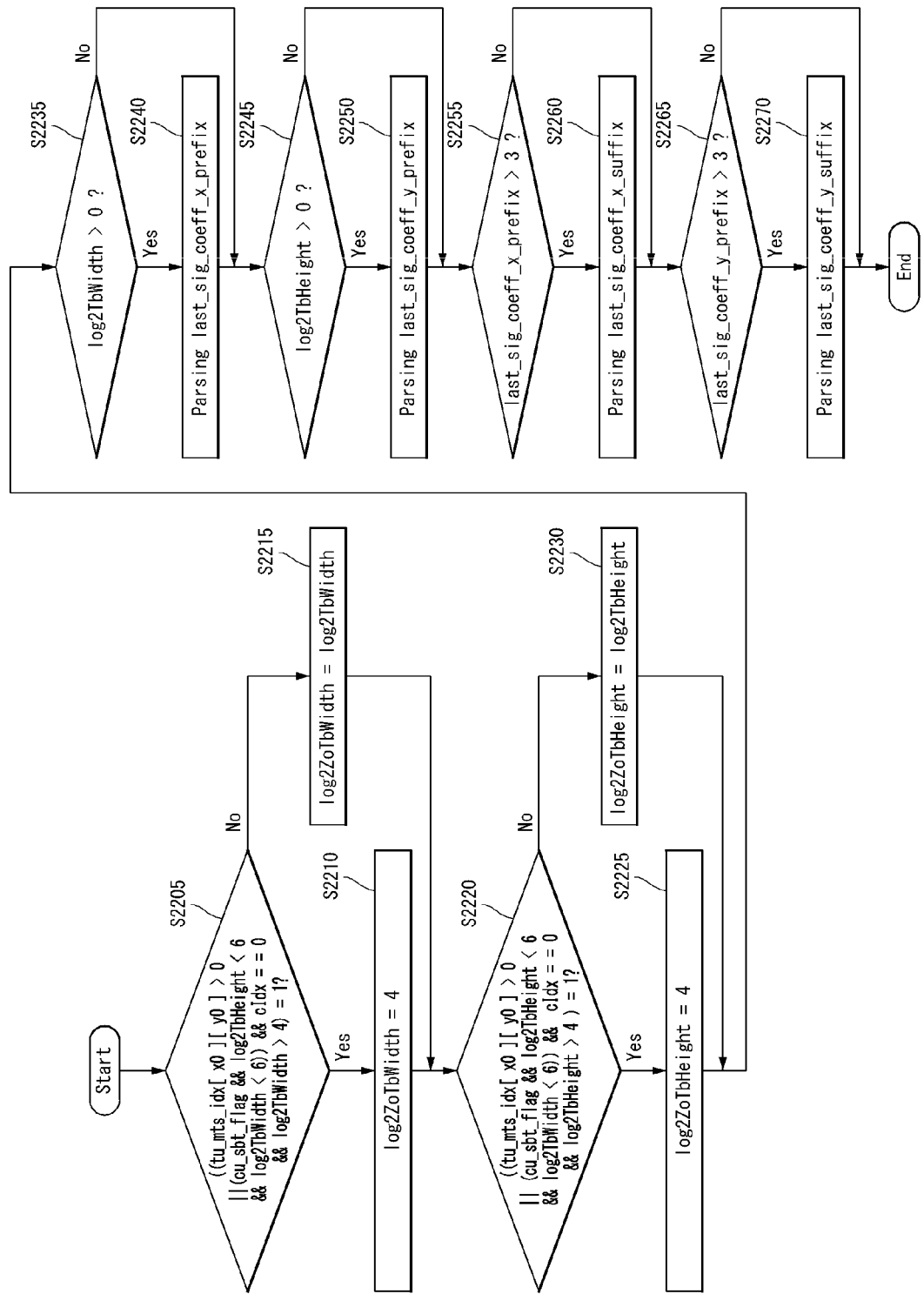
FIG. 22 is a flowchart of a process for performing decoding based on a residual coding syntax according to an embodiment of the present disclosure.

FIG. 22 is a flowchart of a process for decoding the transform tree syntax based on the coding unit syntax according to an embodiment of the present disclosure. The flowchart of FIG. 22 schematically illustrates the operation of the decoding apparatus 200 according to Table 20.

In step S2205, the decoding apparatus 200 checks i) whether MTS is applied to the current transform unit (tu_mts_idx[x0][y0]>0) or ii) whether SBT is applied, the width and the height of the current transform unit are less than a reference size (cu_sbt_flag && log 2TbHeight<6 && log 2TbWidth<6), and the width of the current transform unit is greater than a reference size (log 2TbWidth>4). Here, log 2TbWidth and log 2TbHeight represent values obtained by applying logarithm with a base of 2 to the width and the height of the current transform unit. That is, the decoding apparatus 200 checks whether the width of the current transform unit is greater than 16.

In the present embodiment, the new variables log 2ZoTbWidth and log 2ZoTbHeight are introduced because the position of the last significant coefficient is affected by log 2TbWidth and log 2TbHeight. In addition, conditions when SBT is applied are included as conditions for determining whether to apply a reduced transform.

log 2ZoTbWidth is determined to be 4 if the conditions of step S2205 are satisfied (S2210) and log 2ZoTbWidth is determined to be the same as log 2TbWidth if the conditions of step S2205 are not satisfied (S2215). In another embodiment, log 2ZoTbWidth may be determined to be a smaller value Min(log 2TbWidth, 5) between log 2TbWidth and 5.

In step S2220, the decoding apparatus 200 checks whether conditions similar to the conditions of step S2205 are satisfied with respect to the height of the current transform unit (whether the height of the current transform unit is greater than 16). log 2ZoTbHeight is determined to be 4 if the conditions of step S2220 are satisfied (S2225) and log 2ZoTbHeight is determined to be the same as log 2TbHeight if the conditions of step S2220 are not satisfied (S2230). In another embodiment, log 2ZoTbHeight may be determined to be a smaller value Min(log 2TbHeight, 5) between log 2TbHeight and 5.

Thereafter, the decoding apparatus 200 checks whether log 2TbWidth is greater than 0 (S2235) and parses last_sig_coeff_x_prefix if log 2TbWidth is greater than 0 (S2240). The decoding apparatus 200 checks whether log 2TbHeight is greater than 0 (S2245) and parses last_sig_coeff_y_prefix if log 2TbHeight is greater than 0 (S2250). Further, the decoding apparatus 200 checks whether last_sig_coeff_x_prefix is greater than 3 (S2255) and parses last_sig_coeff_x_suffix if last_sig_coeff_x_prefix is greater than 3 (S2260). The decoding apparatus 200 checks whether last_sig_coeff_y_prefix is greater than 3 (S2265) and parses last_sig_coeff_y_suffix if last_sig_coeff_y_prefix is greater than 3 (S2270).

A transform process for scaled transform coefficients according to an embodiment of the present disclosure may be as follows.

Transformation for Scaled Transform Coefficient

General

Inputs of the process include a luma position (xTbY, yTbY) indicating a top left sample of a current luma transform block with respect to a top left luma sample of a current picture, a variable nTbW indicating the width of a current transform block, a variable nTbH indicating the height of the current transform block, a variable cIdx indicating a color component of a current block, and (nTbW)×(nTbH) array d[x][y] of scaled transform coefficients x=0 . . . nTbW−1 and y=0 . . . nTbH−1.

The output of the process is (nTbW)×(nTbH) array r[x][y] of residual samples x=0 . . . nTbW−1 and y=0 . . . nTbH−1.

A variable implicitMtsEnabled is derived as follows.

If sps_mts_enabled_flag is 1 and one of the following conditions is true, implicitMtsEnabled is set to 1.

IntraSubPartitionsSplitType is not ISP_NO_SPLIT (i.e., ISP is applied)

cu_sbt_flag is 1 (i.e., SBT is applied)

sps_explicit_mts_intra_enabled_flag and sps_explicit_mts_inter_enabled_flag are 0

If not, implicitMtsEnabled is set to 0.

A variable trTypeHor indicating a horizontal transform kernel and trTypeVer indicating a vertical transform kernel are derived as follows.

If cIdx is greater than 0, both trTypeHor and trTypeVer are set to 0 (cIdx indicating a chroma component of the current block, the current block representing a luma component if cIdx is 0, the current block representing a chroma component Cb if cIdx is 1, and the current block representing a chroma component Cr if cIdx is 2).

If not, the following is applied if implicitMtsEnabled.

If IntraSubPartitionsSplitType is not ISP_NO_SPLIT (if ISP is applied), trTypeHor and trTypeVer are determined based on an intra-prediction mode intraPredMode as shown in Table 21.

TABLE 21

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | 1 | 1 |
| INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | 1 | 0 |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | 0 | 1 |

If not (if ISP is not applied), trTypeHor and trTypeVer are determined based on cu_sbt_horizontal_flag and cu_sbt_pos_flag, as shown in Table 22, if cu_sbt_flag is 1 (if SBT is applied). In Table 22, DST-7 is applied if trTypeHor or trTypeVer is 1 and DCT-8 is applied if trTypeHor or trTypeVer is 2. That is, DST-7 or DCT-8 may be applied to a block to which SBT has been applied.

TABLE 22

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

If not (if sps_explicit_mts_intra_enabled_flag and sps_explicit_mts_inter_enabled_flag are 0), trTypeHor and trTypeVer are derived as follows.

trTypeHor=(CuPredMode[$xTbY$][$yTbY$]==MODE_INTRA && $nTbW<=nTbH$)?1:0 trTypeVer=(CuPredMode[$xTbY$][$yTbY$]==MODE_INTRA && $nTbH<=nTbW$)?1:0

If nTbW is less than 4 or greater than 16, trTypeHor is set to 0.

If nTbH is less than 4 or greater than 16, trTypeVer is set to 0.

If not, trTypeHor and trTypeVer are determined based on tu_mts_idx[xTbY][yTbY] as shown in Table 23.

TABLE 23

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

Variables nonZeroW and nonZeroH are derived as follows.

nonZeroW=Min($nTbW$,((tu_mts_idx[$xTbY$][$yTbY$]>0|| (cu_sbt_flag && $nTbW<=32$ && $nTbH<=32$)) && cIdx==0)?16:32)

nonZeroH=Min($nTbH$,((tu_mts_idx[$xTbY$][$yTbY$]>0|| (cu_sbt_flag && $nTbW<=32$ && $nTbH<=32$)) && cIdx==0)?16:32)

(nTbW)×(nTbH) array of residual samples is derived as follows.

1. When nTbH is greater than 1, each (vertical) column of scaled transform coefficients d[x][y] for x=0 . . . nonZeroW−1 and y=0 . . . nonZeroH−1 is transformed into e[x][y] for x=0 . . . nonZeroW−1 and y=0 . . . nTbH−1. To apply a transform for a length of nTbH that is the height of a transform block to each column x=0 . . . nonZeroW−1, a one-dimensional transform process is called per column, significant heights (non-zero height) nonZeroH of the scaled transform coefficients, a list d[x][y] for y=0 . . . nonZeroH−1, and a transform type variable trType set to be the same as trTypeVer are input as factors for calling the one-dimensional transform processor, and a list e[x][y] for y=0 . . . nTbH−1 is output.

2. When both nTbH and nTbW are greater than 1, intermediate sample values g[x][y] for x=0 . . . nonZeroW−1 and y=0 . . . nTbH−1 may be derived as follows.

$$g[x][y]=\text{Clip3}(\text{CoeffMin},\text{CoeffMax},(e[x][y]+64)\gg 7)$$

Here, Clip3(Min, Max, X) is a function that outputs X if X is a value between Min and Max, outputs Min if X is less than Min, and outputs Max if X is greater than Max.

3. When nTbW is greater than 1, each (horizontal) row of a resulting array g[x][y] for x=0 . . . nonZeroW−1 and y=0 . . . nTbH−1 is transformed into r[x][y] for x=0 . . . nTbW−1 and y=0 . . . nTbH−1. To apply a transform for a length of nTbW that is the width of a transform block to each row y=0 . . . nTbH−1, a one-dimensional transform process is called per row, a significant width (non-zero width) nonZeroW of the resulting array g[x][y], a list g[x][y] for x=0 . . . nonZeroW−1, and a transform type variable trType set to be the same as trTypeHor are input as factors for calling the one-dimensional transform processor, and a list r[x][y] for x=0 . . . nTbW−1 is output.

Transformation Process

Inputs of this process include a variable nTbS indicating a horizontal sample size of transformed samples, a variable nonZeroS indicating a horizontal sample size of significant (non-zero) scaled transform coefficients, a list x[j] (j=0 . . . nonZeroS−1) of scaled transform coefficients, and a transform kernel type variable trType.

The output of this process is a list y[i] of transformed samples.

A transform matrix derivation process is called, a transform size nTbS and a transform kernel type trType is input, and a transform matrix transMatrix is output.

A transform is performed based on the value of trType, and the list y[i] (i=0 . . . nTbS−1) is derived as follows.

If trType is 0, transform matrix multiplication as represented by formula 1 is applied.

$$y[i]=\Sigma_{j=0}^{nonZeroS-1}\text{transMatrix}[i][j]*2^{6-\text{Log }2(nTbS)}*x[j] \text{ with } i=0 \ldots nTbS-1 \qquad \text{[Formula 1]}$$

If not (if trType is 1 or 2), transform matrix multiplication as represented by formula 2 is applied.

$$y[i]=\Sigma_{j=0}^{nonZeroS-1}\text{transMatrix}[i][j]*x[j] \text{ with } i=0 \ldots nTbS-1 \qquad \text{[Formula 2]}$$

Transform Matrix Derivation Process

Inputs of this process include a variable nTbS indicating a horizontal sample size of scaled transform coefficients, and a transform kernel type trType.

The output of this process is a transform matrix transMatrix.

The transform matrix transMatrix is derived based on trType and nTbS.

If trType is 1 and nTbS is 32, transform matrices transMatrix are derived as shown in Table 24 and Table 25.

Matrices shown in Table 24 and Table 25 are concatenated in the horizontal direction to form a matrix, m in [m][n] is a horizontal index and n is a vertical index. When the matrix of Table 24 and the matrix of Table 25 are concatenated, a 16×32 matrix is derived and this matrix is a matrix for forward transform. Inverse transform may be performed through matrices of Table 24 and Table 25 and approximate indexing.

TABLE 24 transMatrix[ m ][ n ] = transMatrixCol0to15[ m ][ n ] with m = 0..15, n = 0..15
transMatrixCol0to15 =
{
{ 4 9 13 17 21 26 30 34 38 42 46 50 53 56 60 63 }
{ 13 26 38 50 60 68 77 82 86 89 90 88 85 80 74 66 }
{ 21 42 60 74 84 89 89 84 74 60 42 21 0 −21 −42 −60 }
{ 30 56 77 87 89 80 63 38 9 −21 −50 −72 −85 −90 −84 −68 }
{ 38 68 86 88 74 46 9 −30 −63 −84 −90 −78 −53 −17 21 56 }
{ 46 78 90 77 42 −4 −50 −80 −90 −74 −38 9 53 82 89 72 }
{ 53 85 85 53 0 −53 −85 −85 −53 0 53 85 85 53 0 −53 }
{ 60 89 74 21 −42 −84 −84 −42 21 74 89 60 0 −60 −89 −74 }
{ 66 90 56 −13 −74 −87 −46 26 80 84 34 −38 −85 −78 −21 50 }
{ 72 86 34 −46 −89 −63 13 78 82 21 −56 −90 −53 26 84 77 }
{ 77 80 9 −72 −84 −17 66 86 26 −60 −88 −34 53 90 42 −46 }
{ 80 72 −17 −86 −60 34 90 46 −50 −89 −30 63 85 13 −74 −78 }
{ 84 60 −42 −89 −21 74 74 −21 −89 −42 60 84 0 −84 −60 42 }
{ 86 46 −63 −78 21 90 26 −77 −66 42 87 4 −85 −50 60 80 }
{ 88 30 −78 −56 60 77 −34 −87 4 89 26 −80 −53 63 74 −38 }
{ 90 13 −87 −26 84 38 −78 −50 72 60 −63 −68 53 77 −42 −82 }
},

TABLE 25 transMatrix[ m ][ n ] = transMatrixCol16to31[ m − 16 ][ n ] with m = 16..31, n = 0..15
transMatrixCol16to31 =
{
{ 66 68 72 74 77 78 80 82 84 85 86 87 88 89 90 90 }
{ 56 46 34 21 9 −4 −17 −30 −42 −53 −63 −72 −78 −84 −87 −90 }
{ −74 −84 −89 −89 −84 −74 −60 −42 −21 0 21 42 60 74 84 89 }
{ −46 −17 13 42 66 82 90 86 74 53 26 −4 −34 −60 −78 −88 }
{ 80 90 82 60 26 −13 −50 −77 −89 −85 −66 −34 4 42 72 87 }
{ 34 −13 −56 −84 −88 −68 −30 17 60 85 87 66 26 −21 −63 −86 }
{ −85 −85 −53 0 53 85 85 53 0 −53 −85 −85 −53 0 53 85 }

TABLE 25-continued

```
{ -21 42 84 84 42 -21 -74 -89 -60 0 60 89 74 21 -42 -84 }
{ 88 72 9 -60 -90 -63 4 68 89 53 -17 -77 -86 -42 30 82 }
{ 9 -66 -88 -42 38 87 68 -4 -74 -85 -30 50 90 60 -17 -80 }
{ -90 -50 38 89 56 -30 -87 -63 21 85 68 -13 -82 -74 4 78 }
{ 4 82 68 -21 -87 -56 38 90 42 -53 -88 -26 66 84 9 -77 }
{ 89 21 -74 -74 21 89 42 -60 -84 0 84 60 -42 -89 -21 74 }
{ -17 -90 -30 74 68 -38 -88 -9 84 53 -56 -82 13 89 34 -72 }
{ -86 9 90 21 -82 -50 66 72 -42 -85 13 90 17 -84 -46 68 }
{ 30 86 -17 -89 4 90 9 -88 -21 85 34 -80 -46 74 56 -66 }
},
```

If trType is 2 and nTbS is 32, transform matrices transMatrix are derived as shown in Table 26 and Table 27.

TABLE 26

```
transMatrix[ m ][ n ] = transMatrixCol0to15[ m ][ n ] with m = 0..15, n = 0..15
transMatrixCol0to15 =
{
{ 90 90 89 88 87 86 85 84 82 80 78 77 74 72 68 66 }
{ 90 87 84 78 72 63 53 42 30 17 4 -9 -21 -34 -46 -56 }
{ 89 84 74 60 42 21 0 -21 -42 -60 -74 -84 -89 -89 -84 -74 }
{ 88 78 60 34 4 -26 -53 -74 -86 -90 -82 -66 -42 -13 17 46 }
{ 87 72 42 4 -34 -66 -85 -89 -77 -50 -13 26 60 82 90 80 }
{ 86 63 21 -26 -66 -87 -85 -60 -17 30 68 88 84 56 13 -34 }
{ 85 53 0 -53 -85 -85 -53 0 53 85 85 53 0 -53 -85 -85 }
{ 84 42 -21 -74 -89 -60 0 60 89 74 21 -42 -84 -84 -42 21 }
{ 82 30 -42 -86 -77 -17 53 89 68 4 -63 -90 -60 9 72 88 }
{ 80 17 -60 -90 -50 30 85 74 4 -68 -87 -38 42 88 66 -9 }
{ 78 4 -74 -82 -13 68 85 21 -63 -87 -30 56 89 38 -50 -90 }
{ 77 -9 -84 -66 26 88 53 -42 -90 -38 56 87 21 -68 -82 -4 }
{ 74 -21 -89 -42 60 84 0 -84 -60 42 89 21 -74 -74 21 89 }
{ 72 -34 -89 -13 82 56 -53 -84 9 88 38 -68 -74 30 90 17 }
{ 68 -46 -84 17 90 13 -85 -42 72 66 -50 -82 21 90 9 -86 }
{ 66 -56 -74 46 80 -34 -85 21 88 -9 -90 -4 89 17 -86 -30 }
},
```

TABLE 27

```
transMatrix[ m ][ n ] = transMatrixCol16to31[ m - 16 ][ n ] with m = 16..31, n = 0..15
transMatrixCol16to31 =
{
{63 60 56 53 50 46 42 38 34 30 26 21 17 13 9 4}
{-66 -74 -80 -85 -88 -90 -89 -86 -82 -77 -68 -60 -50 -38 -26 -13}
{-60 -42 -21 0 21 42 60 74 84 89 89 84 74 60 42 21}
{68 84 90 85 72 50 21 -9 -38 -63 -80 -89 -87 -77 -56 -30}
{56 21 -17 -53 -78 -90 -84 -63 -30 9 46 74 88 86 68 38}
{-72 -89 -82 -53 -9 38 74 90 80 50 4 -42 -77 -90 -78 -46}
{-53 0 53 85 85 53 0 -53 -85 -85 -53 0 53 85 85 53}
{74 89 60 0 -60 -89 -74 -21 42 84 84 42 -21 -74 -89 -60}
{50 -21 -78 -85 -38 34 84 80 26 -46 -87 -74 -13 56 90 66}
{-77 -84 -26 53 90 56 -21 -82 -78 -13 63 89 46 -34 -86 -72}
{-46 42 90 53 -34 -88 -60 26 86 66 -17 -84 -72 9 80 77}
{78 74 -13 -85 -63 30 89 50 -46 -90 -34 60 86 17 -72 -80}
{42 -60 -84 0 84 60 -42 -89 -21 74 74 -21 -89 -42 60 84}
{-80 -60 50 85 -4 -87 -42 66 77 -26 -90 -21 78 63 -46 -86}
{-38 74 63 -53 -80 26 89 4 -87 -34 77 60 -56 -78 30 88}
{82 42 -77 -53 68 63 -60 -72 50 78 -38 -84 26 87 -13 -90}
},
```

Binarization Process

A binarization process in a CABAC parsing process for tile group data according to an embodiment of the present disclosure may be as follows. Input of this process if a request for a syntax element. Output of this process is syntax element binarization. Table 28 below shows a binarization process type and corresponding inputs related to each syntax element. TR (truncated rice) binarization process, TB (truncated binary) binarization process, EGk (k-th order Exp-Golomb) binarization process, and FL (fixed length) binarization process may be performed through a process known to those skilled in the art.

TABLE 28

| Syntax structure | Syntax element | Binarization | |
|---|---|---|---|
| | | Process | Input parameters |
| ... | ... | ... | ... |
| coding_unit( ) | ... | ... | ... |
| | cu_sbt_flag[ ][ ] | FL | cMax = 1 |
| | cu_sbt_quad_flag[ ][ ] | FL | cMax = 1 |
| | cu_sbt_horizontal_flag[ ][ ] | FL | cMax = 1 |
| | cu_sbt_pos_flag[ ][ ] | FL | cMax = 1 |
| ... | ... | ... | ... |
| transform_unit( ) | ... | ... | ... |
| | transform_skip_flag[ ][ ] | FL | cMax = 1 |
| | tu_mts_idx[ ][ ] | TR | cMax = 4, cRiceParam = 0 |
| residual_coding( ) | last_sig_coeff_x_prefix | TR | cMax = ( log2ZoTbWidth << 1 ) − 1, cRiceParam = 0 |
| | last_sig_coeff_y_prefix | TR | cMax = ( log2ZoTbHeight << 1 ) − 1, cRiceParam = 0 |
| | last_sig_coeff_x_suffix | FL | cMax = ( 1 << ( ( last_sig_coeff_x_prefix >> 1 ) − 1 ) − 1 ) |
| | last_sig_coeff_y_suffix | FL | cMax = ( 1 << ( ( last_sig_coeff_y_prefix >> 1 ) − 1 ) − 1 ) |
| ... | ... | ... | ... |

Process in Table 28 is an item indicating a binarization type, TR indicates a truncated rice (or truncated unary) binarization method, and FL indicates a fixed length binarization method. Further, cMax and cRiceParam are parameters for determining a length of a bin string for unary binarization, and the length of the bin string may be determined to be cMax>>cRiceParam.

In Table 28, syntax elements last_sig_coeff_x_prefix and last_sig_coeff_y_prefix related to the position of the last significant coefficient in a block are determined based on variables log 2ZoTbWidth and log 2ZoTbHeight for a significant width and a significant height in consideration of zero-out. That is, position information last_sig_coeff_x_prefix and last_sig_coeff_y_prefix of the last significant coefficient is coded based on variable values log 2ZoTbWidth and log 2ZoTbHeight related to a transform target region.

last_sig_coeff_x_prefix indicates a prefix of the column position of the last significant coefficient in a transform unit in scanning order and last_sig_coeff_y_prefix indicates a prefix of the row position of the last significant coefficient in the transform unit in scanning order. For example, an input parameter cMax for binarization of last_sig_coeff_x_prefix may be determined based on log 2ZoTbWidth (cMax=(log 2ZoTbWidth<<1)−1) and an input parameter for binarization of last_sig_coeff_y_prefix may be determined based on log 2ZoTbHeight (cMax=(log 2ZoTbHeight<<1)−1) as shown in Table 28.

The position of the last significant coefficient in the transform block may be derived using last_sig_coeff_x_prefix and last_sig_coeff_y_prefix derived as above, and scanning or transform for the transform block may be performed based on the position of the last significant coefficient.

In addition, a suffix for determining the position of the last significant coefficient may be additionally used. Referring to Table 20, a suffix last_sig_coeff_x_suffix related to the column position of the last significant coefficient may be obtained when last_sig_coeff_x_prefix is greater than a reference value of 3. Further, a suffix last_sig_coeff_y_suffix related to the row position of the last significant coefficient may be obtained when last_sig_coeff_y_prefix is greater than the reference value of 3. When last_sig_coeff_x_suffix is present, the column position LastSignificantCoeffX of the last significant coefficient may be determined based on last_sig_coeff_x_prefix and last_sig_coeff_x_suffix. When last_sig_coeff_y_suffix is present, the column position LastSignificantCoeffY of the last significant coefficient may be determined based on last_sig_coeff_y_prefix and last_sig_coeff_y_suffix.

Derivation Process for ctxTable, ctxIdx, and bypassFlag

Input of this process is a position binIdx of a current bin in a bin string. Outputs of this process are ctxTable, ctxIdx, and bypassFlag. Values of ctxTable, ctxIdx, and bypassFlag are derived based on entries for binIdx of a corresponding syntax element in Table 29.

TABLE 29

| | binIdx | | | | | |
|---|---|---|---|---|---|---|
| Syntax element | 0 | 1 | 2 | 3 | 4 | >=5 |
| ... | ... | ... | ... | ... | ... | ... |
| cu_sbt_flag[ ][ ] | 0 | na | na | na | na | na |
| cu_sbt_quad_flag[ ][ ] | 0 | na | na | na | na | na |
| cu_sbt_horizontal_flag[ ][ ] | (cbWidth * cbHeight < 256) ? 1:0 | na | na | na | na | na |
| cu_sbt_pos_flag[ ][ ] | 0 | na | na | na | na | na |
| ... | ... | ... | ... | ... | ... | ... |
| transform_skip_flag[ ][ ] | 0 | na | na | na | na | na |
| tu_mts_idx[ ][ ] | cqtDepth | 6 | 7 | 8 | na | na |
| last_sig_coeff_x_prefix | | | 0 . . . 23 | | | |
| last_sig_coeff_y_prefix | | | 0 . . . 23 | | | |

TABLE 29-continued

| Syntax element | binIdx | | | | | |
|---|---|---|---|---|---|---|
| | 0 | 1 | 2 | 3 | 4 | >=5 |
| last_sig_coeff_x_suffix | bypass | bypass | bypass | bypass | bypass | bypass |
| last_sig_coeff_y_suffix | bypass | bypass | bypass | bypass | bypass | bypass |
| ... | ... | ... | ... | ... | ... | ... |

If entry of Table 29 is not "bypass", "terminate", or "na", values of binIdx are decoded through DecodeDecision process as follows.
   ctxTable is indicated by XXX (another process).
   A variable ctxIdxOffset is indicated by the lowest value of ctxIdx in XXX (other process) based on a current value of initType.
   ctxIdx is set to be the same as the sum of ctxInc and ctxIdxOffset.
   bypassFlag is set to 0.
In Table 29, ctxInc for last_sig_coeff_x_prefix and last_sig_coeff_y_prefix is determined by 'ctxInc derivation process for syntax elements last_sig_coeff_x_prefix and lasg_sig_coeff_y_prefix' which will be described later.
   If entry is "bypass" in Table 29, values of binIdx are decoded through DecodeBypass process as follows.
   ctxTable is set to 0.
   ctxIdx is set to 0.
   bypassFlag is set to 1.
   If entry is "terminate" in Table 29, values of binIdx are decoded through DecodeTerminate process as follows.
   ctxTable is set to 0.
   ctxIdx is set to 0.
   bypassFlag is set to 0.
   If entry is "na" in Table 29, values of binIdx are not generated in the corresponding syntax element.
Derivation Process of ctxInc for the Syntax Elements last_sig_coeff_x_prefix and last_sig_coeff_y_prefix
   Inputs of this process are the variable binIdx, chroma component index cIdx, and binary logarithm log 2TbWidth and log 2TbHeight of the width and the height of a transform block. Output of this process is the variable ctxInc.
   A variable log 2TbSize is derived as follows.
   If a parsed syntax element is last_sig_coeff_x_prefix, log 2TbSize is set to be the same as log 2TbWidth.
   If not (if the parsed syntax element is last_sig_coeff_y_prefix, log 2TbSize is set to be the same as log 2TbHeight.
   Variables ctxOffset and ctxShift are derived as follows.
   If cIdx is 0, ctxOffset is set to 3*(log 2TbSize−2)+((log 2TbSize*?*1)>>2) and ctxShift is set to (log 2TbSize+1)>>2.
   If not (if cIdx is greater than 0), ctxOffset is set to 21 and ctxShift is set to Clip3(0, 2, $2^{log\ 2TbSize}$>>3)
The variable ctxInc is derived as follows.

ctxInc=(binIdx>>ctxShift)+ctxOffset

Figure 23:
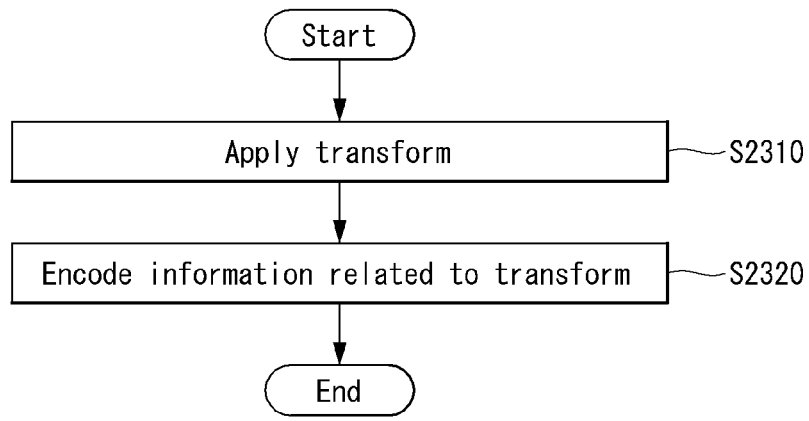
FIG. 23 is a flowchart of a process for encoding a video signal according to an embodiment of the present disclosure.

FIG. 23 is a flowchart of a process for encoding a video signal according to an embodiment of the present disclosure. Operations of FIG. 23 may be performed by the encoding apparatus 100.

In step S2310, the encoding apparatus 100 applies a transform to a transform unit corresponding to one of sub-blocks partitioned from a coding unit. For example, the encoding apparatus 100 determines whether to partition the coding unit into sub-blocks (whether to apply SBT) in consideration of RD cost. When SBT is applied, the encoding apparatus 100 determines a partitioning direction (e.g., horizontal direction or vertical direction), a partitioning type (symmetric partitioning or asymmetric partitioning), and a sub-block to which the transform will be applied. The encoding apparatus 100 may apply a horizontal transform and a vertical transform to a transform unit corresponding to a transform target sub-block. Here, a transform kernel for the horizontal transform and the vertical transform may be DST-7 or DCT-8. When the size (width or height) of the sub-block is equal to or greater than a reference size (e.g., 32), a transform coefficient may be positioned only in a reduced region and the remaining region may be regarded as 0.

In step S2320, the encoding apparatus 100 encodes information related to the transform. Here, the information related to the transform includes the SBT flag cu_sbt_flag indicating whether to apply SBT and position information last_sig_coeff_x_prefix and last_sig_coeff_y_prefix of the last significant coefficient in the transform unit in scan order.

The position information last_sig_coeff_x_prefix and last_sig_coeff_y_prefix of the last significant coefficient is coded based on variable values log 2ZoTbWidth and log 2ZoTbHeight related to a region where a non-zero transform coefficient is present. last_sig_coeff_x_prefix indicates a prefix of the column position of the last significant coefficient in the transform unit in scanning order and last_sig_coeff_y_prefix indicates a prefix of the row position of the last significant coefficient in the transform unit in scanning order. For example, an input parameter cMax for binarization of last_sig_coeff_x_prefix may be determined based on log 2ZoTbWidth (cMax=(log 2ZoTbWidth<<1)−1), and an input parameter for binarization of last_sig_coeff_y_prefix may be determined based on log 2ZoTbHeight (cMax=(log 2ZoTbHeight<<1)−1) as shown in Table 28.

The variable values log 2ZoTbWidth and log 2ZoTbHeight related to the region where the non-zero transform coefficient is present are determined to be reference values if the SBT flag cu_sbt_flag is 1 and size values log 2TbWidth and log 2TbHeight of the transform unit is greater than the reference values. For example, if SBT is applied, the width value log 2TbHeight and the height value log 2TbWidth of the transform unit are less than a reference size (e.g., 6) (cu_sbt_flag && log 2TbHeight<6 && log 2TbWidth<6), and the size values log 2TbWidth and log 2TbHeight of the transform unit are greater than a reference value (e.g., 4), the variable values log 2ZoTbWidth and log 2ZoTbHeight are determined to be the corresponding reference value (e.g., 4) (log 2ZoTbWidth=4 and log 2ZoTbHeight=4), as shown in Table 20 and Table 22. More specifically, if the width value log 2TbWidth of the transform unit is greater than the reference value (e.g., 4), the width variable value log 2ZoTbWidth is determined to be the corresponding reference value (e.g., 4). If the height value log 2ZoTbHeight of the transform unit is greater than the reference value (e.g., 4), the height variable value log 2ZoTbHeight is determined to be the corresponding reference value (e.g., 4).

In an embodiment, if the size values log 2TbWidth and log 2TbHeight of the transform unit are equal to or less than the reference value (e.g., 4), the variable values log 2ZoTbWidth and log 2ZoTbHeight may be determined to be the size values of the transform unit (log 2ZoTbWidth=log 2TbWidth and log 2ZoTbHeight=log 2TbHeight). In another embodiment, log 2ZoTbWidth may be determined to be a smaller value Min(log 2TbWidth, 5) between log 2TbWidth and 5 and log 2ZoTbHeight may be determined to be a smaller value Min(log 2TbHeight, 5) between log 2TbHeight and 5.

In an embodiment, the information related to the transform further include the SBT size flag cu_sbt_quad_flag indicating the size of a sub-block partitioned from the coding unit. The size of the transform unit is ½ the size of the coding unit if the SBT size flag cu_sbt_quad_flag is 0, as illustrated in FIGS. 13a to 14b, and the size of the transform unit is ¼ the size of the coding unit if the SBT size flag cu_sbt_quad_flag is 1, as illustrated in FIGS. 15a to 16b.

In an embodiment, the step of performing the transform includes a step of applying a horizontal transform and a vertical transform to a transform unit. A transform kernel for the horizontal transform and the vertical transform may be determined based on a partitioning direction of a coding unit and the position of the transform unit in the coding unit. The information related to the transform may further include an SBT direction flag cu_sbt_horizontal_flag indicating the partitioning direction of the coding unit and an SBT position flag cu_sbt_pos_flag indicating the position of the transform unit.

For example, a transform kernel type trTypeHor for the horizontal transform and a transform kernel type trTypeVer for the vertical transform may be determined according to the SBT direction flag cu_sbt_horizontal_flag and the SBT position flag cu_sbt_pos_flag, as shown in Table 22. In Table 22, DST-7 is applied if trTypeHor or trTypeVer is 1 and DCT-8 is applied if trTypeHor or trTypeVer is 2. That is, DST-7 or DCT-8 may be applied to a block to which SBT has been applied.

In an embodiment, the coding unit may be partitioned in the vertical direction if the SBT direction flag cu_sbt_horizontal_flag is 0 and may be partitioned in the horizontal direction if the SBT direction flag cu_sbt_horizontal_flag is 1. For example, the coding unit may be partitioned in the vertical direction if the SBT direction flag cu_sbt_horizontal_flag is 0, as illustrated in FIGS. 13a, 13b, 15a, and 15b and may be partitioned in the horizontal direction if the SBT direction flag cu_sbt_horizontal_flag is 1, as illustrated in FIGS. 14a, 14b, 16a, and 16b.

In an embodiment, when DST-7 or DCT-8 is applied, the width nonZeroW of a region where a non-zero transform coefficient is present in the transform unit may be reduced to 16 if the width of the transform unit is greater than 16, and the height nonZeroH of the region where a non-zero transform coefficient is present in the transform unit may be reduced to 16 if the height of the transform unit is greater than 16. For example, when the width of a transform unit to which SBT is applied is 32, the width nonZeroW of a region where a non-zero transform coefficient is present may be reduced to 16, as illustrated in FIGS. 17c, 17d, 18c, and 18d. Further, when the height of the transform unit to which SBT is applied is 32, the height nonZeroH of the region where a non-zero transform coefficient is present may be reduced to 16, as illustrated in FIGS. 17a, 17b, 18a, and 18b.

Figure 24:
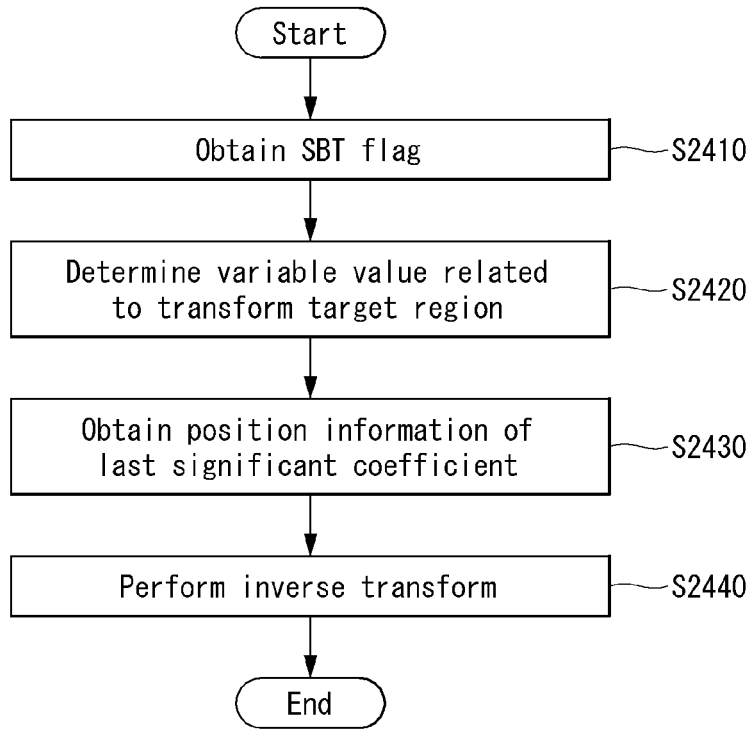
FIG. 24 is a flowchart of a process for decoding a video signal according to an embodiment of the present disclosure.

FIG. 24 is a flowchart of a process for decoding a video signal according to an embodiment of the present disclosure. Operations of FIG. 24 may be performed by the decoding apparatus 200.

In step S2410, the decoding apparatus 200 obtains the SBT flag cu_sbt_flag indicating whether SBT is applied. SBT represents a transform applied to a transform corresponding to one of sub-blocks partitioned from a coding unit.

In step S2420, the decoding apparatus 200 determines the variable values log 2ZoTbWidth and log 2ZoTbHeight related to a transform target region based on the SBT flag cu_sbt_flag and size values log 2TbWidth and log 2TbHeight of a transform unit. The variable values log 2ZoTbWidth and log 2ZoTbHeight related to the transform target region are determined to be reference values if the SBT flag cu_sbt_flag is 1 and the size values log 2TbWidth and log 2TbHeight of the transform unit are greater than the reference values. For example, if SBT is applied, the width value log 2TbHeight and the height value log 2TbWidth of the transform unit are less than a reference size (e.g., 6) (cu_sbt_flag && log 2TbHeight<6 && log 2TbWidth<6), and the size values log 2TbWidth and log 2TbHeight of the transform unit are greater than a reference value (e.g., 4), the variable values log 2ZoTbWidth and log 2ZoTbHeight are determined to be the corresponding reference value (e.g., 4) (log 2ZoTbWidth=4 and log 2ZoTbHeight=4), as shown in Table 20 and Table 22. If the width value log 2TbWidth of the transform unit is greater than the reference value (e.g., 4), the width variable value log 2ZoTbWidth is determined to be the corresponding reference value (e.g., 4). If the height value log 2ZoTbHeight of the transform unit is greater than the reference value (e.g., 4), the height variable value log 2ZoTbHeight is determined to be the corresponding reference value (e.g., 4).

In an embodiment, if the SBT flag cu_sbt_flag is 1 and the size values log 2TbWidth and log 2TbHeight of the transform unit are equal to or less than the reference value (e.g., 16), the variable values log 2ZoTbWidth and log 2ZoTbHeight may be determined to be the size values log 2TbWidth and log 2TbHeight of the transform unit (log 2ZoTbWidth=log 2TbWidth and log 2ZoTbHeight=log 2TbHeight). In another embodiment, log 2ZoTbWidth may be determined to be a smaller value Min(log 2TbWidth, 5) between log 2TbWidth and 5 and log 2ZoTbHeight may be determined to be a smaller value Min(log 2TbHeight, 5) between log 2TbHeight and 5.

In step S2430, the decoding apparatus 200 obtains position information last_sig_coeff_x_prefix and last_sig_coeff_y_prefix of the last significant coefficient in the transform unit in scan order. The position information last_sig_coeff_x_prefix and last_sig_coeff_y_prefix of the last significant coefficient is coded based on the variable values log 2ZoTbWidth and log 2ZoTbHeight related to the transform target region. last_sig_coeff_x_prefix indicates a prefix of the column position of the last significant coefficient in the transform unit in scanning order and last_sig_coeff_y_prefix indicates a prefix of the row position of the last significant coefficient in the transform unit in scanning order. For example, an input parameter cMax for binarization of last_sig_coeff_x_prefix may be determined based on log 2ZoTbWidth (cMax=(log 2ZoTbWidth<<1)−1), and an input parameter for binarization of last_sig_coeff_y_prefix may be determined based on log 2ZoTbHeight (cMax=(log 2ZoTbHeight<<1)−1) as shown in Table 28.

In step S2440, the decoding apparatus 200 performs an inverse transform based on the position information last_sig_coeff_x_prefix and last_sig_coeff_y_prefix of the last significant coefficient. For example, the decoding apparatus 200 may determine a position LastSignificantCoeffX and LastSignificantCoeffY of the last significant efficient using the position information last_sig_coeff_x_prefix and last_sig_coeff_y_prefix of the last significant coefficient and perform operation for the transform according to the position LastSignificantCoeffX and LastSignificantCoeffY of the last significant efficient, as shown in Table 20.

In an embodiment, the size of the transform unit is determined based on the SBT size flag cu_sbt_quad_flag indicating the size of a sub-block partitioned from the coding unit, the size of the transform unit may be ½ the size of the coding unit if the SBT size flag cu_sbt_quad_flag is 0, as illustrated in FIG. 13a to FIG. 14b, and the size of the transform unit may be ¼ the size of the coding unit if the SBT size flag cu_sbt_quad_flag is 1, as illustrated in FIG. 15a to FIG. 16b.

In an embodiment, the step of performing the inverse transform includes a step of applying a horizontal transform and a vertical transform to the transform unit. A transform kernel for the horizontal transform and the vertical transform may be determined based on the SBT direction flag cu_sbt_horizontal_flag indicating a partitioning direction of the coding unit and the SBT position flag cu_sbt_pos_flag indicating the position of the transform unit in the coding unit. For example, a transform kernel type trTypeHor for the horizontal transform and a transform kernel type trTypeVer for the vertical transform may be determined according to the SBT direction flag cu_sbt_horizontal_flag and the SBT position flag cu_sbt_pos_flag, as shown in Table 22. In Table 22, DST-7 is applied if trTypeHor or trTypeVer is 1 and DCT-8 is applied if trTypeHor or trTypeVer is 2. That is, DST-7 or DCT-8 may be applied to a block to which SBT has been applied.

In an embodiment, the coding unit may be partitioned in the vertical direction if the SBT direction flag cu_sbt_horizontal_flag is 0 and may be partitioned in the horizontal direction if the SBT direction flag cu_sbt_horizontal_flag is 1. For example, the coding unit may be partitioned in the vertical direction if the SBT direction flag cu_sbt_horizontal_flag is 0, as illustrated in FIGS. 13a, 13b, 15a, and 15b and may be partitioned in the horizontal direction if the SBT direction flag cu_sbt_horizontal_flag is 1, as illustrated in FIGS. 14a, 14b, 16a, and 16b.

In an embodiment, when DST-7 or DCT-8 is applied, the width nonZeroW of a region where a non-zero transform coefficient is present in the transform unit may be reduced to 16 if the width of the transform unit is greater than 16, and the height nonZeroH of the region where a non-zero transform coefficient is present in the transform unit may be reduced to 16 if the height of the transform unit is greater than 16. For example, when the width of a transform unit to which SBT is applied is 32, the width nonZeroW of a region where a non-zero transform coefficient is present may be reduced to 16, as illustrated in FIGS. 17c, 17d, 18c, and 18d. Further, when the height of the transform unit to which SBT is applied is 32, the height nonZeroH of the region where a non-zero transform coefficient is present may be reduced to 16, as illustrated in FIGS. 17a, 17b, 18a, and 18b.

Figure 25:
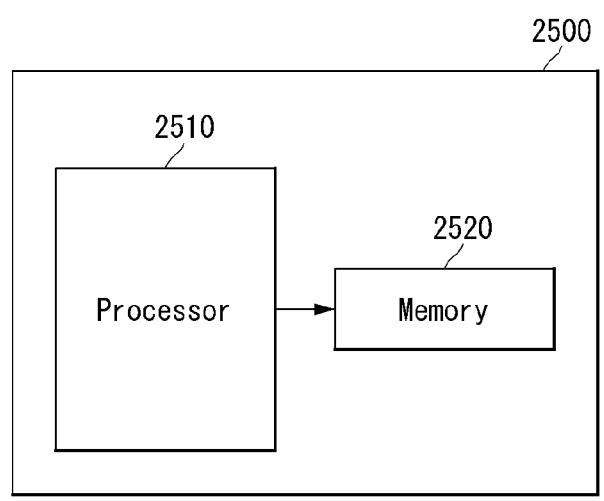
FIG. 25 is a block diagram of a device for processing a video signal according to an embodiment of the present disclosure.

FIG. 25 is a block diagram of a video signal processing device according to an embodiment of the present disclosure. The video signal processing device of FIG. 21 may correspond to the encoding apparatus 100 of FIG. 1 and the decoding apparatus 200 of FIG. 2.

A video signal processing device 2500 for processing a video signal includes a memory 2520 storing a video signal and a processor 2510 combined with the memory and configured to process a video signal. The processor 2510 according to an embodiment of the present disclosure may be configured as at least one processing circuit for processing a video signal and may process a video signal by executing commands for encoding or decoding. That is, the processor 2510 may encode original video data or decode an encoded video signal by executing the above-described encoding or decoding method.

The processor 2510 according to the embodiment of the present disclosure may be configured to apply a transform to a transform unit corresponding to one of sub-blocks partitioned from a coding unit and to encode information related to the transform. The information related to the transform includes an SBT flag indicating whether SBT is applied and position information of a last significant coefficient in scan order in the transform unit, the position information of the last significant coefficient is coded based on a variable value related to a region where a non-zero transform coefficient is present, and the variable value is determined to be a reference value if the SBT flag is 1 and a size value of the transform unit is greater than the reference value.

In an embodiment, the variable value is determined to be the size value of the transform unit if the SBT flag is 1 and the size value of the transform unit is equal to or less than the reference value.

In an embodiment, the information related to the transform further includes an SBT size flag indicating a size of a sub-block partitioned from the coding unit, the size of the transform unit may be ½ the coding unit if the SBT size flag is 0 and may be ¼ the coding unit if the SBT size flag is 1.

In an embodiment, the processor 2510 may be configured to apply a horizontal transform and a vertical transform to the transform unit, a transform kernel for the horizontal transform and the vertical transform may be determined based on a partitioning direction of the coding unit and the position of the transform unit in the coding unit, and the information related to the transform may further include an SBT direction flag indicating the partitioning direction of the coding unit and an SBT position flag indicating the position of the transform unit.

In an embodiment, the coding unit may be partitioned in the vertical direction if the SBT direction flag is 0 and may be partitioned in the horizontal direction if the SBT direction flag is 1.

In an embodiment, when DST-7 or DCT-8 is applied, the width of the region where a non-zero transform coefficient is present in the transform unit may be reduced to 16 when the width of the transform unit is greater than 16, and the height of the region where a non-zero transform coefficient is present in the transform unit may be reduced to 16 when the height of the transform unit is greater than 16.

The processor 2510 according to the embodiment of the present disclosure may be configured to obtain an SBT flag indicating whether SBT is applied in order to decode a video signal, the SBT representing a transform applied to a transform unit corresponding to one of sub-blocks partitioned from a coding unit, to determine a variable value related to a transform target region based on the SBT flag and the size value of the transform unit, the variable value being determined to be a reference value if the SBT flag is 1 and the size value of the transform unit is greater than the reference value, to obtain position information of a last significant coefficient in scan order in the transform unit, the position information of the last significant coefficient being coded based on the variable value, and to perform an inverse transform based on the position information of the last significant coefficient.

In an embodiment, the variable value may be determined to be the size value of the transform unit if the SBT flag is 1 and the size value of the transform unit is equal to or less than a reference value.

In an embodiment, the size of the transform unit may be determined based on the SBT size flag indicating the size of a sub-block partitioned from the coding unit, the size of the transform unit may be ½ the coding unit if the SBT size flag is 0 and may be ¼ the coding unit.

In an embodiment, the processor 2510 may be configured to apply a horizontal transform and a vertical transform to the transform unit, and a kernel for the horizontal transform and the vertical transform may be determined based on an SBT direction flag indicating a partitioning direction of the coding unit and an SBT position flag indicating the position of the transform unit in the coding unit.

In an embodiment, the coding unit may be partitioned in the vertical direction if the SBT direction flag is 0 and may be partitioned n the horizontal direction if the SBT direction flag is 1.

In an embodiment, when DST-7 or DCT-8 is applied, the width of a region where a non-zero transform coefficient is present in the transform unit may be reduced to 16 when the width of the transform unit is greater than 16, and the height of the region where a non-zero transform coefficient is present in the transform unit may be reduced to 16 when the height of the transform unit is greater than 16.

The processing methods to which the present disclosure is applied may be manufactured in the form of a program executed by a computer and may be stored in computer-readable recording media. Multimedia data with a data structure according to the present disclosure may also be stored in computer-readable recording media. The computer-readable recording media include all types of storage devices and distributed storage devices in which data readable by a computer is stored. The computer-readable recording media may include a Blue-ray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bitstream generated by the encoding method may be stored in a computer-readable recording medium or may be transmitted over wired/wireless communication networks.

Embodiments of the present disclosure can be implemented as computer program products by program codes, and the program codes can be executed in a computer according to embodiments of the present disclosure. The program codes may be stored on computer-readable carriers.

A non-transitory computer-readable medium according to an embodiment of the present disclosure stores one or more commands executed by one or more processors. The one or more commands may control the video signal processing device 2500 (or the encoding apparatus 100) to apply a transform to a transform unit corresponding to one of sub-blocks partitioned from a coding unit and to encode information related to the transform to encode a video signal. The information related to the transform includes an SBT flag indicating whether SBT is applied and position information of a last significant coefficient in scan order in the transform unit, the position information of the last significant coefficient is coded based on a variable value related to a region where a non-zero transform coefficient is present, and the variable value is determined to be a reference value if the SBT flag is 1 and a size value of the transform unit is greater than the reference value.

In an embodiment, the variable value is determined to be the size value of the transform unit if the SBT flag is 1 and the size value of the transform unit is equal to or less than the reference value.

In an embodiment, the information related to the transform further includes an SBT size flag indicating a size of a sub-block partitioned from the coding unit, the size of the transform unit may be ½ the coding unit if the SBT size flag is 0 and may be ¼ the coding unit if the SBT size flag is 1.

In an embodiment, the video signal processing device may be controlled to apply a horizontal transform and a vertical transform to the transform unit, and a transform kernel for the horizontal transform and the vertical transform may be determined based on the position of the transform unit in the coding unit, and the information related to the transform may further include an SBT direction flag indicating a partitioning direction of the coding unit and an SBT position flag indicating the position of the transform unit.

In an embodiment, the coding unit may be partitioned in the vertical direction if the SBT direction flag is 0 and may be partitioned n the horizontal direction if the SBT direction flag is 1.

In an embodiment, when DST-7 or DCT-8 is applied, the width of a region where a non-zero transform coefficient is present in the transform unit may be reduced to 16 when the width of the transform unit is greater than 16, and the height of the region where a non-zero transform coefficient is present in the transform unit may be reduced to 16 when the height of the transform unit is greater than 16.

One or more commands stored in a non-transitory computer-readable medium according to another embodiment of the present disclosure may control the video signal processing device 2500 (or the decoding apparatus 200) to obtain an SBT flag indicating whether SBT is applied in order to decode a video signal, the SBT representing a transform applied to a transform unit corresponding to one of sub-blocks partitioned from a coding unit, to determine a variable value related to a transform target region based on the SBT flag and the size value of the transform unit, the variable value being determined to be a reference value if the SBT flag is 1 and the size value of the transform unit is greater than the reference value, to obtain position information of a last significant coefficient in scan order in the transform unit, the position information of the last significant coefficient being coded based on the variable value, and to perform an inverse transform based on the position information of the last significant coefficient.

In an embodiment, the variable value may be determined to be the size value of the transform unit if the SBT flag is 1 and the size value of the transform unit is equal to or less than a reference value.

In an embodiment, the size of the transform unit may be determined based on the SBT size flag indicating the size of a sub-block partitioned from the coding unit, the size of the transform unit may be ½ the coding unit if the SBT size flag is 0 and may be ¼ the coding unit.

In an embodiment, the commands may control the video signal processing device to apply a horizontal transform and a vertical transform to the transform unit, and a kernel for the horizontal transform and the vertical transform may be determined based on an SBT direction flag indicating a partitioning direction of the coding unit and an SBT position flag indicating the position of the transform unit in the coding unit.

In an embodiment, the coding unit may be partitioned in the vertical direction if the SBT direction flag is 0 and may be partitioned n the horizontal direction if the SBT direction flag is 1.

In an embodiment, when DST-7 or DCT-8 is applied, the width of a region where a non-zero transform coefficient is present in the transform unit may be reduced to 16 when the width of the transform unit is greater than 16, and the height of the region where a non-zero transform coefficient is present in the transform unit may be reduced to 16 when the height of the transform unit is greater than 16.

As described above, embodiments of the present disclosure can be implemented and executed on a processor, a microprocessor, a controller or a chip. For example, functional units shown in each figure can be implemented and executed on a computer, a processor, a microprocessor, a controller or a chip.

The decoder and the encoder to which the present disclosure is applied may be included in multimedia broadcast transmission/reception apparatuses, mobile communication terminals, home cinema video systems, digital cinema video systems, monitoring cameras, video conversation apparatuses, real-time communication apparatuses such as video communication, mobile streaming devices, storage media, camcorders, video-on-demand (VoD) service providing apparatuses, over the top video (OTT) video systems, Internet streaming service providing apparatuses, 3D video systems, video phone video systems, medical video systems, etc., and may be used to process video signals or data signals. For example, OTT video systems may include game consoles, Blue-ray players, Internet access TVs, home theater systems, smartphones, tablet PCs, digital video recorders (DVRs), etc.

Embodiments described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment or included as a new claim by a subsequent amendment after the application is filed.

The implementations of the present disclosure may be achieved by various means, for example, hardware, firmware, software, or a combination thereof. In a hardware configuration, the methods according to the implementations of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

Those skilled in the art will appreciate that the present disclosure may be carried out in other specific ways than those set forth herein without departing from the spirit and essential characteristics of the present disclosure. Accordingly, the above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein

INDUSTRIAL APPLICABILITY

Although exemplary aspects of the present disclosure have been described for illustrative purposes, those skilled in the art will appreciate that various modifications, additions and substitutions are possible, without departing from essential characteristics of the disclosure.

The invention claimed is:

1. A method for decoding a video signal, comprising:
obtaining a sub-block transform (SBT) flag indicating whether a SBT is applied, wherein the SBT represents a transform applied to a transform unit corresponding to one of subblocks split from a coding unit;
determining a width variable and a height variable related to a transform target region based on the SBT flag and a width and a height of the transform unit,
wherein, based on a first condition that (i) the SBT flag equals to 1, (ii) the width of the transform unit is a first reference value, and (iii) the height of the transform unit is less than a second reference value: the width variable related to the transform target region is determined as a third reference value, and
wherein, based on a second condition that (i) the SBT flag equals to 1, (ii) the height of the transform unit is the first reference value, and (iii) the width of the transform unit is less than the second reference value: the height variable related to the transform target region is determined as the third reference value;
obtaining position information of a last significant coefficient according to a scan order within the transform unit, wherein the position information of the last significant coefficient is determined based on prefix information determined by the width variable and the height variable related to the transform target region; and
performing an inverse-transform based on the position information of the last significant coefficient.

2. The method of claim 1, wherein the first reference value is 32, the second reference value is 64 and the third reference value is 16.

3. The method of claim 1, wherein, based on the first condition not being satisfied, the width variable related to the transform target region is determined as a minimum value of the width of the transform unit and the third reference value, and
wherein, based on the second condition not being satisfied, the height variable related to the transform target region is determined as a minimum value of the height of the transform unit and the third reference value.

4. The method of claim 1, wherein performing the inverse-transform comprises applying a horizontal direction transform and a vertical direction transform to the coding unit, wherein a transform kernel for the horizontal direction transform and the vertical direction transform is determined based on a SBT direction flag indicating a split direction of the coding unit and a SBT position flag indicating a position of the transform unit in the coding unit.

5. The method of claim 4, wherein, based on the SBT direction flag being 0, the coding unit is split in a vertical direction, and
wherein based on the SBT direction flag is 1, the coding unit is split in a horizontal direction.

6. The method of claim 1, wherein, when discrete sine transform type-7 (DST-7) or discrete cosine transform type-8 (DCT-8) is applied to the transform unit, a width of an area where a non-zero transform coefficient is present in the transform unit is reduced to 16 based on the width of the transform unit being greater than 16, and
wherein, when the DST-7 or the DCT-8 is applied to the transform unit, a height of the area where the non-zero transform coefficient is present in the transform unit is reduced to 16 based on the height of the transform unit being greater than 16.

7. A method for encoding a video signal, the method comprising:
applying a transform to a transform unit corresponding to one of subblocks split from a coding unit; and
encoding information related to the transform,
wherein the information related to the transform includes a sub-block transform (SBT) flag indicating whether to apply a SBT, and position information of a last significant coefficient according to a scan order within the transform unit,
wherein the position information of the last significant coefficient includes prefix information determined by a width variable and a height variable related to an area in which a non-zero transform coefficient is present,
wherein, based on a first condition that (i) the SBT flag equals to 1, (ii) a width of the transform unit is a first reference value, and (iii) a height of the transform unit is less than a second reference value: the width variable related to the area is determined as a third reference value, and
wherein, based on a second condition that (i) the SBT flag equals to 1, (ii) the height of the transform unit is the first reference value, and (iii) the width of the transform unit is less than the second reference value: the height variable related to the area is determined as the third reference value.

8. The method of claim 7, wherein the first reference value is 32, the second reference value is 64 and the third reference value is 16.

9. The method of claim 7, wherein based on the first condition not being satisfied, the width variable related to the area is determined as a minimum value of the width of the transform unit and the third reference value, and
wherein, based on the second condition not being satisfied, the height variable related to the area is determined as a minimum value of the height of the transform unit and the third reference value.

10. The method of claim 7, wherein applying the transform comprises applying a horizontal direction transform and a vertical direction transform to the coding unit,
wherein a transform kernel for the horizontal direction transform and the vertical direction transform is determined based on a split direction of the coding unit and a position of the transform unit in the coding unit,
wherein the information related to the transform further includes a SBT direction flag indicating the split direction of the coding unit and a SBT position flag indicating the position of the transform unit.

11. The method of claim 10, wherein, based on the SBT direction flag being 0, the coding unit is split in a vertical direction, and
wherein, based on the SBT direction flag being 1, the coding unit is split in a horizontal direction.

12. The method of claim 7, wherein, when discrete sine transform type-7 (DST-7) or discrete cosine transform type-8 (DCT-8) is applied to the transform unit, a width of an area where a non-zero transform coefficient is present in the transform unit is reduced to 16 based on the width of the transform unit being greater than 16, and
wherein, when the DST-7 or the DCT-8 is applied to the transform unit, a height of the area where the non-zero transform coefficient is present in the transform unit is reduced to 16 based on the height of the transform unit being greater than 16.

13. A non-transitory computer-readable medium storing picture information generated by performing the steps of:
applying a transform to a transform unit corresponding to one of subblocks split from a coding unit; and
encoding information related to the transform,
wherein the information related to the transform includes a sub-block transform (SBT) flag indicating whether to apply a SBT, and position information of a last significant coefficient according to a scan order within the transform unit,
wherein the position information of the last significant coefficient includes prefix information determined by a width variable and a height variable related to an area in which a non-zero transform coefficient is present,
wherein, based on a first condition that (i) the SBT flag equals to 1, (ii) a width of the transform unit is a first reference value, and (iii) a height of the transform unit is less than a second reference value: the width variable related to the area is determined as a third reference value, and
wherein, based on a second condition that (i) the SBT flag equals to 1, (ii) the height of the transform unit is the first reference value, and (iii) the width of the transform unit is less than the second reference value: the height variable related to the area is determined as the third reference value.

* * * * *